United States Patent [19]
Ulichney

[11] Patent Number: 5,920,322
[45] Date of Patent: Jul. 6, 1999

[54] METHOD AND APPARATUS FOR PROVIDING 32-BIT YUV TO RGB COLOR CONVERSION

[75] Inventor: Robert A. Ulichney, Stow, Mass.

[73] Assignee: Digital Equipment Corporation, Maynard, Mass.

[21] Appl. No.: 08/650,252

[22] Filed: May 22, 1996

[51] Int. Cl.$^6$ .................................................. G06T 15/00
[52] U.S. Cl. ............................................................ 345/431
[58] Field of Search ................................... 345/431, 419, 345/420, 432, 430

[56] References Cited

U.S. PATENT DOCUMENTS

| | | | |
|---|---|---|---|
| 5,625,762 | 4/1997 | Takizawa et al. | 345/431 |
| 5,627,950 | 5/1997 | Stokes | 345/431 |
| 5,649,083 | 7/1997 | Barkans et al. | 345/431 |
| 5,673,065 | 9/1997 | Deleeuw | 345/431 |
| 5,721,572 | 2/1998 | Wan et al. | 345/431 |
| 5,736,989 | 4/1998 | Lhotak | 345/431 |

*Primary Examiner*—Cliff N. Vo
*Attorney, Agent, or Firm*—Ronald C. Hudgens

[57] ABSTRACT

A method of providing conversion from YUV signals to RGB signals includes the steps of determining a correspondence value between each of the Y, U, and V pixel values and the corresponding one of the R, G, and B pixel values. Three tables are generated; a Y table, a U table and a V table. During operation, each table may then be easily accessed by indexing the table with the respective Y, U or V input, to provide R,G,B data. The method may be used in a 64 bit embodiment using two registers or one register. Alternatively, the method may be used in a 32 bit embodiment. The conversion method can easily be augmented to provide color adjustment during conversion without any added complexity.

31 Claims, 43 Drawing Sheets

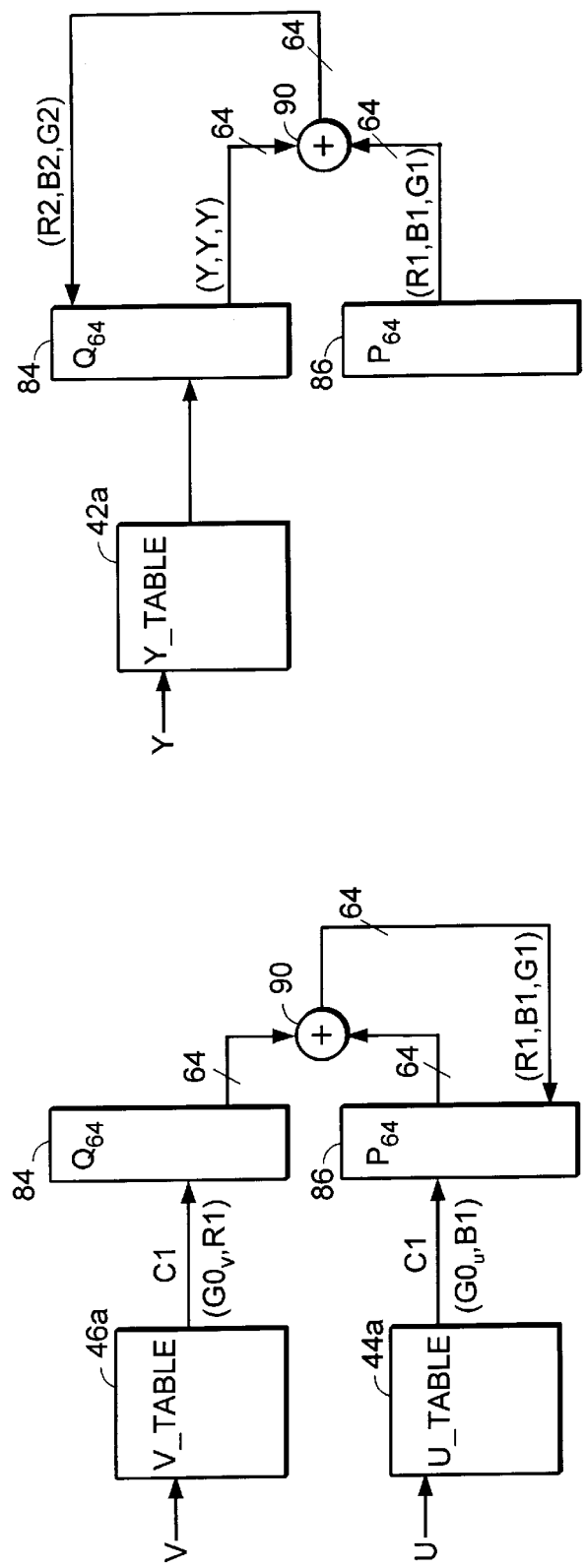
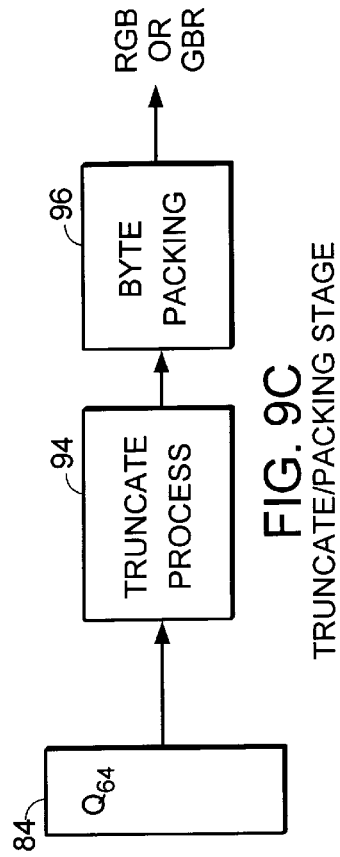
FIG. 9B
LUMINANCE STAGE
FIG. 9C
TRUNCATE/PACKING STAGE
FIG. 9A
CHROMINANCE STAGE

STEP 2:

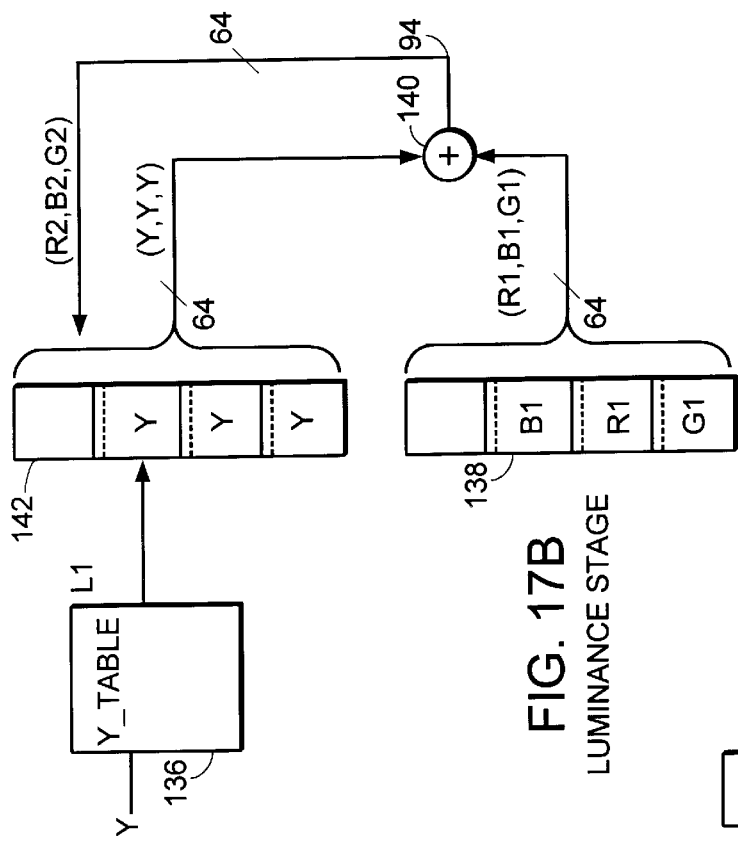
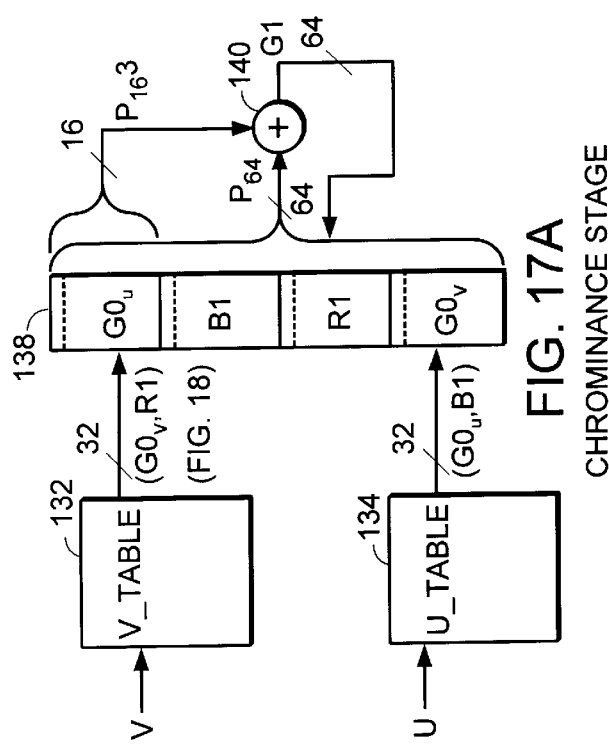
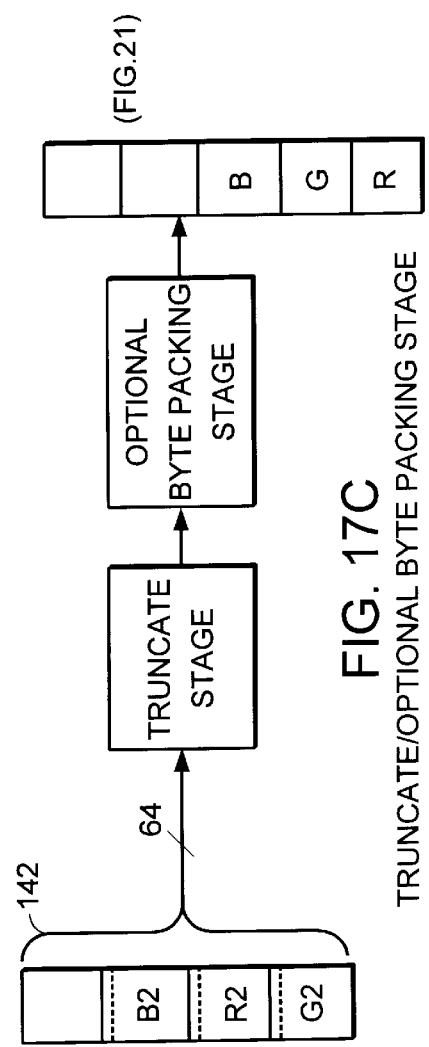
FIG. 17B LUMINANCE STAGE
FIG. 17A CHROMINANCE STAGE
FIG. 17C TRUNCATE/OPTIONAL BYTE PACKING STAGE

32 BIT LUMINANCE STAGE

32 BIT CHROMINANCE STAGE

TRUNCATE/PACKING STAGE

METHOD AND APPARATUS FOR PROVIDING 32-BIT YUV TO RGB COLOR CONVERSION

FIELD OF THE INVENTION

This invention relates generally to the field of computer systems and, more specifically, to computer graphic subsystems.

BACKGROUND OF THE INVENTION

In all digital playback systems, a key component is the conversion of pixels represented in the YUV, or luminance-chrominance color space to a value in the RGB, or Red-Green-Blue color space. The YUV pixels are those that are typically provided via an external video device such as a video camera, video tape player, etc. Digital Video is often stored with some form of data compression; video decompression processors will most often output data in YUV format. The pixels represented in the RGB format are used to display images on a display device, such as a computer monitor, etc.

Efficiency is critical for the translation operation because it must be executed for each input video pixel; speed enhancements at this stage of operation can therefore provide a dramatic improvement on the performance of the overall video system.

However, the translation between the two types of pixel format is not straight forward. Video pixels are essentially always encoded in YUV, with the 3×3 matrix conversion shown below required from RGB:

$$\begin{bmatrix} Y \\ U \\ V \end{bmatrix} = \begin{bmatrix} .299 & .587 & .114 \\ -1.69 & .311 & .500 \\ .500 & -.419 & .081 \end{bmatrix} \begin{bmatrix} R \\ G \\ B \end{bmatrix}$$

In the YUV color space, Y is luminance, or achromatic component, and U and V are the chrominance components. In a typical 8 bits per component digital system, the luminance value, or Y, ranges in value from 0 to 255. The U and V chrominance components range in value from −127 to +127. In an 8 bit per component RGB system, each of the R, G, B components range in value from 0 to 255.

When translating the YUV input back to RGB, the inverse transformation, provided below is applied:

$$\begin{bmatrix} R \\ G \\ B \end{bmatrix} = \begin{bmatrix} 1 & 0 & VR \\ 1 & UG & VG \\ 1 & UB & 0 \end{bmatrix} \begin{bmatrix} Y \\ U \\ V \end{bmatrix}$$

Where UB, UG, VG, and VR are the only non-zero non-one elements of the matrix. Therefore, in computing the conversion results, the matrix must be solved for each input Y, U and V value. Typically the solution is explicitly performed either in software or hardware. In software, the dematrixing routine is executed for each input Y, U or V value. In hardware, dematrixing chips are used to provide translation for each input Y, U and V pixel. Both methods have drawbacks due to the complexity of the operation which increases the number of cycles required and thereby reduces overall system performance. Dematrixing chips are typically complex and use valuable circuit board real-estate.

It would be desirable to provide a method of YUV to RGB translation that would allow for real time translation of input pixels with a minimum of complexity and area.

SUMMARY OF THE INVENTION

According to one aspect of the invention, a method and apparatus for providing translation between input YUV pixels and RGB pixels in a 32 bit computer system includes the steps of storing translation data in a memory such that, during operation, when pixels are input to a run-time system, the YUV input pixels may be used to access the tables to provide data to the 32 bit registers. The translation dematrixing process is apportioned into a chrominance stage, a luminance stage and a truncation stage. An optional byte packing stage may also be invoked.

According to another aspect of the invention, the plurality of tables stores a plurality of correspondence data representing the correspondence between pixels of the first type (YUV) and analogous pixels of the second type (RGB) and retrieving the correspondence data from the tables for storage in a plurality of registers, each of the registers comprising a sufficient number of bits for allowing the each of the correspondence data stored in the registers to be treated as an independent operand for high-precision arithmetic operations.

With such an arrangement, high speed YUV to RGB conversion may be performed computer systems with no loss of precision. The conversion is high speed because it can be accomplished using only table-look-ups and adds. The conversion is high precision because the allotted number of bits for the register is sufficient to allow for each component to have sufficient overflow bits and guard bits to function as independent arithmetic operands.

According to a further aspect of the invention, an optional byte packing step is provided that allows for byte-packed data to be quickly supplied as required. Because of the method used to store the components in the registers, byte packing may be accomplished via a sequence of shifts and transfers for 32 bit architectures, or via a simple swap, for 64 bit architectures or other architectures. With such an arrangement, overhead previously required for byte packing is eliminated.

BRIEF DESCRIPTION OF THE DRAWINGS

The above-mentioned and other features of the invention will now become more apparent by reference to the following description taken in connection with the accompanying drawings in which:

FIGS. 9A–9C are block diagrams illustrating the components and steps used during the color conversion process for a 64 bit system;

FIGS. 17A–17C are block diagrams of a another embodiment of the invention which may be used for a 64 bit color conversion using only one register in the chrominance stage;

DESCRIPTION OF THE PREFERRED EMBODIMENT

Figure 1:
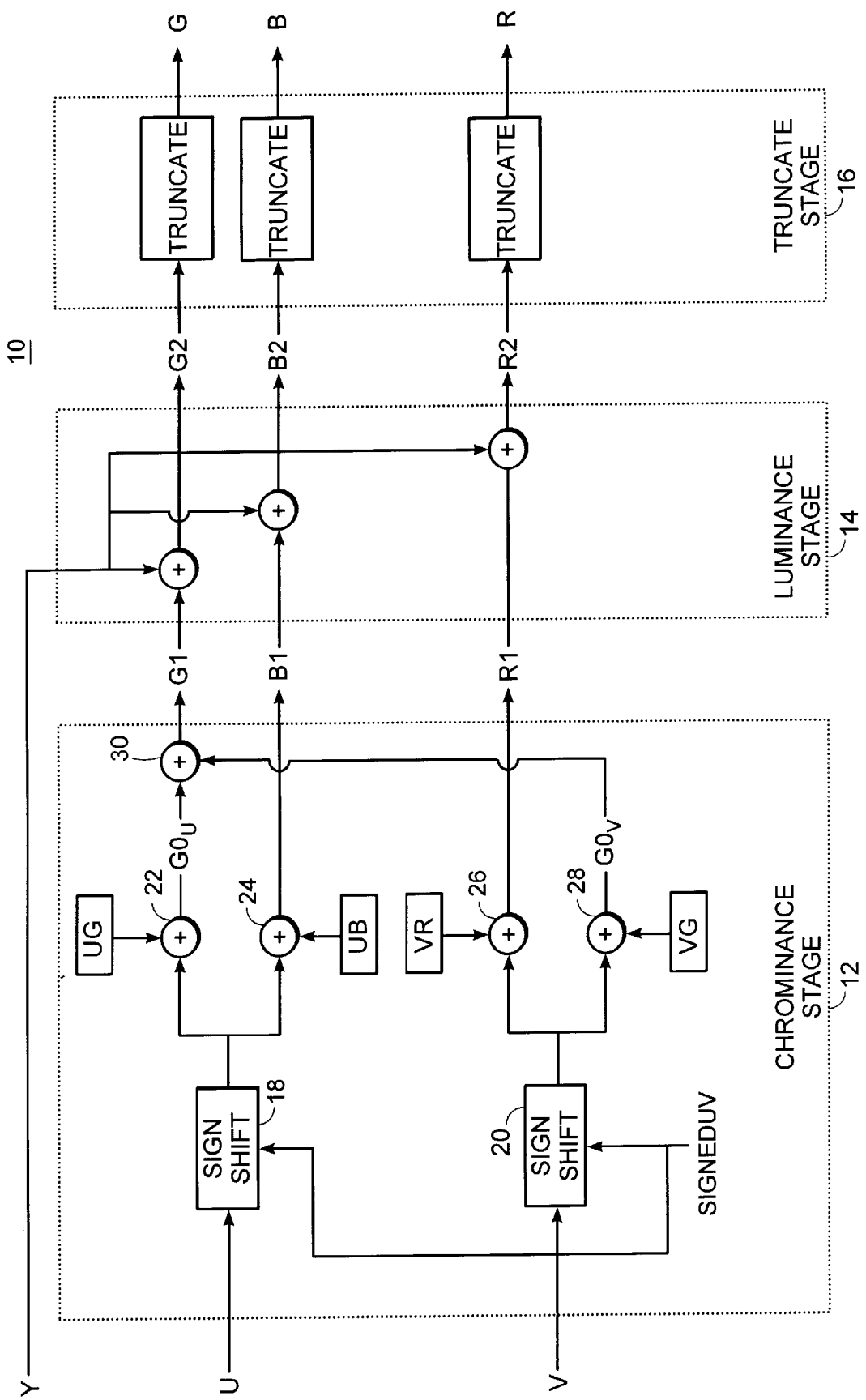
FIG. 1 is a block diagram illustrating the dematrixing approach to YUV to RGB conversion.

Referring now to FIG. 1, a flow model conceptually illustrating the steps of "dematrixing" for performing YUV to RGB transformation using the inverse transform is shown. The dematrixing process 10 is shown apportioned into a chrominance Stage 12, Luminance Stage 14 and Truncate Stage 16.

During the chrominance Stage 12, signals U and V are input and transformed to the triplet (B1, R1, G1) in the following manner. Signals U and V are first input to respective sign shift units 18 and 20. The SignShift unit is needed to correctly interpret the value of the U and V input. If the input data is "Signed" UV, then the data is in the proper form and nothing more need be done. However, it is also common to encode video as "Unsigned" UV. Unsigned UV is derived from signed UV by either adding 128 to the value, or simply complementing the most significant bit. For example, if the input U and V are "Unsigned UV", then the SignShift block must either subtract 128 from the value, or complement the most significant bit of the signal. The process performed by the SignShift units will be described in detail later herein.

The results from the SignShift units are then forwarded to multipliers 22, 24 and 26, 28 respectively. The result is that the SignShifted U is multiplied against the UG value of the matrix to provide an output of $G0_u$. The SignShifted U value is also multiplied times the UB value which provides as output the B1 value from the chrominance stage. Similarly, the SignShifted V value is multiplied by VR to provide the R1 output and is also multiplied times the VG value to provide a G0$_v$ output. The G0$_u$ is added to the G0$_v$ value to provide the output G1.

Thus, it can be seen that the chrominance stage 12 is a highly compute intensive stage of operation, that may require a pixel to be SignShifted, multiplied, and added, before the G1 value may be evaluated.

The R1, B1 and G1 values are then fed to the Luminance Stage 14. In the Luminance Stage, the input value of Y is added to each of the three outputs from the chrominance Stage. The result is output as R2, B2, and G2 to the truncate stage 16.

The valid R, G and B values must be between 0 and 255. It is quite possible that by the earlier manipulations of Y, U and V, during the previous stages of operation, that the transformation will yield values outside of this range. It is therefore necessary to validity of each of the components B2, R2, G2, and truncate the values less than 0 to 0 and truncate values greater than 255 down to 255.

Thus it can be seen that the mere transformation of the pixels from YUV to RGB is a compute intensive process. Thus it is crucial to provide a method that will quickly and efficiently provide this transformation at a reduced complexity.

Figure 2:
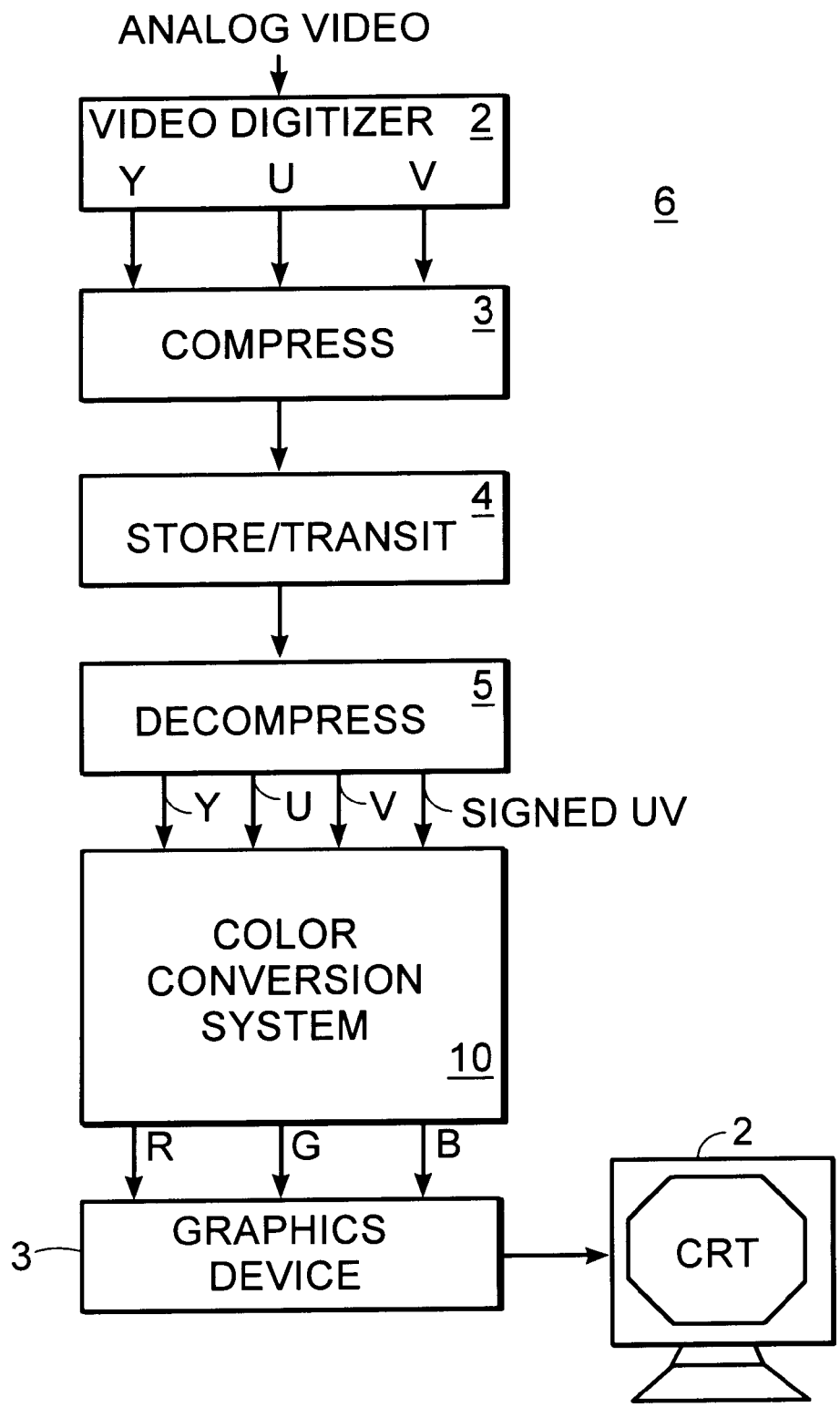
FIG. 2 is a block diagram of a computer system, including a video system which may be coupled to the present invention.

The present invention provides a method of efficient YUV to RGB conversion in the following manner. Referring now to FIG. 2, a video system 6 is shown. The video system may be included in a central processing unit, or as part of an external device. The video system is shown to include a video digitizer 2, for receiving analog video data (from a camera, laser disc, or other such device) and translating that data into digital pixel data of YUV format. The digital pixel data is forwarded to a compression unit 3, which compresses the data before storing or transmitting the data. When the data is ready for display, it is decompressed by decompress unit 5 back to Y U and V components, and forwarded to color conversion system 11. The color conversion system 11 translates the YUV data to RGB data.

As mentioned above, raw, analog video data is input to the system, and translated into digital Y,U and V pixels by video digitizer 2. The Y pixels represent luminance values and the U and V pixels represent chrominance values. However, it should be noted that not all of the Y,U and V data output from the video digitizer 2 will be used in the conversion process. Because the human visual system is less acute to chrominance detail than luminance detail, the same chrominance components, U and V may be shared between more than one luminance component Y. This practice is referred to as "chrominance subsampling." The chrominance subsampling spans listed in Table I below are those commonly used, and are in terms of horizontal by vertical luminance pixels over which the chrominance values are shared.

TABLE I

| chrominance Subsampling Span |
|---|
| 1 × 2 |
| 2 × 2 |
| 4 × 4 |

The separation of chrominance and luminance stages in the implementation allow for increased performance in the present system due to subsampling by reducing the average amount of computation that needs to be done for each input pixel. How the present invention takes advantage of this technique will be described in further detail below.

Figure 3:
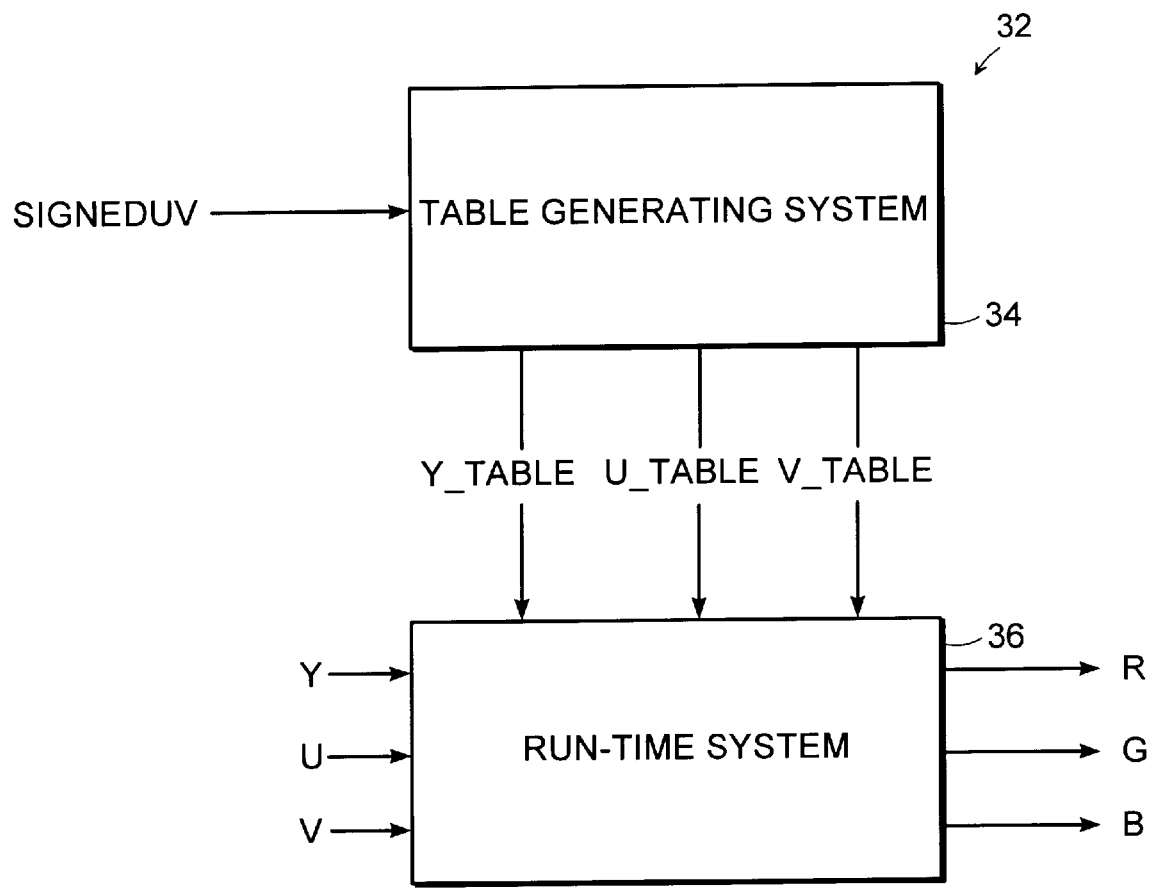
FIG. 3 is a block diagram of the present invention which may perform the color conversion process set forth in FIG. 2.

Referring now to FIG. 3, a block diagram of a YUV to RGB color conversion system 10 according to the present invention, is shown to include a table generating system 34 coupled to receive as input the signed UV signal. The table generating system is a software program which provides as output three tables; a Y_Table, a U_Table and a V_Table, to a Run-Time System 36. The Run-Time System takes as input the Y, U and V signals and translates them using the generated Y, U and V tables into RGB signals. By pre-generating the Y, U and V tables, the present embodiment of this invention performs YUV to RGB dematrixing with the remarkably small number of operations; between one and two table lookup and between one and 2 additions per pixel.

Color Conversion in a 64 Bit System

As mentioned above, the video system may be implemented in a computer system. Each computer system operates has an associated architecture that dictates the width of the working registers and the length of the addresses that are used to access memory. The run-time system, therefore, should be designed in accordance with the architecture of the computer system.

Figure 3A:
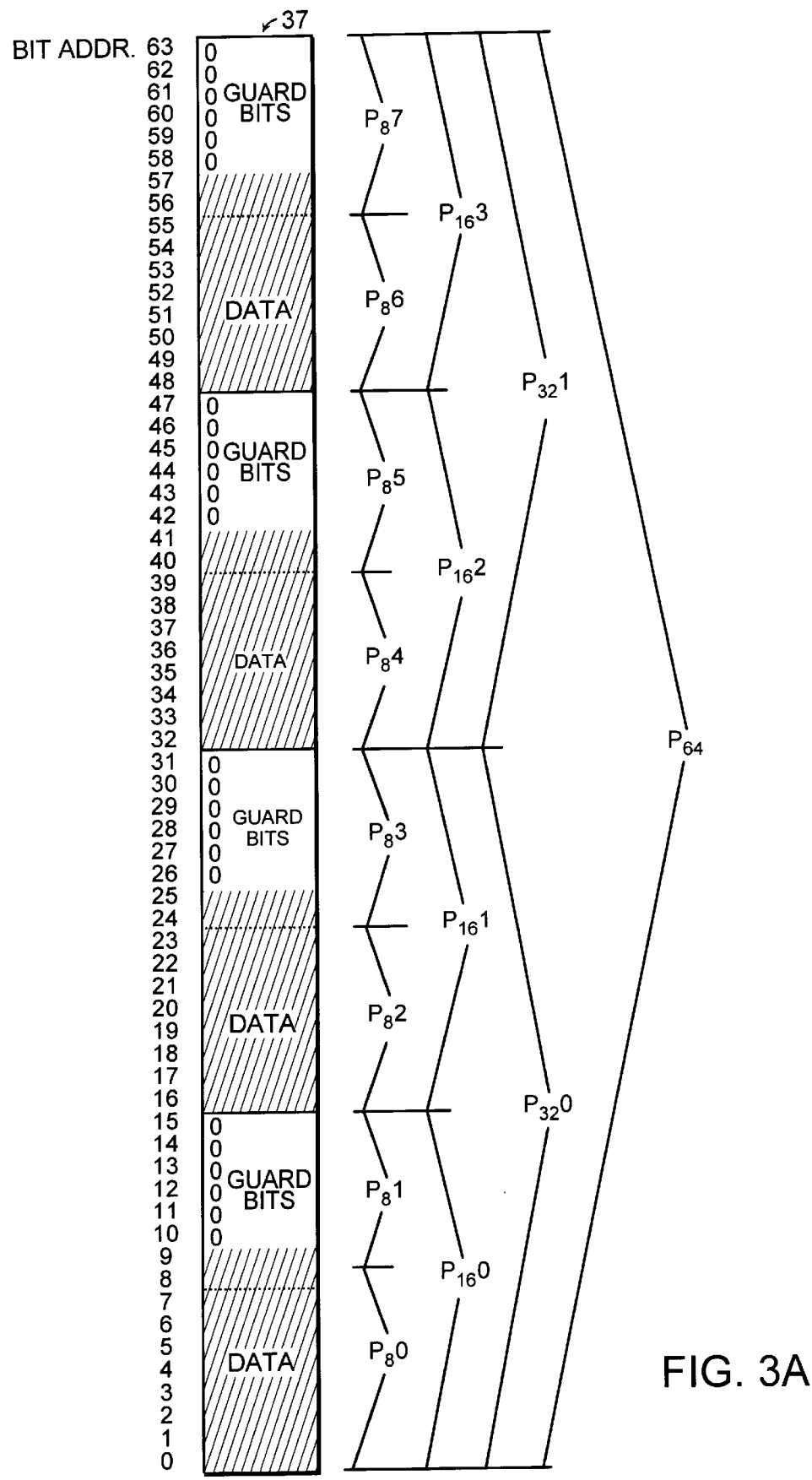
FIG. 3A is a diagram of a register put forth for the purposes of providing nomenclature for referencing data in the register.

Referring briefly to FIG. 3a, a 64 bit register 37 is shown for the purposes of establishing a nomenclature that may be used for identifying various data locations within the register. The 64 bit register may be referenced using byte nomenclature ($P_80$–$P_87$), word nomenclature ($P_{16}0$–$P_{16}3$), long-word nomenclature ($P_{32}0$ and $P_{32}1$) or quadword nomenclature ($P_{64}$)

Referring now to FIGS. 4–22, a translation method for use in a computer system supporting a 64 bit architecture will now be described.

Figure 4:
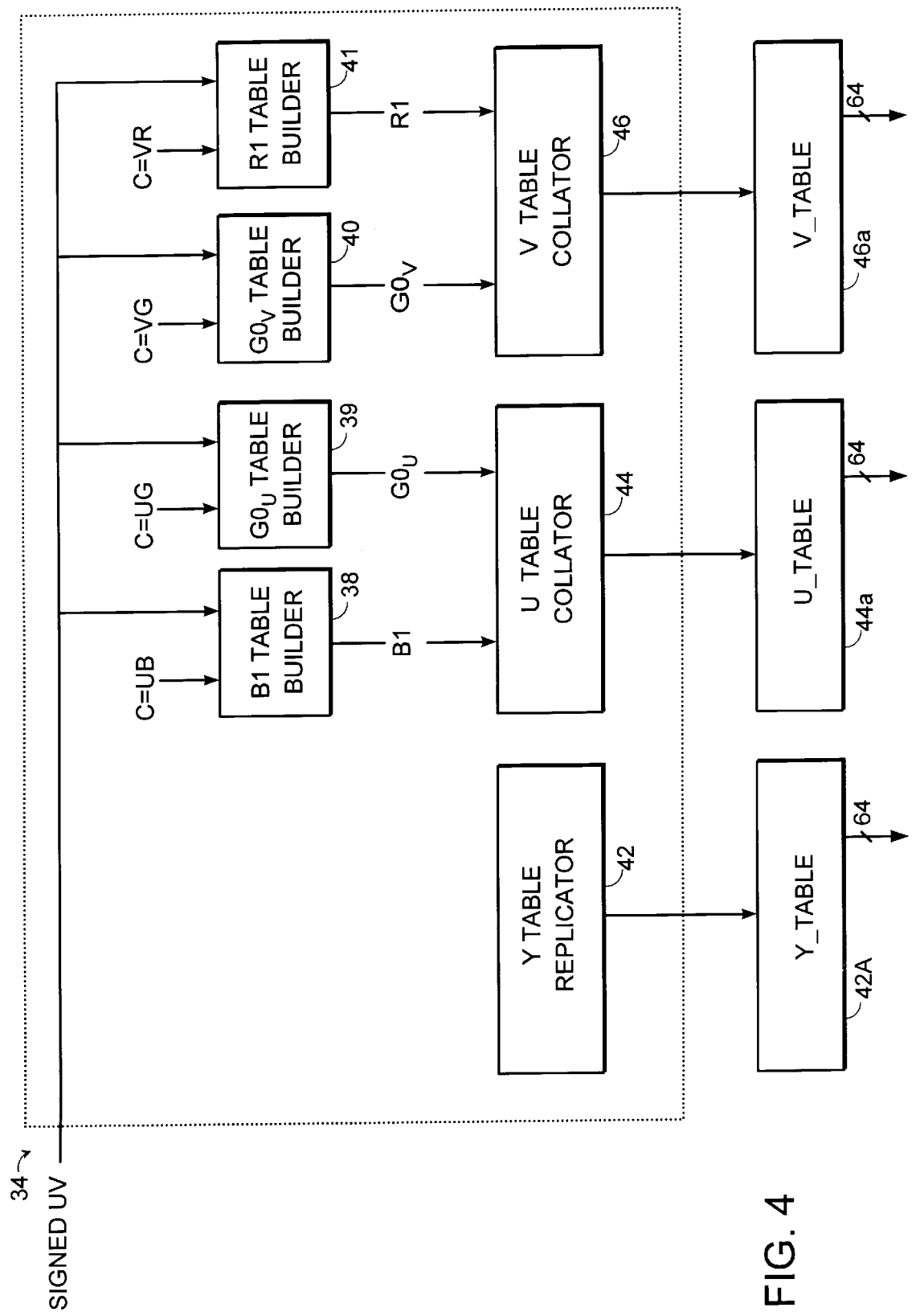
FIG. 4 is a block diagram of the table generation system used in the conversion system of FIG. 3.

As shown in FIG. 4, the components of the table generating system 34 for use in a 64 bit system are shown to include 4 table builders 38–41, which are coupled to respective U and V table collators 44 and 46. Each of the respective U and V table collators 44 and 46 provide data for corresponding U and V tables 44a and 46a respectively. In addition, a Y table replicator 42 is provided. The Y table replicator provides Y Table 42a with 3 copies of the Y input to be stored at each entry of Y table 42a.

In one embodiment of the 64 bit system, each of the registers are 64 bits wide. Each entry stores some component of data that is required for the YUV to RGB translation process, and is indexed by the corresponding Y, U, or V input pixel when used in the run-time system. How the values are stored in the respective tables will now be described.

Figure 5:
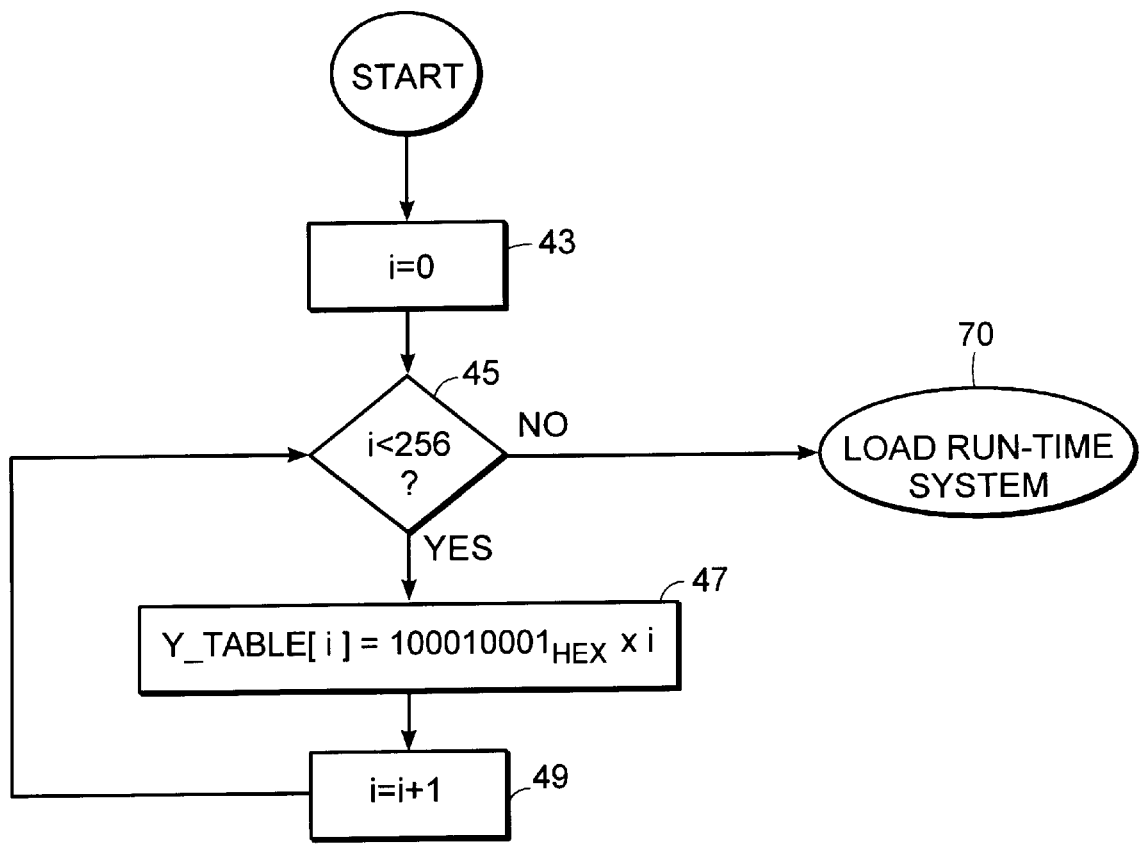
FIG. 5 is a flow diagram illustrating the process used by the Y Table Replicator of FIG. 4.

Referring now to FIG. 5, the process used to create the Y table by the Y Table Replicator 42 is shown. In the present embodiment, each table includes 255 elements, though one of skill in the art will easily understand how to implement this invention to provide greater or fewer entries.

Each Y entry directly corresponds to the input value of the Y pixel (i.e. the index that will be used to address the table). The Y input must be replicated for each of these elements to place the value in the proper positions for later calculations as will be described. Thus, at steps 43 and 45, i is first set to equal to zero, while at step 45, i is compared against the size of the table, here 256. If i is still less than 256, then at step 47 the element of the y table, at location i, is ANDed with hexadecimal value 100010001 to create three copies of the input at each location. At step 49, i is incremented to create the next element of the y table. This process continues until at step 45 every element of the y table has been defined, and then the process proceeds to step 70 to be loaded into the Run-Time System.

As discussed previously, the relationship between the YUV pixel values and the RGB pixel values is provided by the below transform:

$$\begin{bmatrix} R \\ G \\ B \end{bmatrix} = \begin{bmatrix} 1 & 0 & VR \\ 1 & UG & VG \\ 1 & UB & 0 \end{bmatrix} \begin{bmatrix} Y \\ U \\ V \end{bmatrix}$$

Where working values are typically:
UB=1.7790
UB=−.3455
VG=−.7169
VR=1.4075

Referring back to FIG. 4, each of the table builder blocks 38–41 generate different intermediate values of B1, $G0_u$, $G0_v$, and R1, depending on the value of the constant 'c' that is input to the Table builder. In addition, each table builder inputs the flag SignedUV. The flag SignedUV indicates whether or not the input UV values are signed or unsigned format. The constant c differentiates which table is being built; therefore c=UB is used for the B1 table, c=UG is used for the $G0_u$ table, c=VG is used for the $G0_v$ table, and c=VR is used for the R1 table.

Each table builder performs three functions. The first function performed by the table builder is to adjust the input U and V values such that they are in a proper SignedUV format.

Referring now to Table II below, the relationship between Signed UV and Unsigned UV is shown:

TABLE II

| Twos-complement Representation (Signed UV) | Binary Code (Signed UV) | Sign Shifted Representation (Unsigned UV) |
| --- | --- | --- |
| −128 | 1000 0000 | 0 |
| −127 | 1000 0001 | 1 |
| . | . | . |
| . | . | . |
| . | . | . |
| −1 | 1111 1111 | 127 |
| 0 | 0000 0000 | 128 |
| 1 | 0000 0001 | 129 |
| . | . | . |
| . | . | . |
| . | . | . |
| 126 | 0111 1110 | 254 |
| 127 | 0111 1111 | 255 |

The second function performed by the table builder is to build a table having 256 elements, where the value of each element is determined by the sign-adjusted index of the element in the table multiplied by the constant for the table. The third function performed by the table builders is to round the result of the multiply and truncate the two's complement result down to 10 bit integers.

Figure 6:
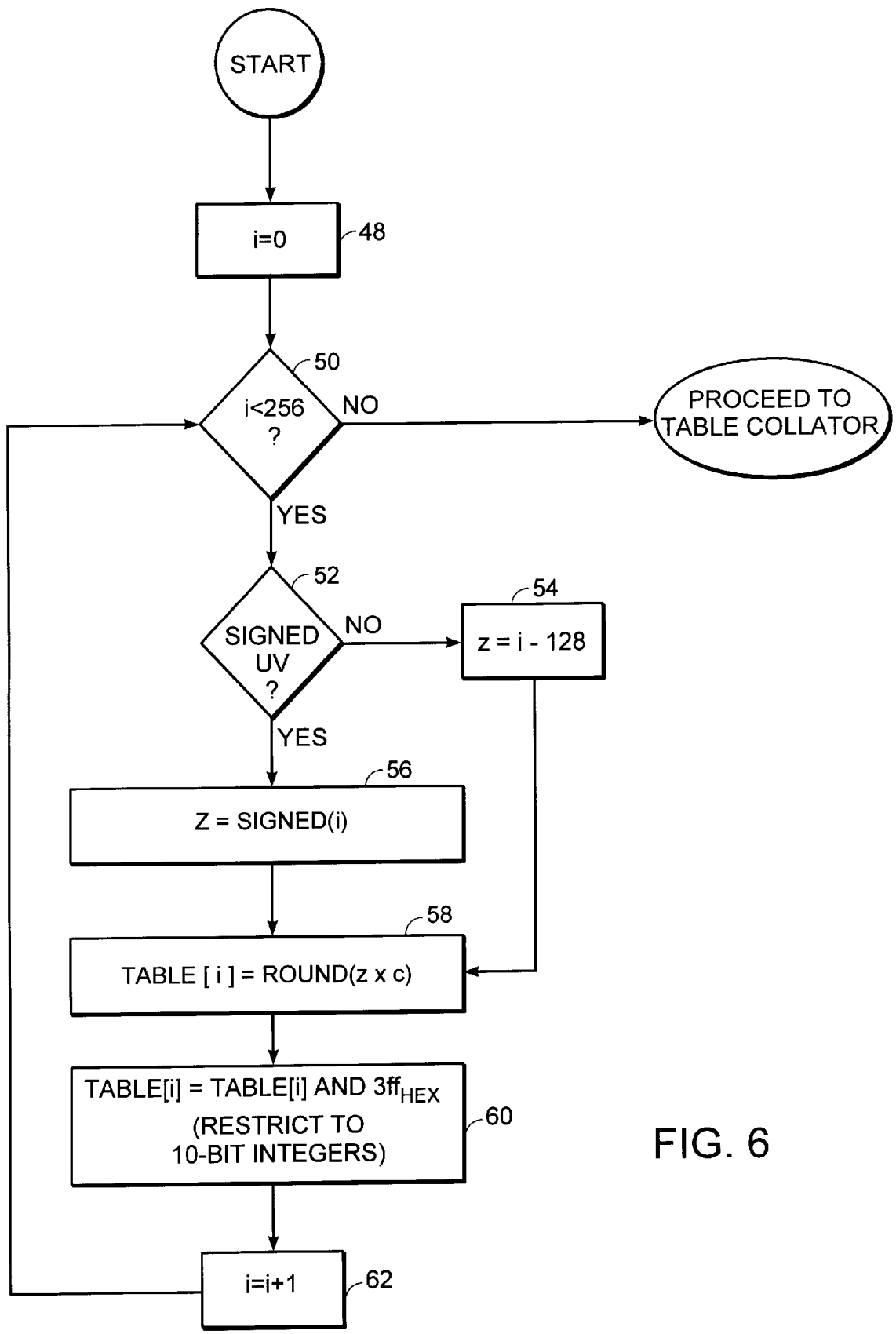
FIG. 6 is a flow diagram illustrating the process used by the Table Builder of FIG. 4.

Referring now to FIG. 6, the process used by the table builder to perform the above functions will be described. The table of the present invention has 256 elements, corresponding to the range of integer RGB values. The table is indexed by variable 'i' and a value is determined for each entry from i=0 to i=255.

At step 48, i is initialized zero. At step 50, the value of i is compared to ensure that it is below 256. If it is below 256, then not every entry in the table has been generated, and the process proceeds to step 52, where the signedUV input is evaluated to determine if the input YUV values are in the proper SignedUV format. If the SignedUV signal is not asserted, then at step 54 the value Z is determined by z=i−128. If it was SignedUV, then the appropriate signed i value is simply assigned to the variable z at step 56. Either way, the process resumes at step 58 where the table entry indicated by the 'i' variable is set equal to the round of the product of the z variable times the constant. The round function rounds the resulting product to the nearest integer, and the c variable, as mentioned previously, will vary depending upon which table is being built.

Next, at step 60, the contents of the table entry are truncated to 10 bit integers by ANDing them with the hexadecimal value "3ff". By restricting the data stored in a table to be no more than ten bits, only ten bits signed arithmetic is needed to preserve precision and guarantee unambiguous indicators of overflow and underflow. At step 62, the i value is incremented to build the next element in the table. This process continues until at step 50 it is determined that i is equal to 256, at which point all of the table elements have been generated.

Once all of the tables have been built for the B1, $G0_u$, $G0_v$, and R1 values, the data is ready to be fed to the Table collators 44 and 46. The function of the Table Collators is to collate the respective 256 element inputs from the respective tables provided by the associate table builders to provide one table output which will be fed to the Run-Time System.

Figure 7:
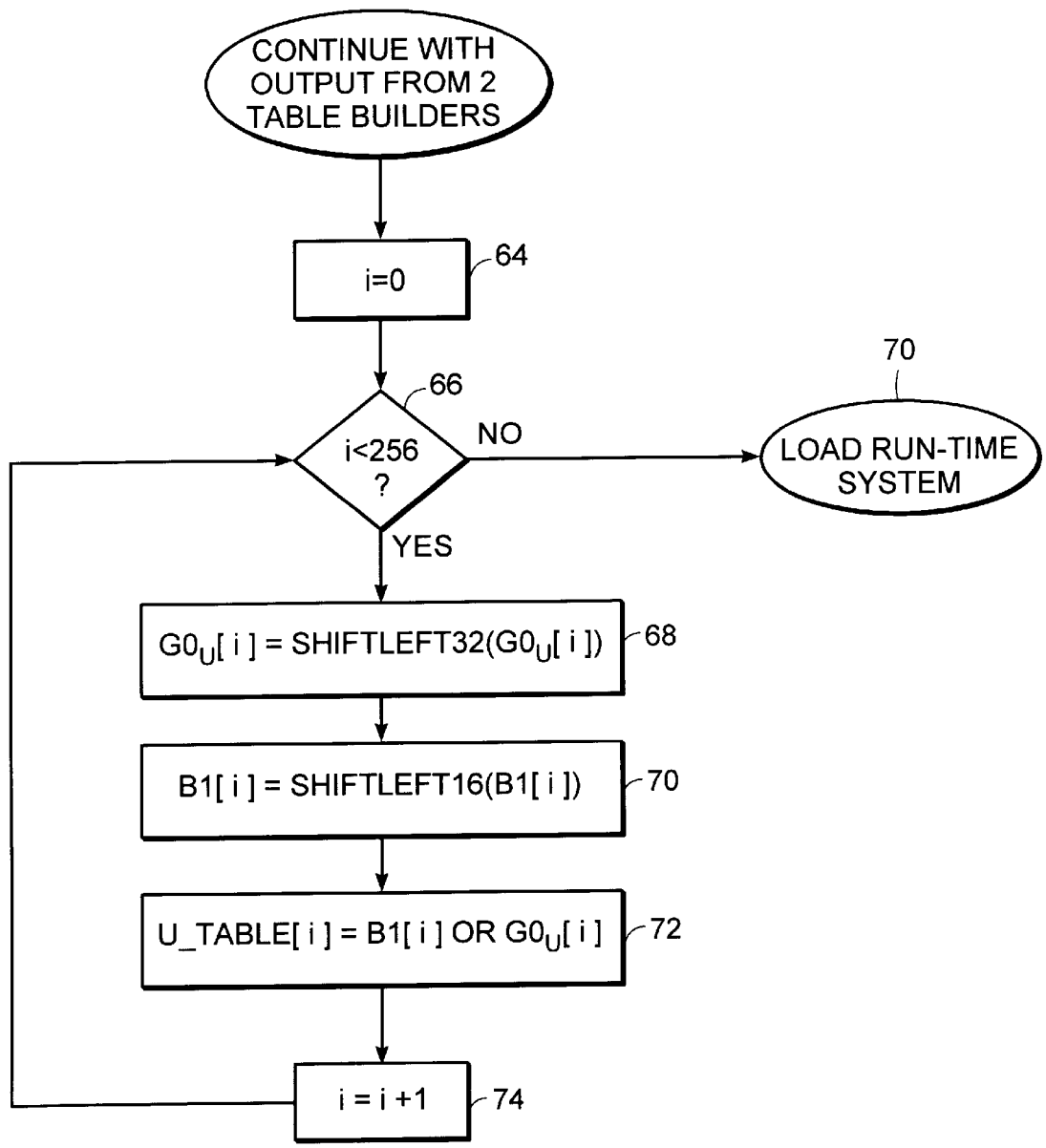
FIG. 7 is a flow diagram illustrating the process used by the U Table Collator of FIG. 4.

Referring now to FIG. 7, the process used by the U Table Collator 44 will now be described. At step 64, i is set equal to zero. At step 66, the value of i is compared against 256 to determine if every element of the table has been collated. If i is less than 256, then at step 68 the $G0_u$ element is shifted left by 32. At step 70, the B1 element is shifted left by 16. Then at step 72, the U_Table element is determined by ORing the result of shifting the B1 element left by 16 with the $G0_u$ shifted left 32 result. This result is stored in the U_Table element and at step 74, the i value is incremented. This process continues until at step 66 every element in the table has been collated. At that time, i is equal to 256 and the process returns to load the RunTime System at step 70.

Figure 8:
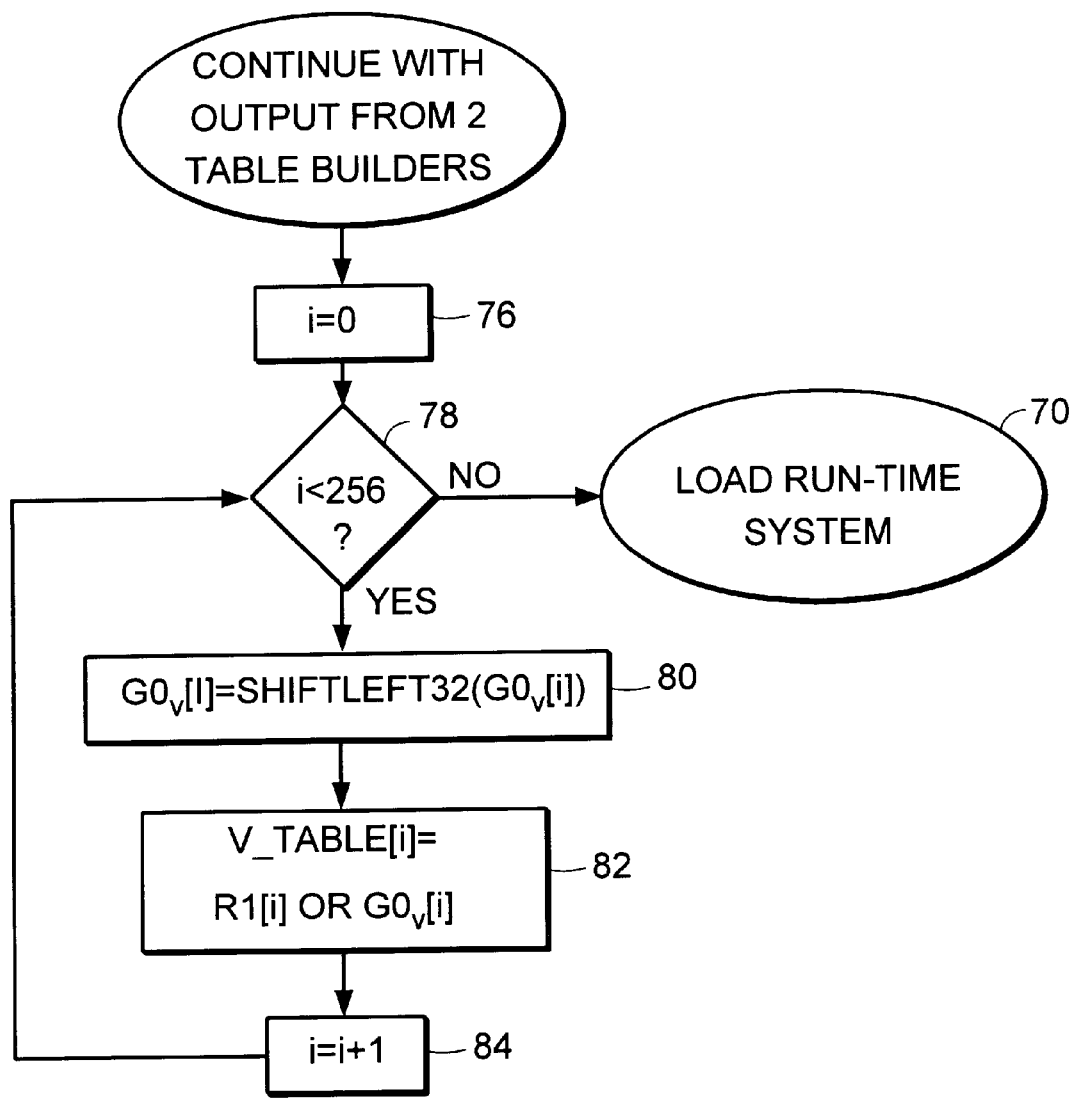
FIG. 8 is a flow diagram illustrating the process used by the V Table Collator of FIG. 4.

Referring now to FIG. 8, a slightly different, though similar, process is used for loading the V Table Collator for 64 bit translations. At step 76, i is set equal to 0 and at step 78, i is compared against the 256 table element number. If there is still more elements in the table to be collated, at step 80 the $G0_v$ is shifted left by 32. Then at step 81, the V_Table element for that i is determined by ORing the R1 value at the same table location against the shifted left $G0_v$ value. Then at step 82, i is incremented and the next element of the table will be collated. After it is determined, at step 78, that all the elements in the table have been collated, the process returns to step 70 for loading the RunTime System.

Referring again, briefly, to FIG. 3, the Y_Table, U_Table, and V_Table results are then forwarded to the RunTime System 36. The RunTime System 36, according one aspect of the present invention, has as its central aspect, a low number of operations that must be performed for each pixel.

Referring now to FIGS. 9A–9C, a block diagram of the run time system 36 is shown segmented into three stages of operation; a chrominance Stage (FIG. 9A), a Luminance Stage (FIG. 9B) and a Truncate/Byte Packing stage (FIG. 9C).

As shown in FIG. 9A, during the chrominance Stage, the V value is used to index V_Table 46a and the U value is used to index U_Table 44a. The output from the V_Table is fed to a 64 bit register Q Register 84. The output from the U_Table 44a is fed to P Register 86, which is also a 64-bit register. During the second step of the chrominance Stage, the two registers are added by add unit 90 and the output is stored back in P Register 86.

Figure 10:
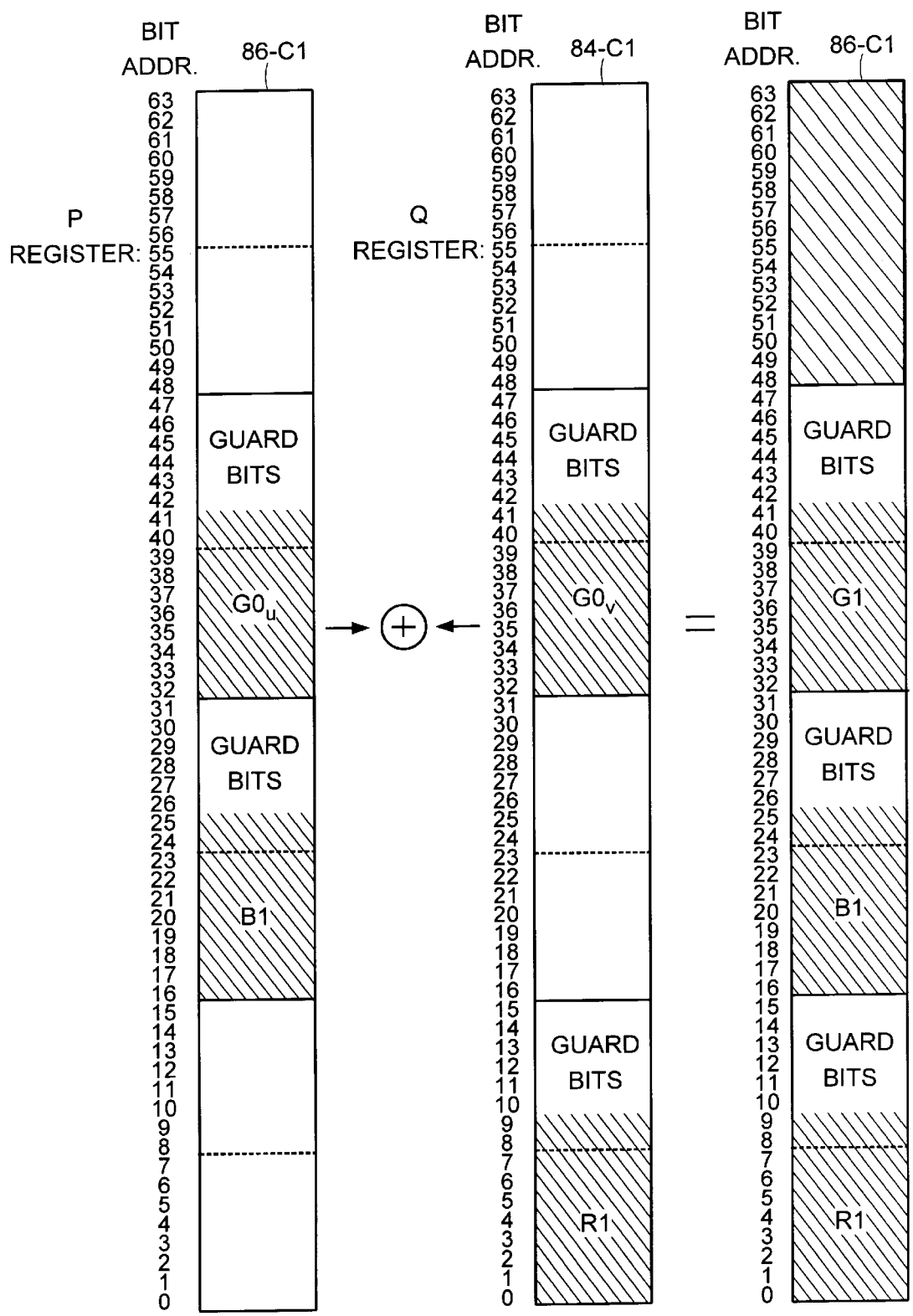
FIG. 10 is a diagram illustrating the register contents of the 64 bit color conversion system during the chrominance stage of the run time system shown in FIG. 9A.

Referring briefly to FIG. 10, the contents of the P Register 86-C1 and Q Register 84-C1 following the first step of the chrominance Stage are shown. In addition, the contents of the P register 86-C2 following the second step of the chrominance Stage are shown. Note that the P Register stores, after the first step of the chrominance Stage, the $G0_u$ value in bits 32–42 and the B1 value in bits 16–26. The Q Register stores the R1 value in bits 0–9 and the $G0_v$ in bits 32–41. Note that the locations of the $G0_v$ value in the Q Register overlap with that of the $G0_u$ value in the P Register to thereby facilitate the add step of the chrominance Stage C2 to provide one G1 value in the same location of bits 32–41 in the P Register. Thus, the contents of the P Register following Step C2 are shown as Register 86-C2 in FIG. 10, with the G1, B1 and R1 values stored together. Unused portions of Register 86C2 are shown shaded.

As also can be seen in FIG. 10, associated with each value stored in the registers are a number of Guard bits. The guard bits prevent data corruption by ensuring that arithmetic operations do not overwrite valid data.

Referring to FIG. 9B, in the first step of the Luminance Stage of the run time system the input 'Y' value is used to index Y_Table 42a and that output is stored in Q Register 84. In Step 2 of the Luminance Stage, the contents of the Q Register are added to the contents of the P Register by add unit 92 and the results are stored back in the Q Register 84.

Figure 11:
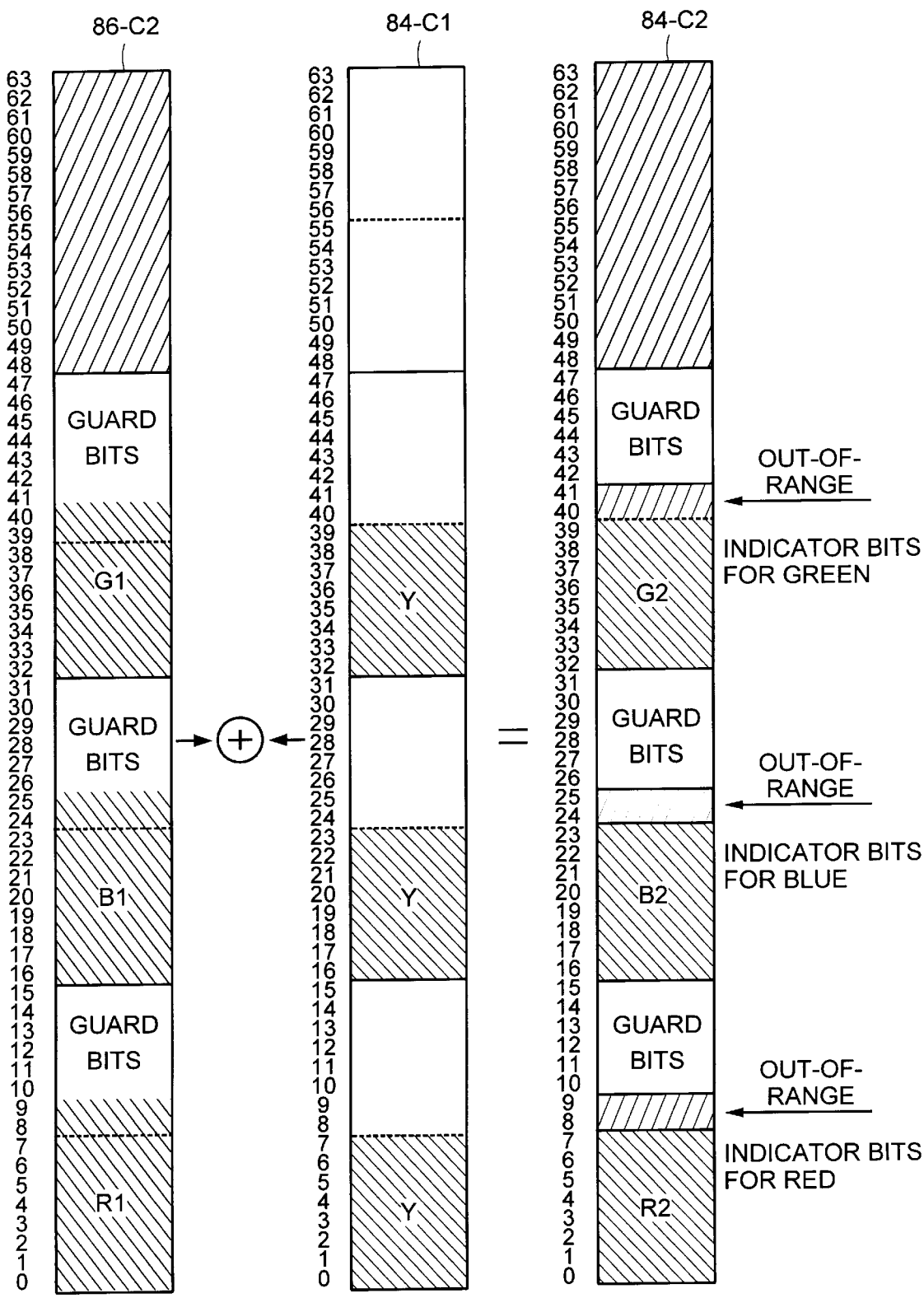
FIG. 11 is a diagram illustrating the register contents during the luminance stage of the run-time system shown in FIG. 9B.

Referring now to FIG. 11, the status of the 2 registers are shown at the end of their subsequent operations. The registers are labeled as 'register number-step number' for ease of explanation. At the end of step 2 of the chrominance Stage, the P Register 86-C2 stores values for R1, B1, and G1. At the end of the first step of the Luminance Stage, Register 84-L1 stores the replicated value of the Y input signal at fields 0 through 7, 16 through 23 and 32 through 39. As described above, the contents of Register 86 are then added to the contents of Register 84 to provide the report output labeled 84-L2 in FIG. 11. The resulting values are R2, B2, and G2; where the R2 field ranges in bits 0–7, the B2 field ranges from bits 16–23, and the G2 field ranges in bits from 32–39. The resulting contents of this register are precisely those that would result from executing the 3×3 matrix multiply provided in equation two, and are analogous to the R2, B2 and G2 signals emanating from the Luminance Stage 14 in FIG. 1.

As can be seen in FIG. 11, a portion of the allocation for the R2 value, namely bit fields 8–9 indicate an out of range value for the red field. Similarly, an out of range field of bits 24–25 is provided for the blue field, and an out of range field of 40–41 is provided for the green field. These bits identify whether or not the value needs to be truncated.

Referring back again to FIG. 9C, the R2, B2 and G2 fields are forwarded from Q Register 84 to the truncate stage 94. The proper range for the R, G, and B values is between 0 and 255. As noted earlier, it is possible that after the two previous arithmetic operations, the values for these variables are outside of the above range. For this reason, it is necessary to truncate the results provided from the Luminance Stage.

With normal values of UB, UG, VG, and VR, such as those provided above, the values of R2, G2, and B2, will never be greater than 511 or less than −256. For this reason, overflow and underflow conditions can be unambiguously detected by considering the two most significant bits of the ten bit values. Table III below this all possible four cases of these two bits;

TABLE III

| Out of Range Indicator Bits | Interpretation | Action |
|---|---|---|
| 00 | In proper range | none |
| 01 | Overflow | set to 255 |
| 10 | ** never occur** | none |
| 11 | Underflow | set to 0 |

For the case of 00, the data is in the range 0–255 and truncation need not be performed. For the 01 case, the data is between 256 and 511, so an overflow has occurred. The data, therefore, must be truncated to 255. For the case 11 binary, the data is negative and should be truncated to 0. Because of the range of possible data values, the case 10 binary will never occur and can thus be ignored. Referring again back to FIG. 11, the bits which were previously described as the out of range indicator bits for the green, blue and red fields are those bits which are compared against the table to determine the proper interpretation and perform the appropriate action to truncate or not truncate the bits.

Figure 12:
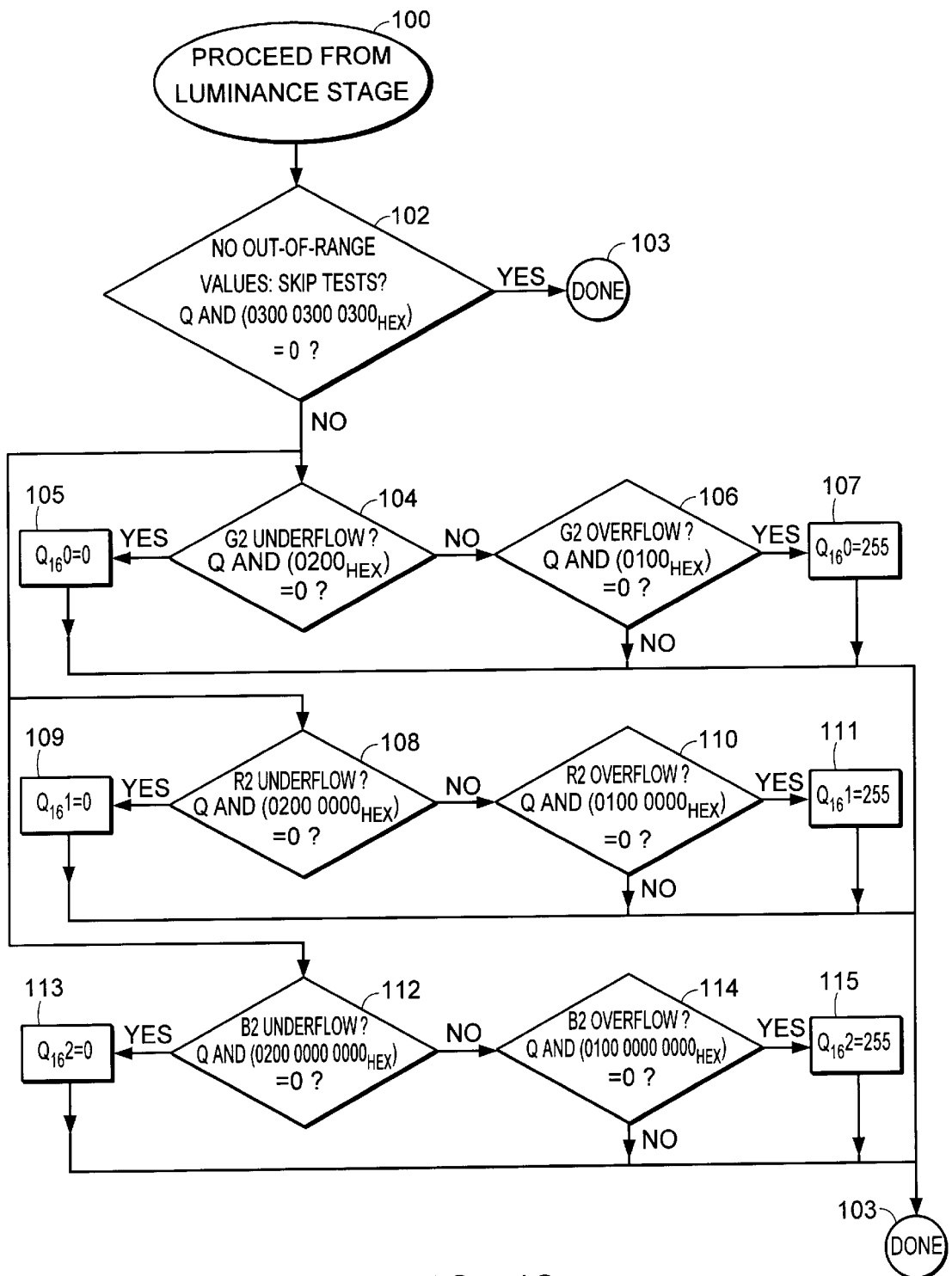
FIG. 12 is a flow diagram illustrating the truncate stage of the run-time system shown in FIG. 9C.

Referring now to FIG. 12, the exact process used by truncate stage 94 will be described. At step 100, the values from the Luminance Stage are input to the Truncate Stage. At step 102, a block check is performed to see if there are no out of range values and to determine if the Truncate Stage may be skipped. This first step is key to making the truncate stage run fast; checking for the case where all values are in the proper range, that is if all of the out-of-range indicator bits are zero. If all of the out-of-range indicator bits are 0, no more computation need be done, and the truncate process is completed with only one compare. Because the out-of-range indicator bits will both be equal to zero an overwhelming majority of the time, the short compare will be the only function performed the majority of the time, thereby maximizing performance.

The compare test is performed by ANDing the contents of Q Register 84 with the hexadecimal value 0300 0300 0300. If the output of the AND is a 0, then none of the bits in the out of range fields were set and the process is done at step 103.

However, if the result of that AND function is not a zero, then at step 104, the G2 bits are checked to determine if they are an underflow; i.e. the bits in the out of range field are equal to a 1 1. The contents of the Q Register are ANDed against a 0200 hexadecimal to determine if it was equal to zero. Note, that since the condition 1 0 will never occur, it is sufficient to merely test the most significant bit of the out of range indicator bits to determine whether there is an underflow. If there is an underflow, then at step 105 the contents of the low order 16 bits of the Q Register ($Q_{16}0$) are set to zero.

If, however, there is no underflow, then at step 106, it is determined whether there is an overflow by ANDing the contents of the Q Register with the value 0100 hexadecimal. If the result is not equal to a zero, then that indicates that there is an overflow and the contents of the Q Register for the green segment are limited to 255 at step 107. If there is no overflow, then the process is completed for the G bits and goes to step 103. Simultaneously, with the truncation evaluation of the G field is the evaluation of the B2 field and R2 field for underflow and overflow.

The exact same process described above with regards to step 104–107 is performed on the R2 field where the R2 field at steps 108–111, where in the case of an underflow, the R2 field of Register 84 is set to a zero, and in the case of an overflow, the R2 field of Register 84 is set to a 255. In addition for the B2 data, the out of range indicator bits are checked for overflow and underflow conditions at steps 112–115 with the blue segment bits being set to a zero in the case of an underflow and the blue segment bits being set to 255 in the case of an overflow at step 115.

When the truncation evaluation has completed for each of the data segments, the process is finished at step 103 and a thorough translation from YUV to RGB has been performed.

It should be noted that although the above method for truncation has been described, the present invention should not be limited to this embodiment, as other methods of truncating data are well known to those in the art.

Note that the present invention provides for translation of YUV to RGB using only two table lookups and one add for the chrominance Stage and one table lookup and one add for the luminance Stage. In a system where chrominance subsampling is used, the delay imposed for the chrominance stage will only be incurred for a subset of the pixels input. Thus the present invention is able to provide dramatic performance results for translation purposes. Referring now to Table IV below, the above chrominance subsampling chart put forth in Table I has been expanded to show the number of operations that need be performed by the run time system to provide YUV to RGB conversion:

TABLE IV

| chrominance Subsampling Span | Table Look-ups per pixel | Additions per pixel |
| --- | --- | --- |
| 1 × 2 | 2 | 1.5 |
| 2 × 2 | 1.5 | 1.25 |
| 4 × 4 | 1.125 | 1.0625 |

Therefore it can be seen that the present invention is able to perform YUV to RGB dematrixing in a remarkably small number of operations: between 1 and 2 table references and between one and 2 additions per input pixel on average.

In the majority of cases, the truncate stage will also be extinguished with only one AND function, while at a maximum, 3 ANDings will be performed in the Truncate Stage. Thus, the translation is provided with a minimum use of hardware (since only two register are used to store the intermediate results) and uses minimum complexity to provide maximum speed in the translation process.

Byte Packing in a 64 Bit System

Referring again to FIG. 9C, it may occur that although the Q Register contains valid range checked R, G, and B values after the truncation step, that this data may not be useful for subsequent processes that require byte packing. Many, though not all, processes expect the RGB data to be in byte packed with R in bits 0–7, G in bits 8–15, and B in bits 16–23. Therefore an optional byte-packing stage 96 is shown coupled to the truncation stage for performing this function.

Figure 13A:
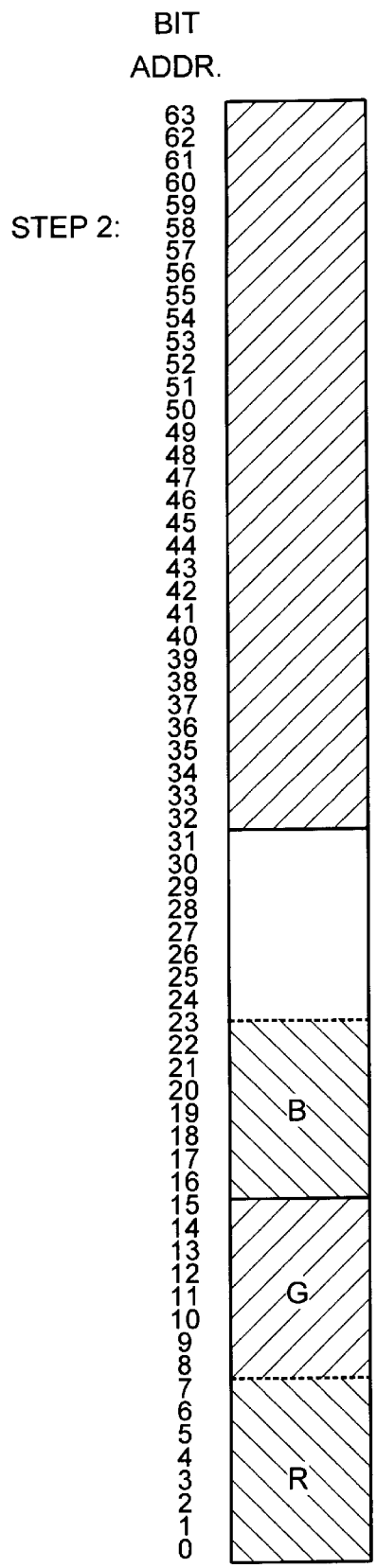
FIG. 13A is a diagram illustrating the register contents following byte packing/re-ordering stage of the run time system of FIG. 9C.

The present invention facilitates byte packing because each of the respective RGB values are spaced apart in their storage in the Q Register such that there is an 8 bit space between the R value and the B value. Thus, for processors that require byte packing, a G value may easily be swapped to fit in byte placements 8–15 of the Q Register to provide packed output in the range of bit 0–23 as expected by those processors that require it. Referring now to FIG. 13A, a byte packed representation of the Q Register is provided.

Upon completion of the byte-packing, the 32-bit quantity $Q_{32}0$ holds the 24-bit RGB data in a standard form for subsequent use. Thus it can be seen that, by storing the original dematrixing data in the appropriate locations of the calculation registers, the byte packing process can be performed using a simple swap.

GBR Byte Ordering in a 64 Bit System

Figure 13B:
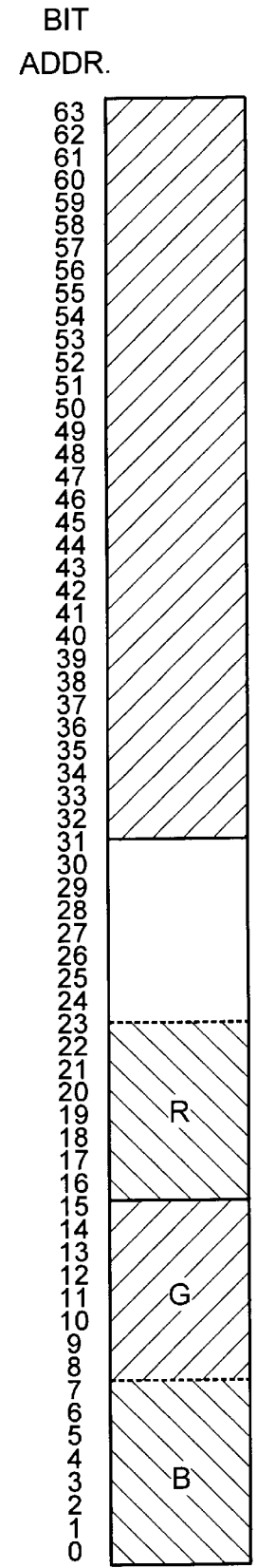
FIG. 13B is a diagram illustrating the register contents following a GBR byte ordering performed by the byte packing/reordering stage of FIG. 9C.

The most common form of byte-packed RGB data is as shown in FIG. 13A. Occasionally, however, applications may require "GBR-ordered" output as shown in FIG. 13B, with the B field value being stored in bits 0–7, the G field value being stored in bits 8–15 and R field being stored in bits 16–23. This alternate form of output is may easily be provided by the run-time system by modifying the order of the components in the U Table and the V Table.

To change the order of components in the U Table and the V Table, the U Table Collator and the V Table Collator blocks 44 and 46, respectively of FIG. 4 must be modified.

Figure 14:
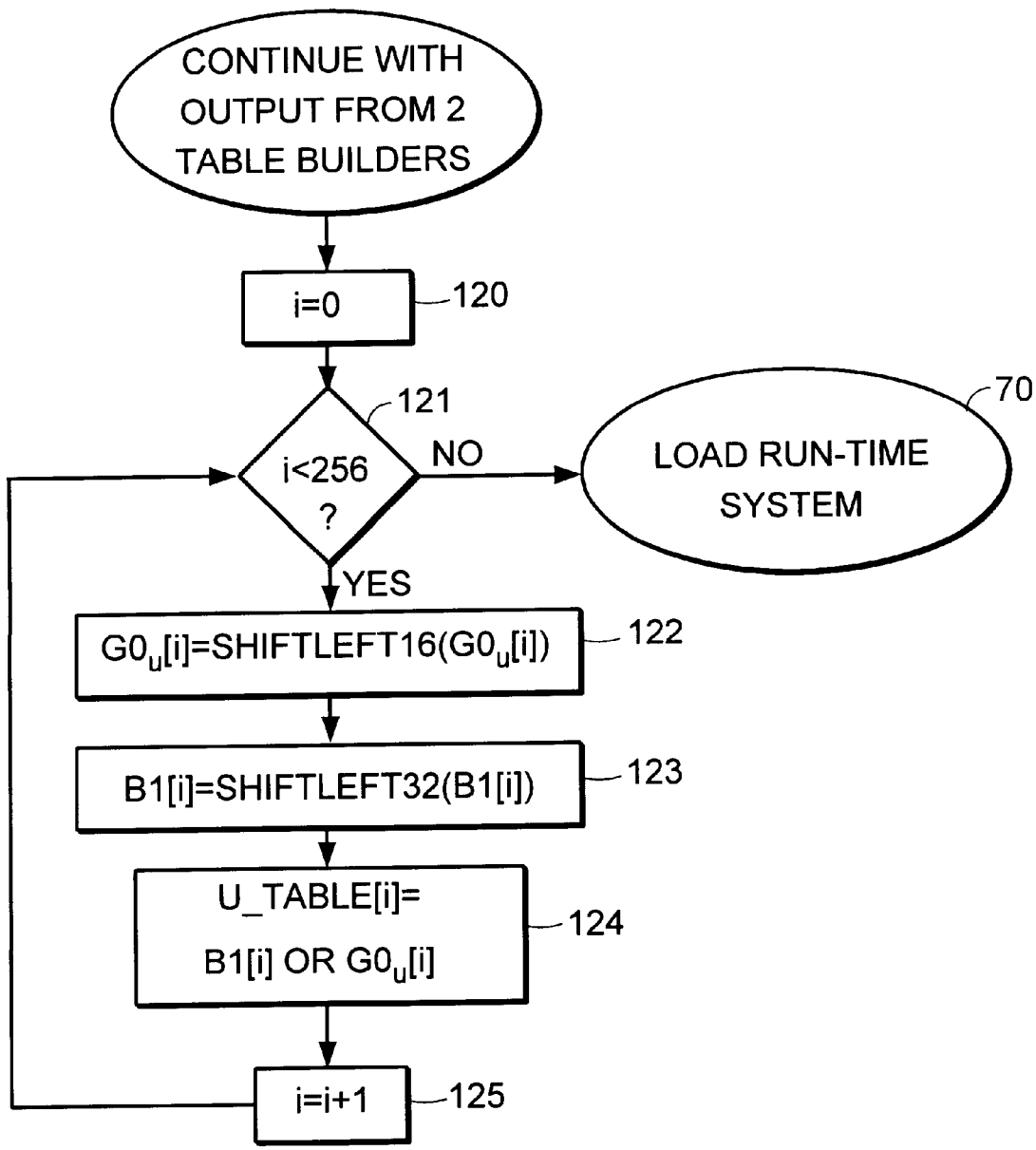
FIG. 14 is a flow diagram illustrating the process required to have the U Table Collator of FIG. 4 provide data in GBR-ordered format.

A modification of the U Table Collator process which enables the run-time system to provide GBR ordered output is shown in FIG. 14. As described previously, at step 120, i is set to zero and at step 121, i is compared against 256 to determine if every element of the table has been collated. At step 122, the $G0_u$ value for this element is shifted left by 16 and at step 123, the B1 element is shifted left by 32. Note that the difference between the GBR ordered U Table Collator is the amount of the shift of the G and the B element values. In the RGB format shown in FIG. 6, the G value is shifted left by 32 and the B value is shifted left by 16. Thus, the effect is to switch the order of the G and the B in the GBR-ordered U Table Collator. At Step 124, the result of the U Table is found by ORing the B1 value with the $G0_u$ value.

This process continues for each element of the table until at step 121 it is determined that all of the elements have been addressed and the run time system may be loaded at step 70.

Figure 15:
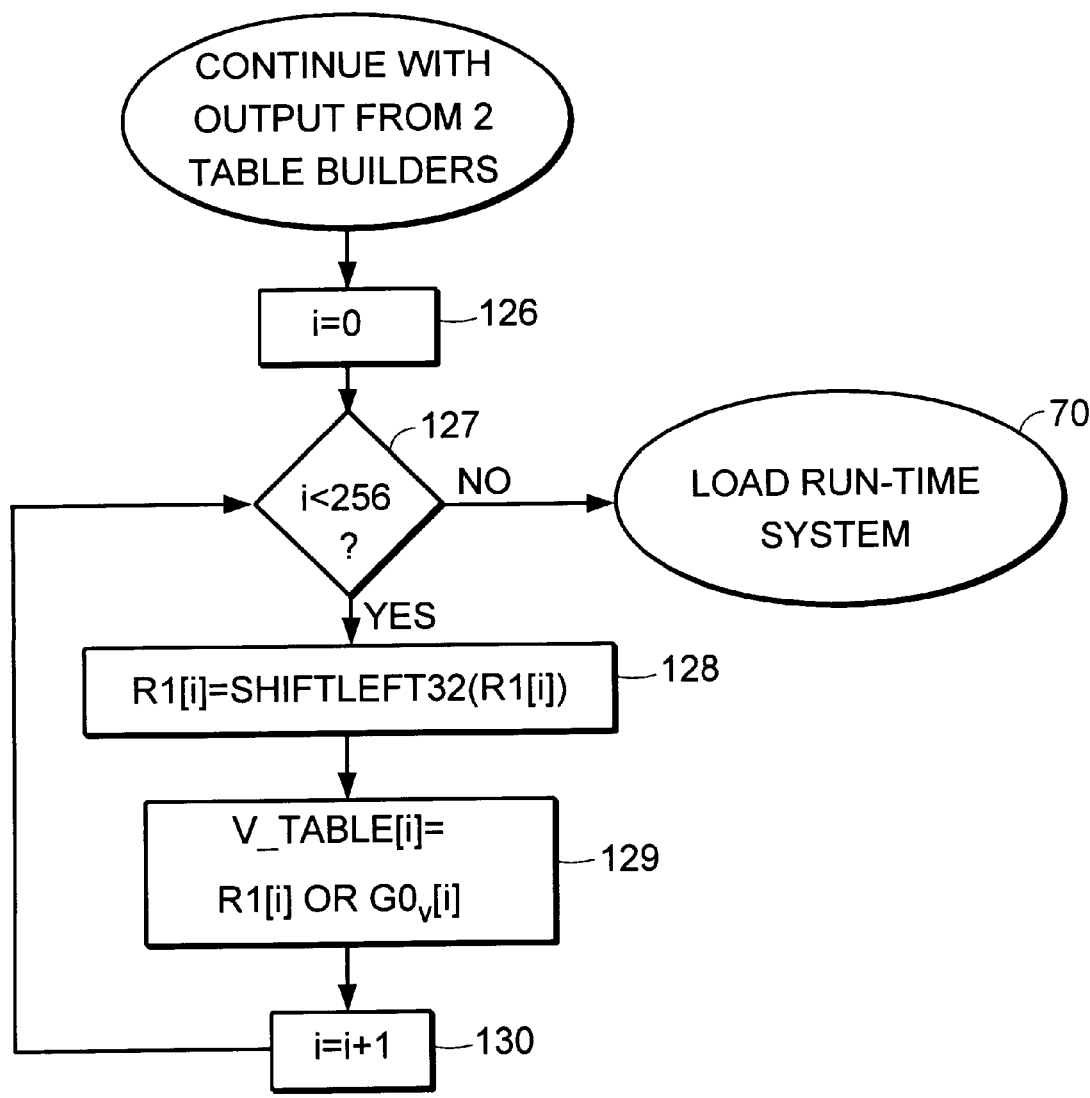
FIG. 15 is a flow diagram illustrating the process required to have the V Table Collator of FIG. 4 provide data in GBR-ordered format.

Referring now to FIG. 15, the process by the V Table Collator when providing GBR ordered output is shown. At steps 126 and 127, i is initialized and then it is checked against the value of 256 to determine if every element in the table has been collated. If every element in the table has not been collated, then at step 128, the R1 value shifted left by 32 and at step 129, the V_Table entry for that element number i is provided by oring the R1 value with the $G0_v$ value. It is noted that this process differs from the previous RGB because it is the R value that is shifted left 32 rather than the G value. This process is repeated until at step 127 it is determined that every element in the table has been collated, when at step 70 the runtime system can be loaded.

Figure 16:
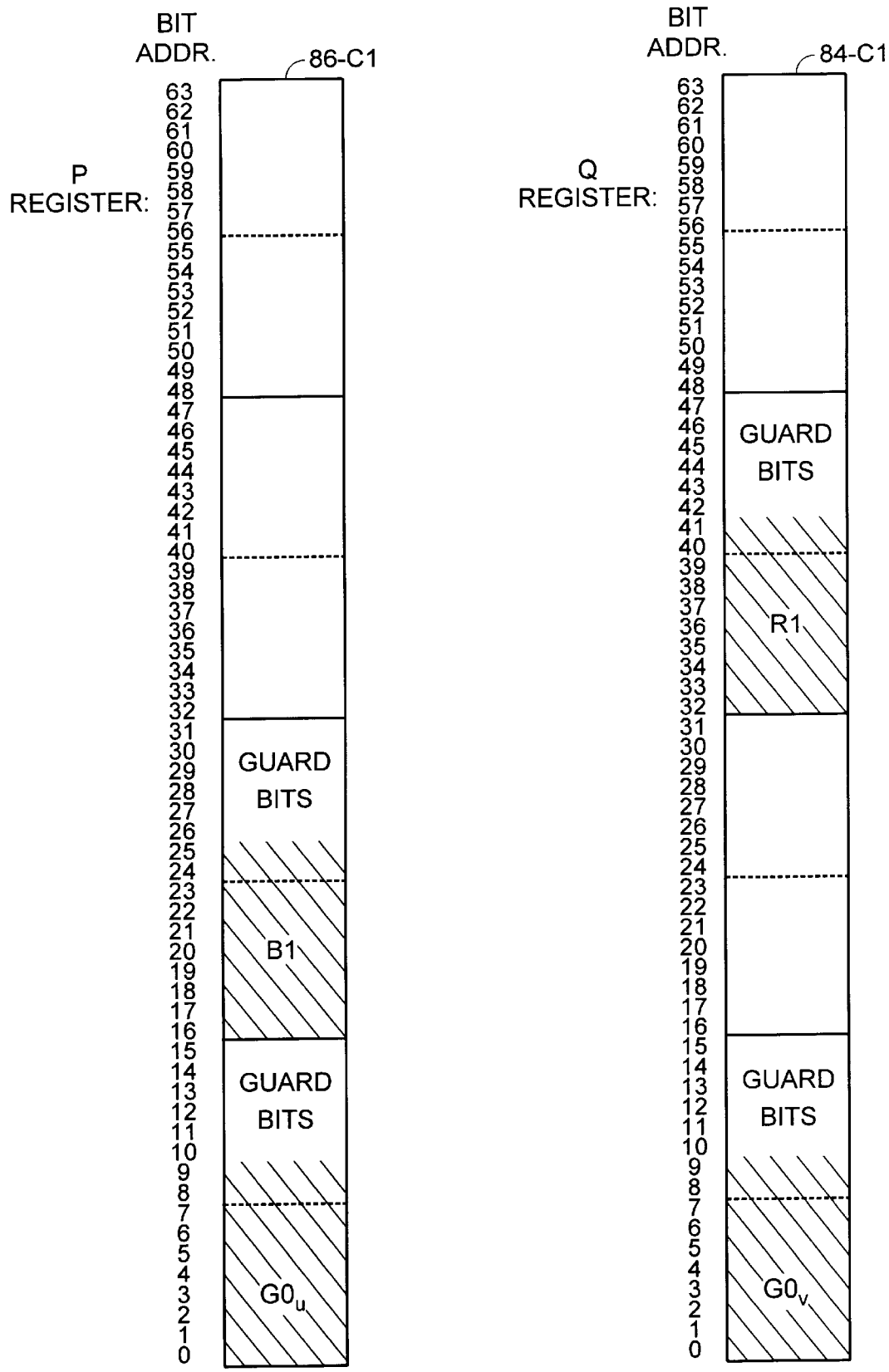
FIG. 16 is a diagram illustrating the register contents following the first step of the chrominance Stage for GBR-ordered format in the 64 bit implementation of FIG. 9A.

Referring now to FIG. 16, the content of the P and Q Registers after the GBR-ordered chrominance Stage are shown. Note that in the second step of the chrominance Stage, when the two register contents are added, the results that will be stored in the P Register are G1 stored in bits 0–9, B1 stored in bits 16–25, and R1 stored in bits 32–41. The data is then passed to the Luminance Stage (FIG. 9B), the Truncate Stage 94, and the Optional Byte Packing stage 96. The results, after byte packing, are shown in FIG. 13B.

Single Register chrominance Stage 64 Bit Implementation

Referring now to FIGS. 17A–17C, another embodiment of the Run-Time System, which uses only one 64 bit register 138 in an alternative chrominance stage is shown to include a chrominance stage (FIG. 17A), a luminance stage (FIG. 17B) and a truncate/byte packing stage (FIG. 17C). This embodiment differs from that described above in that the U and V tables comprise only 32 bits of data per table entry. Although each stage of run-time system is illustrated separately it is to be understood that the hardware is common to each stage. It is noted that this embodiment may be useful for applications which have strict hardware constraints.

The alternative chrominance run-time system is shown to include a U_table 34 and a V_table 132. Note that the V_table and the U_table are different than those shown in earlier FIG. 10.

Figure 18:
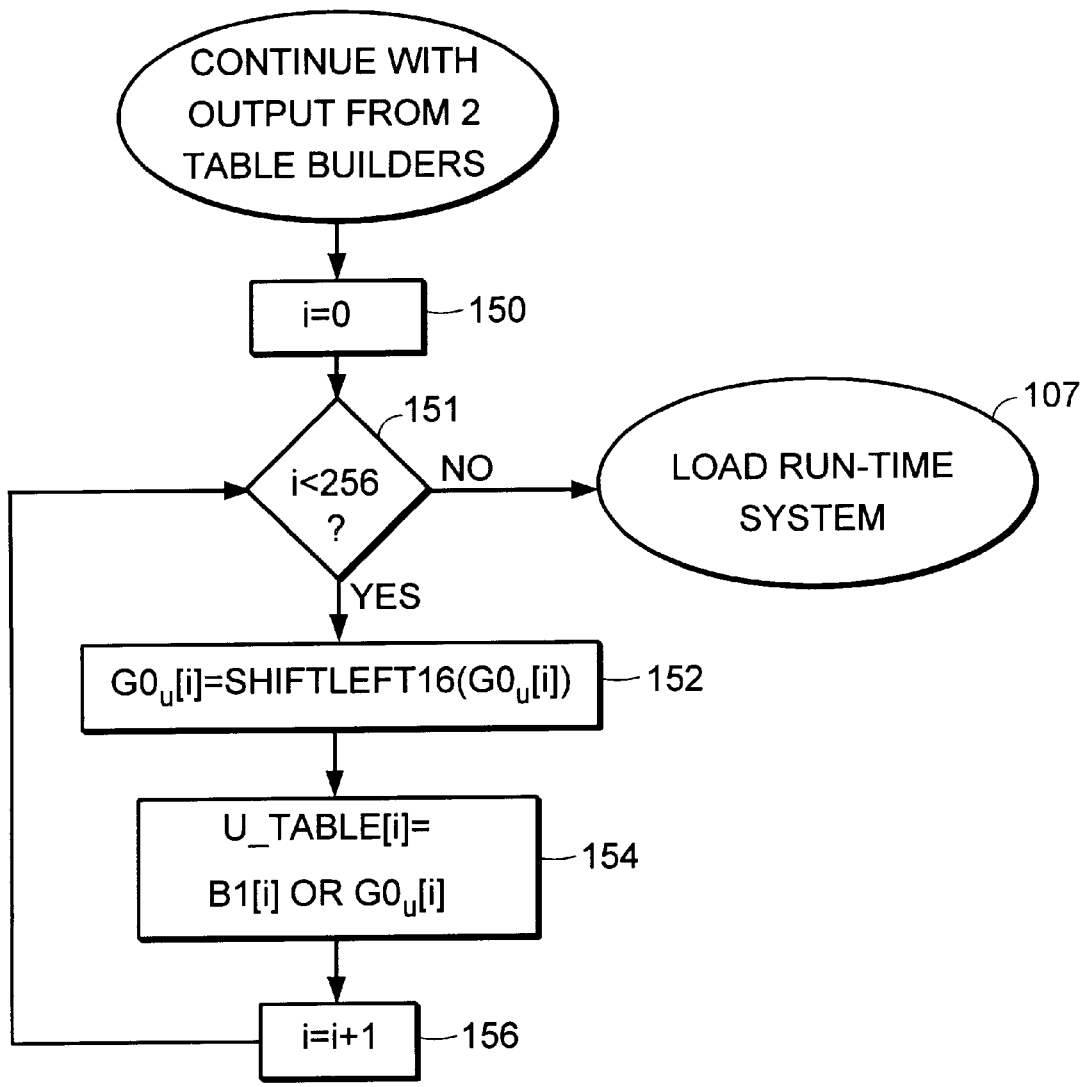
FIG. 18 is a flow diagram illustrating the process used by U Table Collator for preparing data to be used in the 64 bit implementation of the run time system shown in FIGS. 17A–17C.

To arrange the fields in the U_table and V_table for this method, there need only be changes to the procedures executed by the U_table collator and V_table collator. Referring now to FIG. 18, the process used for the U_table collator for the alternative chrominance stage is shown to be substantially similar to that performed by the U_table collator in the first embodiment (FIG. 7). However, in this embodiment, for each element the $G0_u$ value is shifted left by 16 at step 152, where it is then ORed with the B1 value at step 154. Note that this differs from the previous embodiment because the B1 value is not shifted and the G0 value is shifted by a lesser amount.

Figure 19:
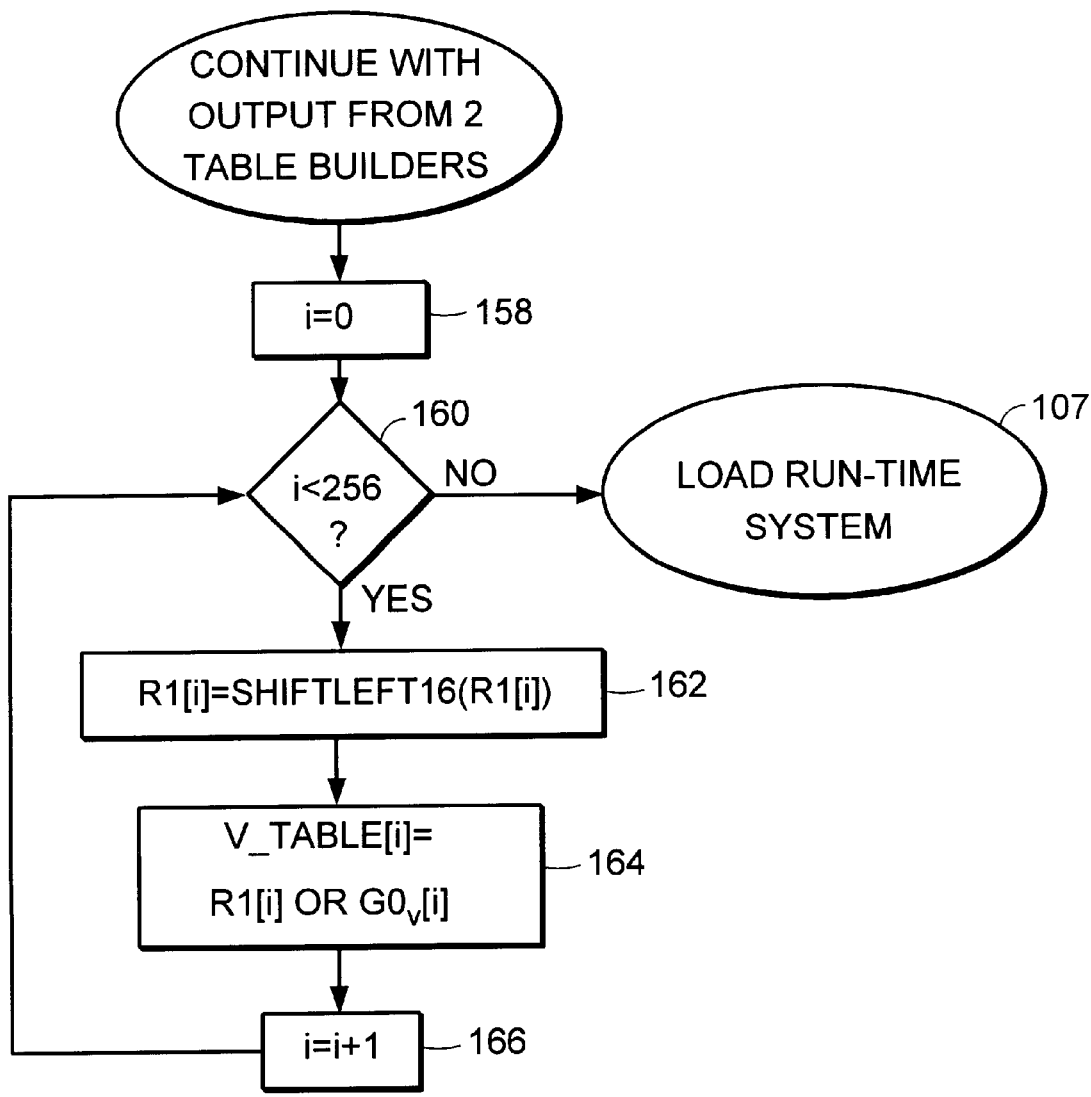
FIG. 19 is a flow diagram illustrating the process used by the V Table Collator for preparing data to be used in the 64 bit implementation of the run time system shown in FIGS. 17A–17C.

Referring now to FIG. 19, the process used for the V_table collator during the alternative chrominance stage is shown. This process, again, is substantially similar to that used by the V_table collator of the first embodiment (FIG. 8) except that the R1 value is here shifted left by 16 at step 162, while the G0 value is not shifted. At step 164 the R1 value is ORed with the G0 value and the results are stored in the V_table.

Figure 20:
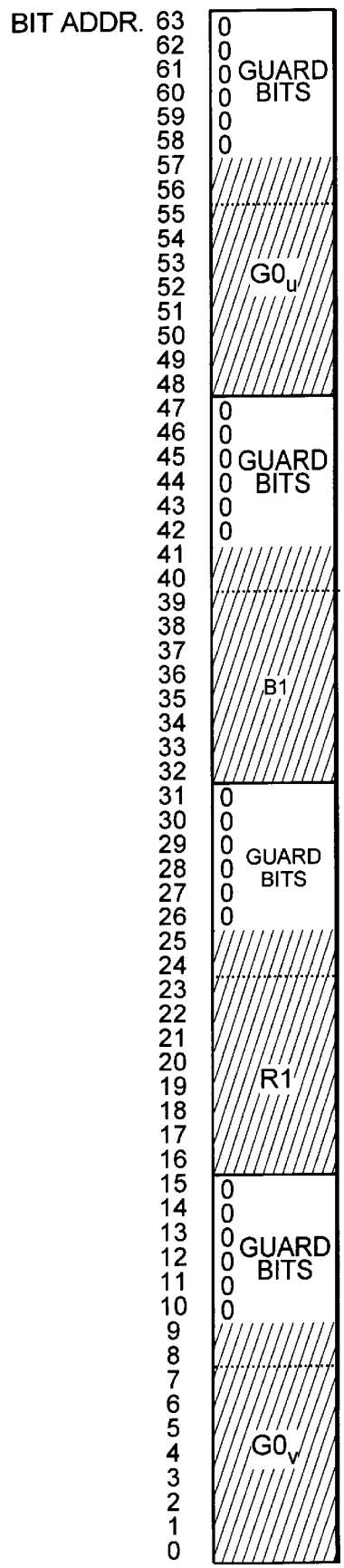
FIG. 20 is a diagram illustrating the register contents following the first step of the chrominance stage of the alternate embodiment of FIG. 17A.

Referring again briefly to FIGS. 17A–17C, during the first step of the chrominance Stage, the V input signal addresses the V_table to output data into register 138. In addition, the U signal is used to access U table 134 to provide data to register 138. Register 138 is a 64 bit register which is apportioned into two 32 bit segments. Data from the U_table is placed in bits 0–31 while data from the V_table is placed in bits 32–63. Referring now briefly to FIG. 20, the arrangement of the $G0_u$, B1, R1, and $G0_v$ fields is shown for register 138, after the completion of the first step of the chrominance Stage.

During the second step of the chrominance Stage, the bits from location 48–63 ($Q_{16}3$) of Register 138 are added to the bits stored in location 0–63 ($Q_{64}$) of Register 138, and the results are stored in bit locations 0–63 ($Q_{64}$). The Luminance Stage is performed identically to that described previously. Thus, Y values stored in bits 0–15, bits 16–31 and bits 32–47 are added to the respective G1, R1 and B1 field to produce outputs G2, R2 and B2. This data is then forwarded to the truncate stage, which operates as described previously in the flow diagram of FIG. 12.

After the truncation stage, the G output value is stored in bits 0–7, the R value at bits 16–23 and the B value in bits 32–39.

Figure 21:
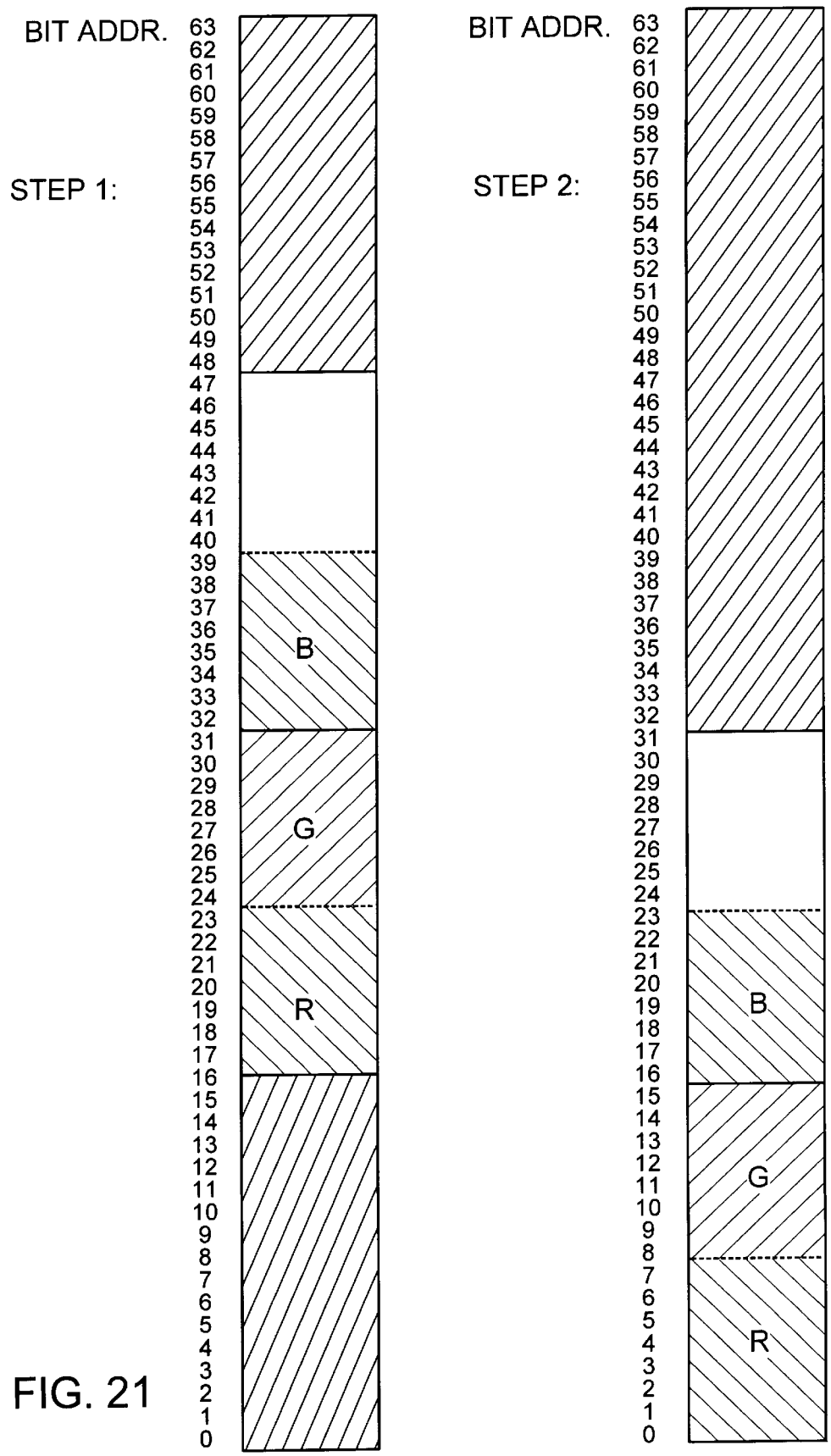
FIG. 21 illustrates the contents of a register after RGB Byte-Packing stage in the embodiment shown in FIG. 17C.

Referring now to FIG. 21, it can be seen that byte packing may be easily implemented in the alternative chrominance embodiment by moving the G bit from bit location 0–7 to be stored at location 24–31 of the register. After moving these G bits, the entire register is shifted right by 16 to provide appropriately packed RGB data for execution.

The alternative chrominance stage may also be easily adapted to provide GBR packed output, using the U and V tables previously described.

Note that at this point, two embodiments have been put forth that provide 64 bit YUV to RGB/GBR translation. However, it should be noted that many of the present architectures do not have 64 bit registers available. Therefore a fast and efficient method for providing translation using only 32 bit registers is provided below.

Color Conversion in a 32 Bit System

The 32 bit system for YUV to RGB color conversion is similar to the above described 64 bit system in that it includes a table generating system for providing Y_table, U_table and V_table data to a run-time system. The run-time system uses the YUV input signals with these tables to provide RGB output. However, the 32 bit system may be used in computer systems that implement a 32 bit architecture and are thus restricted to a register size of 32 bits in the run-time system.

Figure 22:
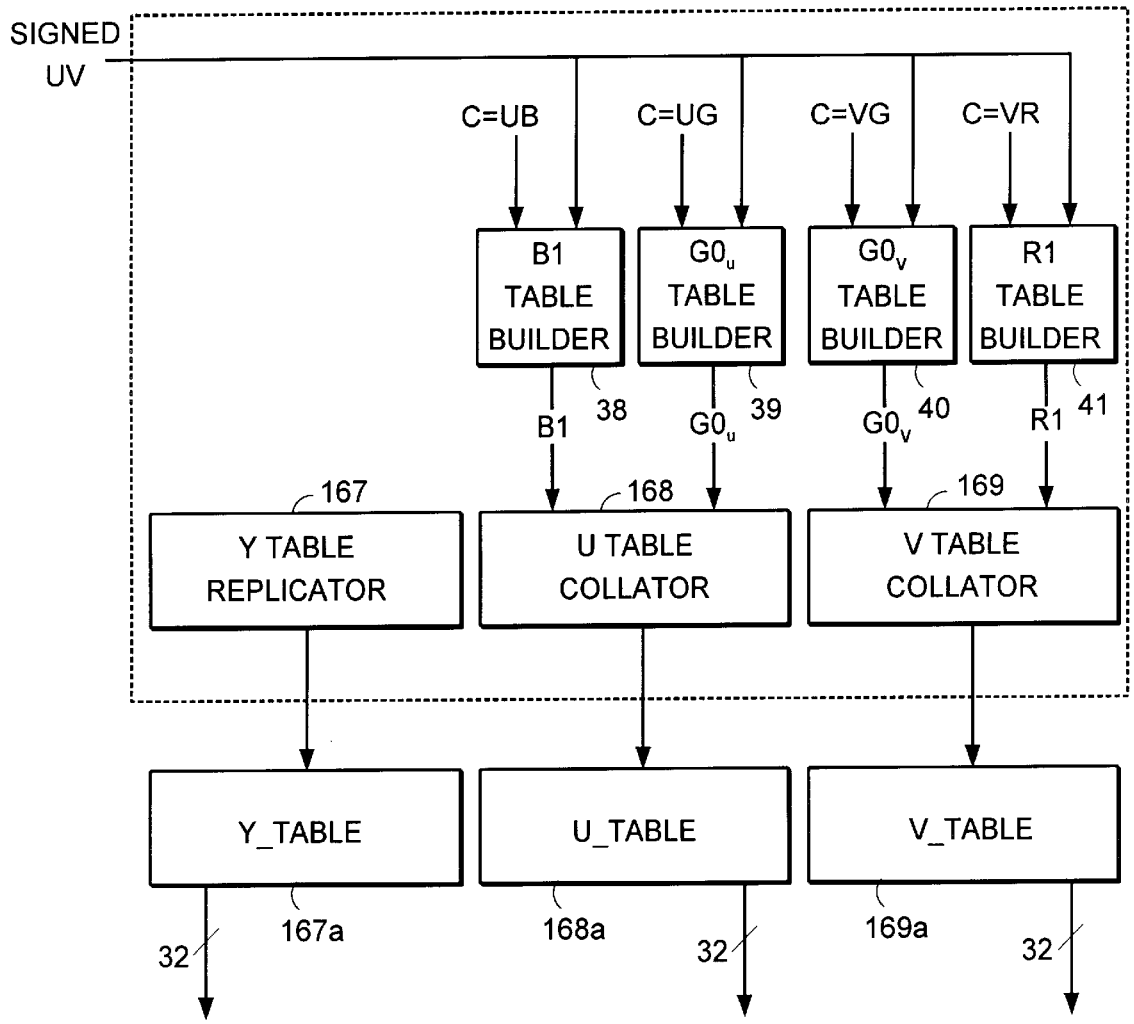
FIG. 22 illustrates a color conversion process for use in a 32 bit graphics system.

Referring now to FIG. 22, the table generation system for the 32 bit system is shown to similarly includes a B1 table builder 38, a $G0_u$ table builder 39, a $G0_v$ table builder 40 and an R1 table builder 41. Each of these table builders provides outputs B1, $G0_u$, $G0_v$, and R1 to table collators 44 and 46.

In addition, the 32 bit embodiment similarly includes a Y_table replicator 42. However, the Y_table replicator for the 32 bit embodiment operates slightly different than that for the 64 bit embodiment, because the Y values must be placed in different locations for access by a 32 bit register.

Figure 23:
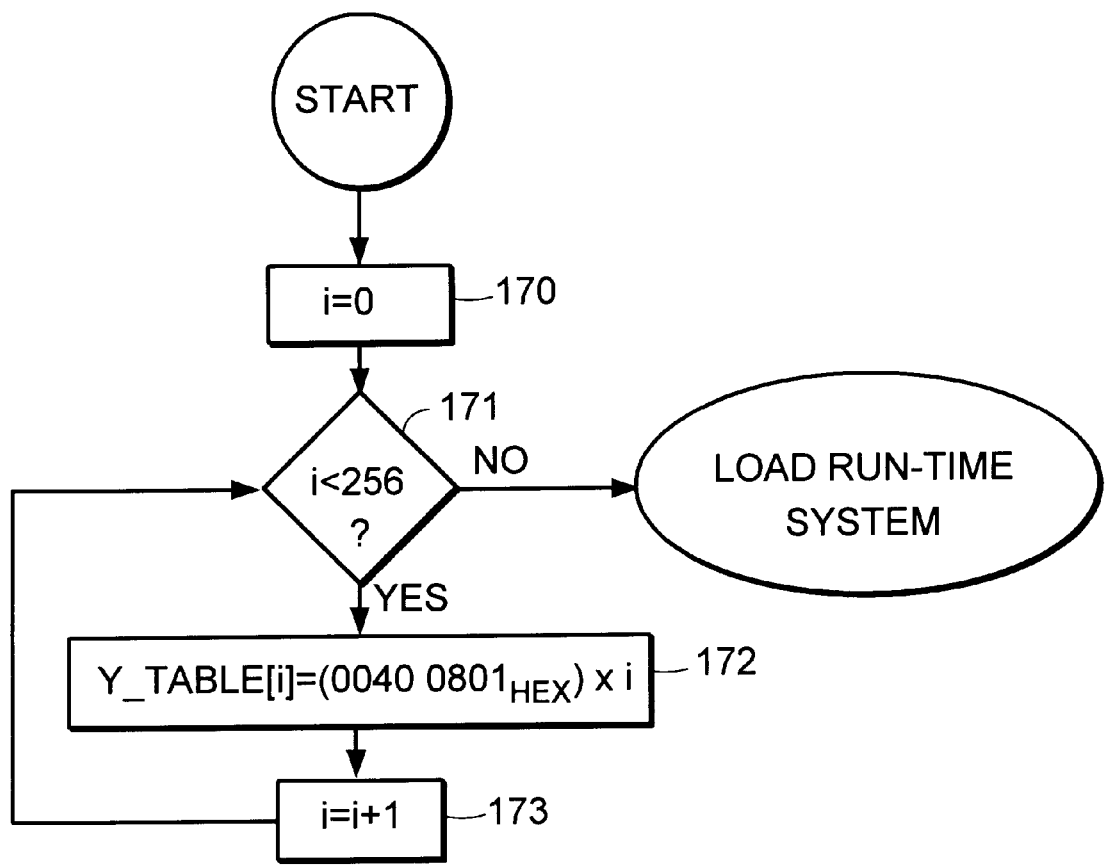
FIG. 23 illustrates the process used by the Y Table Replicator in the 32 bit color conversion process of FIG. 22.

Referring now to FIG. 23, the process used by the Y_table replicator to generate a Y table for the 32 bit embodiment, is shown to include the steps of initializing i at step 170 and comparing i with the value 256 to determine whether the entire table has been created. At step 172, the Y_table entry is calculated by multiplying i with the value 00400801 hexadecimal. In doing so, the Y value is replicated in three locations at the appropriate bit locations of a 32 bit field. At step 173, i is in commanded and this process continues for each i input until the entire Y_table has been generated.

Referring back again to FIG. 22, it should be noted that the table builder blocks 38, 39, 40 and 41 are operated identically with that process that was described with regard to FIG. 6. Thus, the operation of the table builders will not be described again in detail for the 32 bit embodiment.

After each of the four tables is built, control passes to table collators. There are two table collators, as shown in FIG. 22; one for the U_table which collates the B1 and $G0_u$ table and one for the V_table which collates the $G0_v$ and R1 tables.

Figure 24:
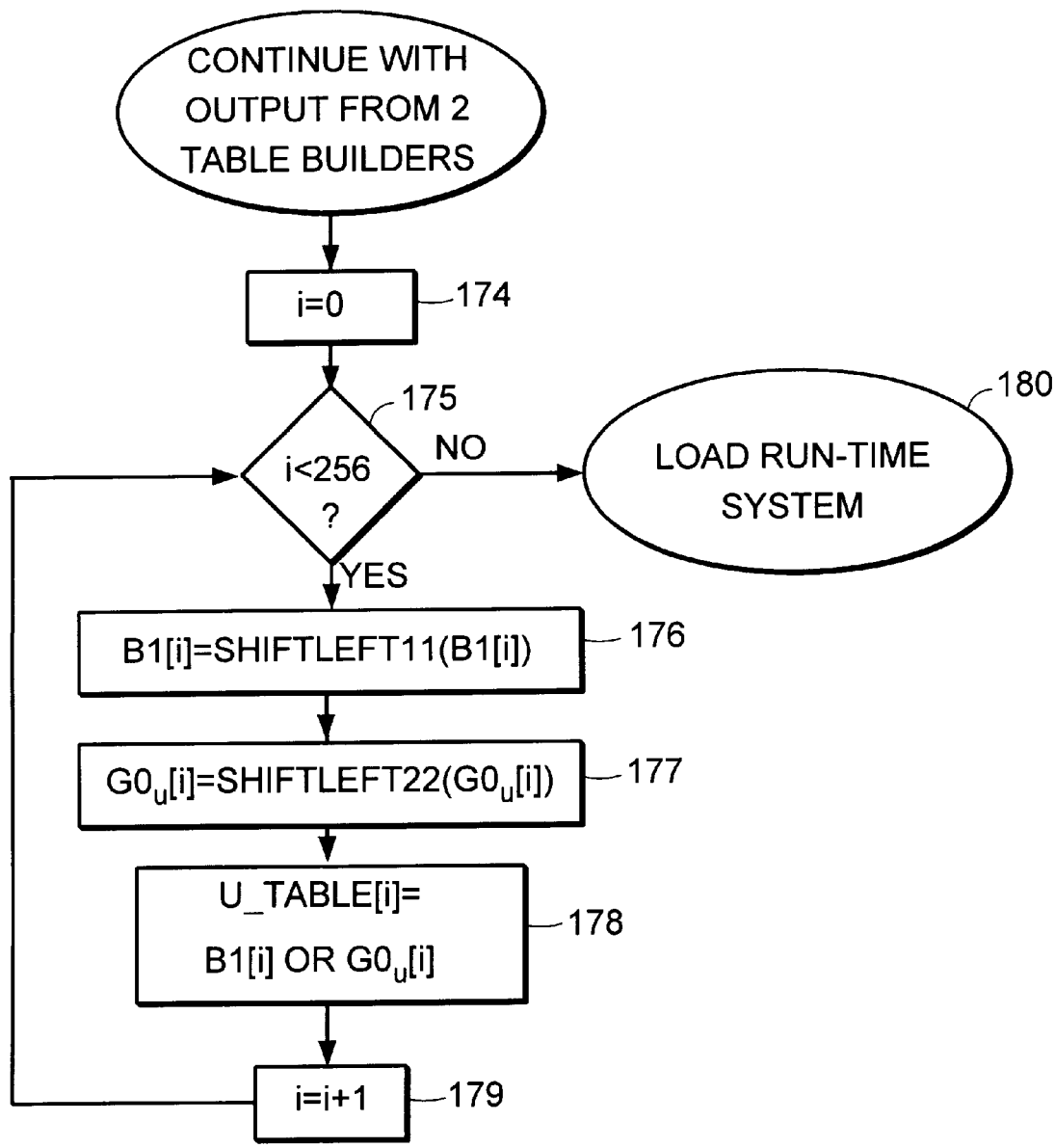
FIG. 24 is a flow diagram of the process used in a U Table Collator of the 32 bit color conversion process of FIG. 22.
Figure 25:
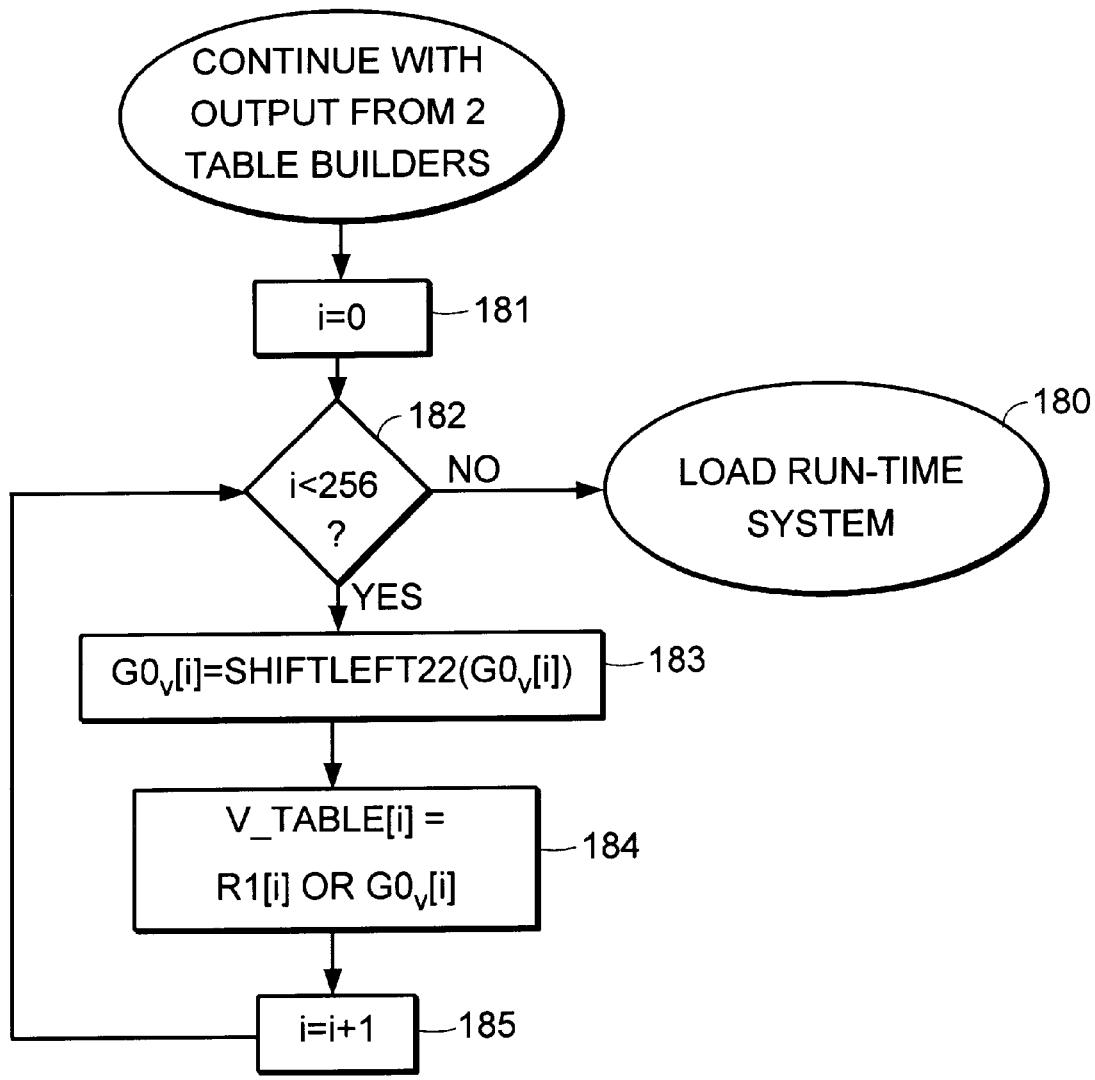
FIG. 25 illustrates the process used by the V Table Collator in the 32 bit color conversion system of FIG. 22.

The process used to by the table collators to modify the output of the table builders to position the bit field in the appropriate location is shown in FIGS. 24 and 25. FIG. 24 illustrates the process used by the U_table collator to position the B1 values and $G0_u$ values in the U_table. At step 174, the table index i is set to zero and, at step 175, it is compared against the table size of 256 to determine if every entry in the table has been collated.

If not every entry has been collated, then at step 176, the B1 value received from the table builder, is shifted left by 11. At step 177, the $G0_u$ value received from the table builder for the $G0_u$ entry, is shifted left by 22. Then, at step 178, the U_table entry is obtained by ORing the two outputs of the shift operations together. This process continues for every entry of the table.

Referring now to FIG. 25, at step 181, i is initialized and at step 182, it is determined whether every entry in the table has been analyzed. At step 183, if there are still elements of the table to analyze, the $G0_v$ value, received from the $G0_v$ table builder, is shifted left by 11. The V_table entry is then provided at step 184 by ORing the results of the shift operation together with the R1 value. This process continues for every element of the V table.

Figure 26B:
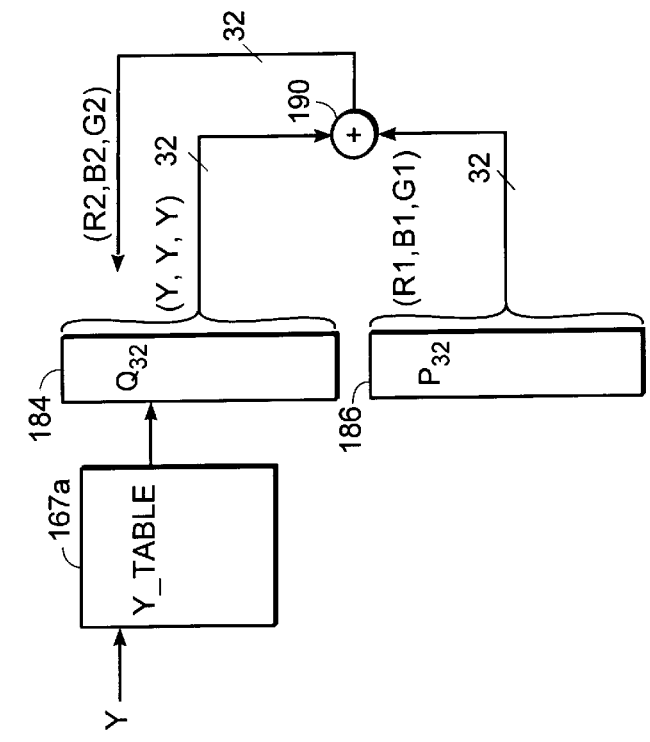
FIGS. 26A–26C are block diagrams illustrating the process used to provide color conversion system for a 32 bit graphic system.
Figure 26A:
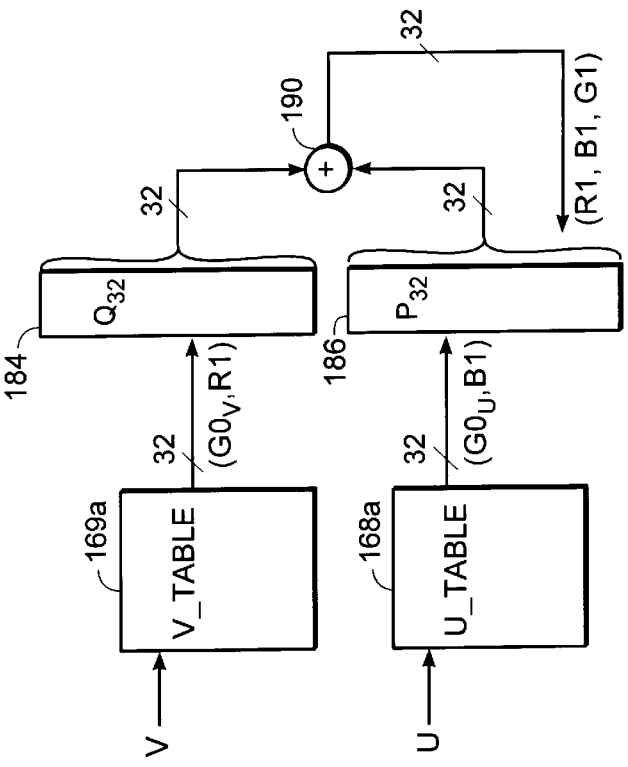
Figure 26C:
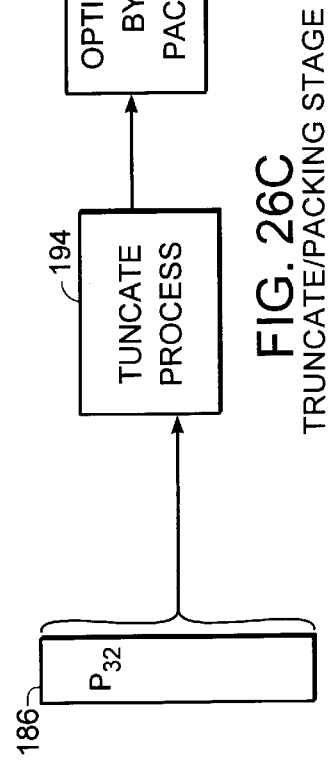

Referring now to FIGS. 26A–26C, after each of the tables has been generated, the Y_table, U_table and V_table may be forwarded for use in a 32 bit run-time system. The 32 bit run time system is shown to include a chrominance stage (FIG. 26A), a luminance stage (FIG. 26B) and a truncate/packing stage (FIG. 26C). Although each stage of runtime system is illustrated separately it is to be understood that the hardware is common to each stage. The run-time system for the 32 bit run-time system includes two registers, a 32-bit P Register 186 and a 32 bit Q register 188.

Figure 27:
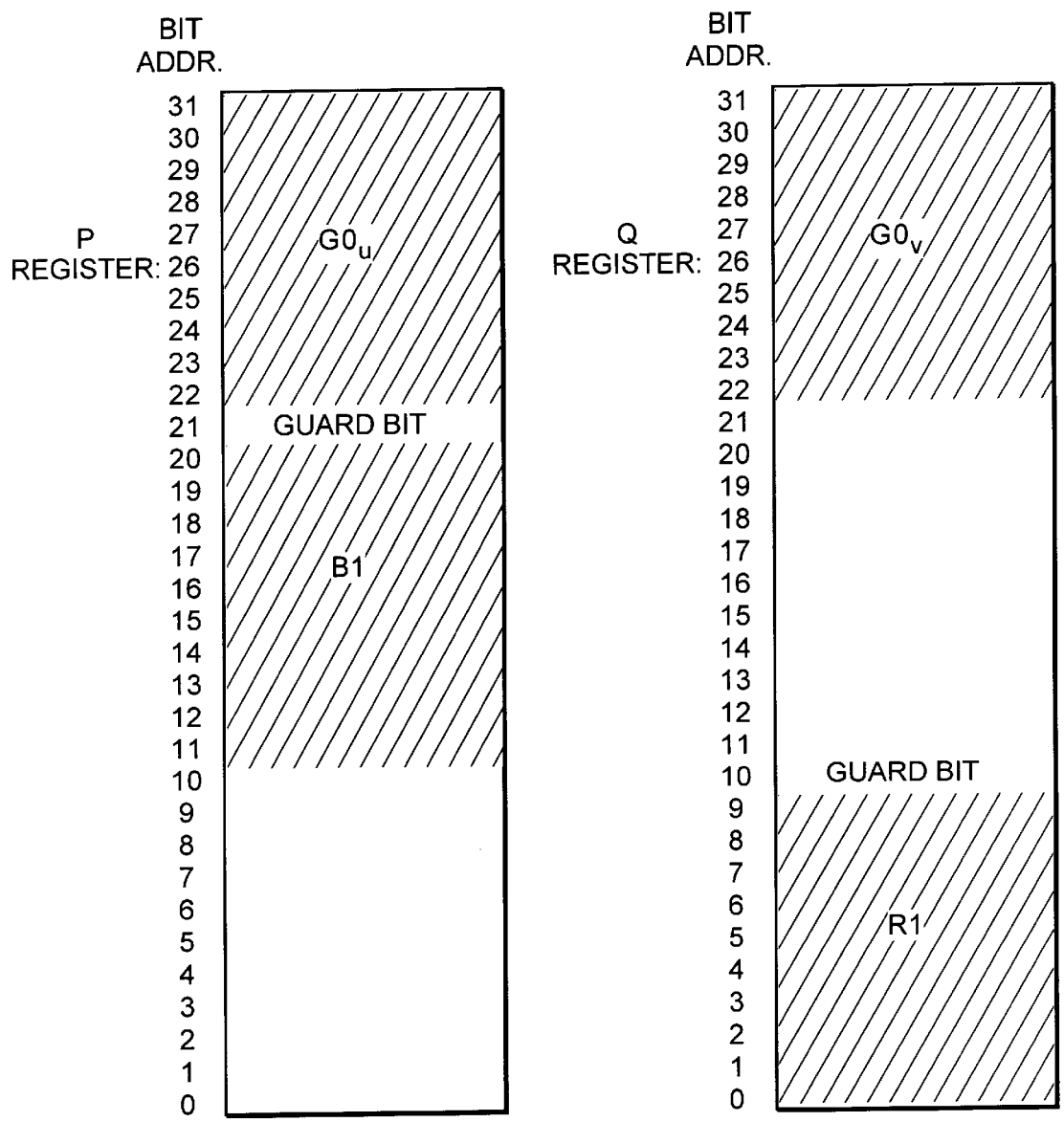
FIG. 27 illustrates the content of registers following the first step of the chrominance stage FIG. 26A.

During the first step of the chrominance Stage of operation, the U input as it is fed in is used to access the U_table 168a to provide output to register 186. The input V is used to access V_table 169a to provide output to register 184. The resultant register contents are shown bit fields as indicated in FIG. 27. As shown, register 186 stores the B1 field at bits 11–20, while the G0$_u$ field occupies bits 22–31. One guard bit 21 is used to protect arithmetic overflow from corrupting the two data values. Register 184 stores the R1 bits at bit fields 0–9, while the G0$_v$ bits are located in bits 22–31.

During the second step of the chrominance Stage, the value in the Q register is added with the value in the P register, and the result is stored back into the P register 186. The results of the second step of the chrominance Stage are shown in FIG. 28, where the values for bit field R1 are stored in bits 0–9, the values for bit field B1 are stored in bits 11–20, and the values for bit field G1 are stored in bits 22–31.

As described earlier, with reference to the 64 bit process, during the Luminance Stage, the values from the Y_table are stored in register Q 184. The results of this operation are seen in FIG. 28 designated by register 184-L1. During the second stage of the Luminance Operation, the contents of Register 186 after the second chrominance step are added with the contents of Register 184, and the result in stored back in Register 184, with the resulting data fields represented by Register 184-L2. Note that the red values are stored in bit area 0–9, the blue values are stored in bit area 11–20 and the green indicators bits are stored in fields 22–31.

As shown in Register 184-L2, bits 8 and 9 of the red bit indicators are out of range bit fields which will be used to determine the truncation for the red value. Similarly, bits 19–20 are out of range indicator bits, the blue field and bits 30 and 31 are the out of range indicator for the green field. These two bits of each field will be evaluated to determine the appropriate truncation in the truncate stage 194 of the process. The interpretation of the out of range indicator bits for the 32 bit process is identical to that described with regard to the 64 bit process in Table III above.

Figure 28:
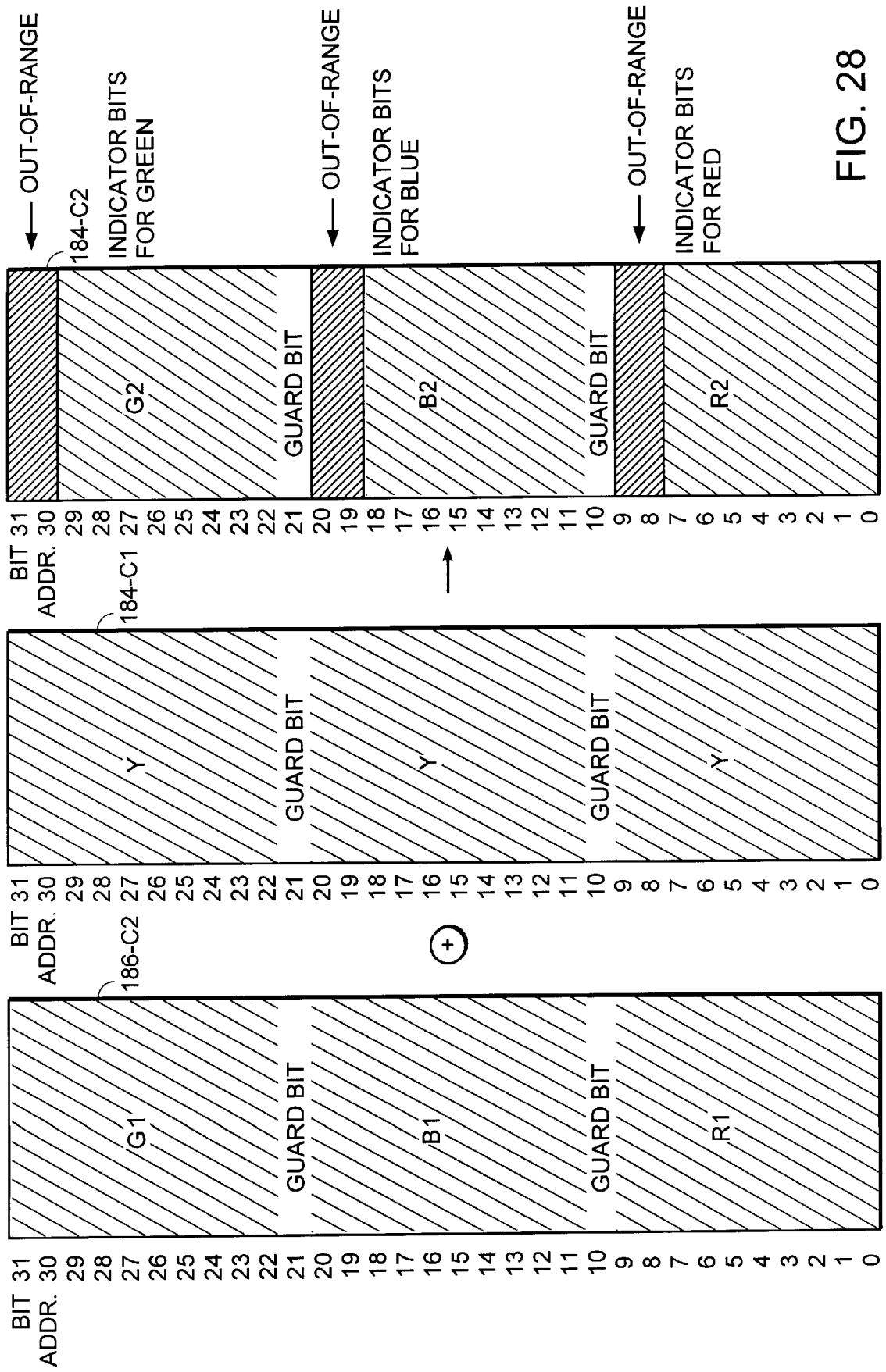
FIG. 28 illustrates the contents of the registers following the second stage of the Luminance Stage of color conversion in the embodiment illustrated in FIG. 26B.

As shown in FIG. 28, the above described placement of register values allows for 1 guard bit and two out of range bits per color value. These number of bits are the minimum number required to treat each color value as an independent summation operand for signed 10 bit arithmetic. Accordingly, the present invention provides a method and apparatus for providing color conversion with no loss of precision in the conversion process.

Figure 29:
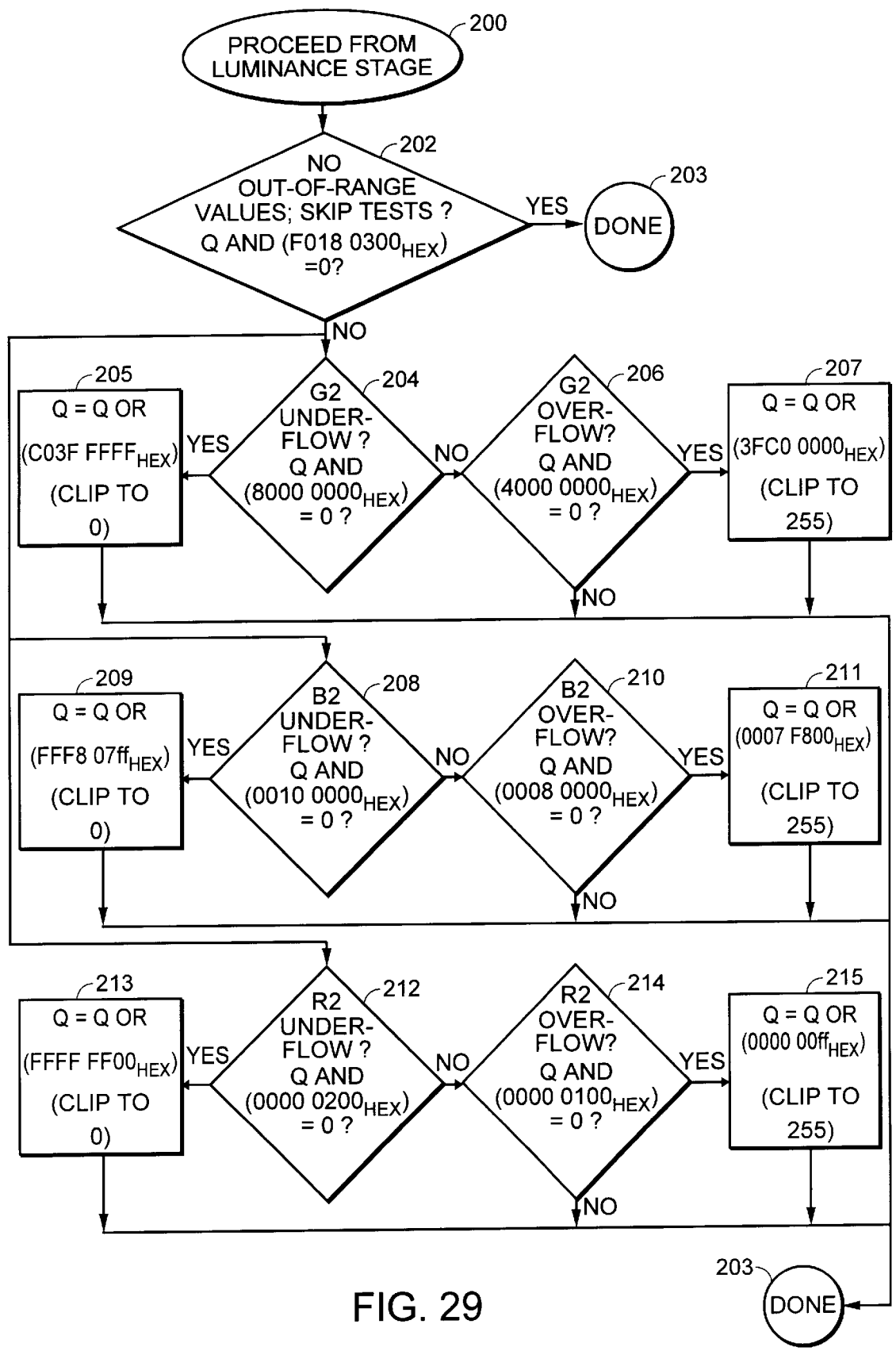
FIG. 29 illustrates the truncate process used for a 32 bit color conversion system, such as that shown in FIG. 26C.

Referring now to FIG. 29, the truncate process for use in the 32 bit graphic system is shown. The key to providing fast truncation is found during the first step of the process in step 202 where it is determined that all values are in the proper range; i.e. that is if all of the out-of-range indicator bits are zero. Because this is the case that will prevail the majority of the time, a quick test can be determined and the truncation will be provided within one step for the majority of instances. This step is accomplished by ANDing the contents of Q register and the bit mask F0180300 hexadecimal and comparing this against zero to determine whether any bits are set.

If any of the out of range indicator bits is a one, then the process will proceed to step 204, 208 and 212, where each of the three data values must be checked. For each value R2, G2, and B2, the underflow or negative case is checked first. According to Table III, if the higher order bit of the two out of indicator bits is a one, then an underflow has unambiguously occurred. Thus, steps 204, 208 and 212 can be performed by providing the appropriate mask in the appropriate MSB indicator location to check for the occurrence of a one.

If the result is not zero, then an underflow has occurred, and the corresponding 8-bit location is set to a zero via steps 205, 209, and 213 respectively. If the check shows that an underflow did not occur, then overflow must be checked. In this case, simply checking whether the lower out of range indicator bit is a one will determine if an overflow has occurred, since the underflow situation which is the only other event which would have a one in the LSB has been determined not to be present. If an overflow is determined to have occurred, the corresponding 8 bit location is set to 255 at steps 207, 211, and 215.

Byte Packing in a 32 Bit System

Following the truncation stage, the Q register now contains valid range checked R, G, and B values. To provide byte packed data, the value for R should be stored at locations bits 0–7, G at bits 8–15, and B at bits 16–23.

Figure 30:
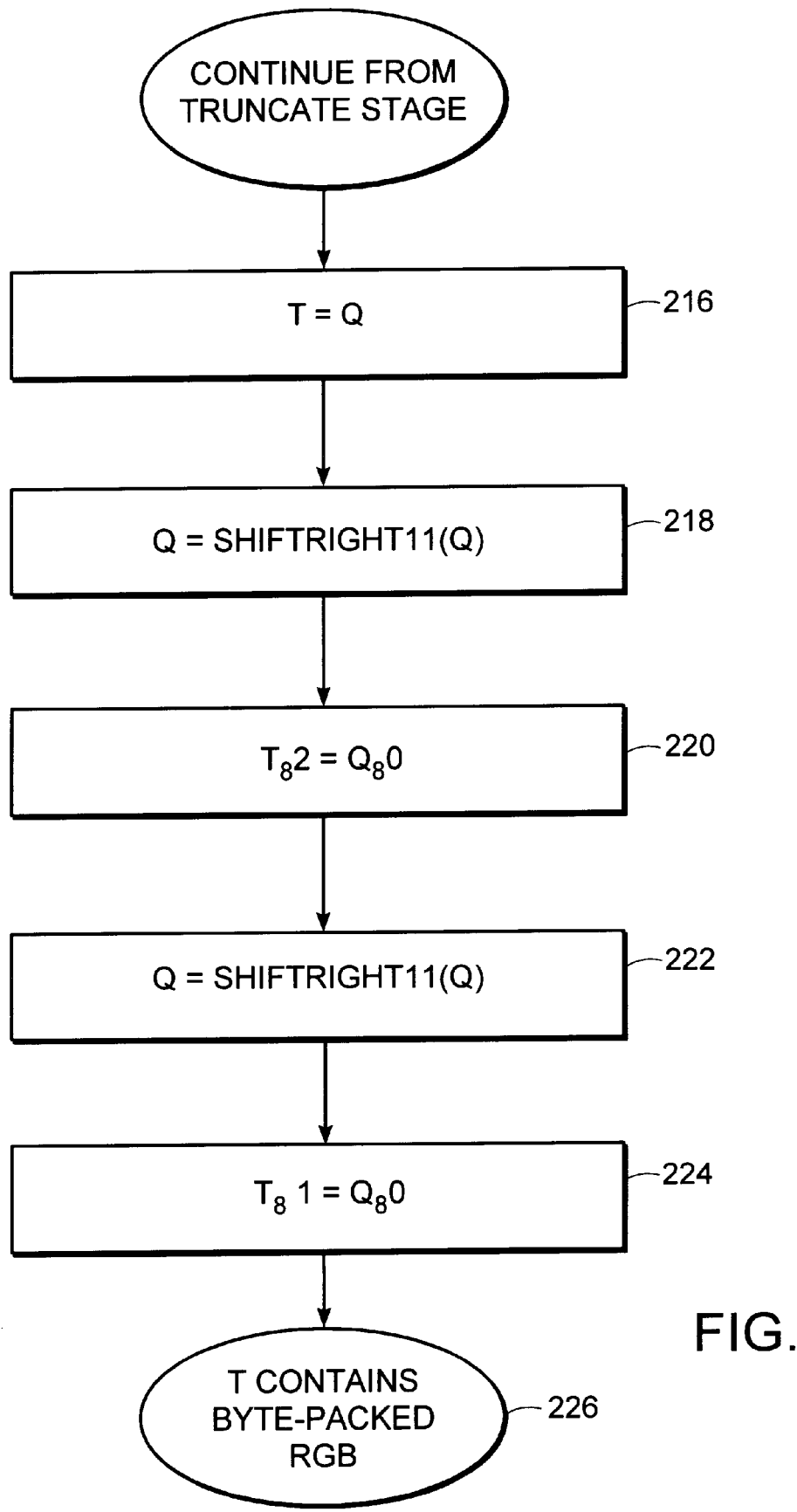
FIG. 30 is a flow diagram illustrating optional byte packing stage of the 32 bit color conversion system of FIG. 26C.
Figure 31:
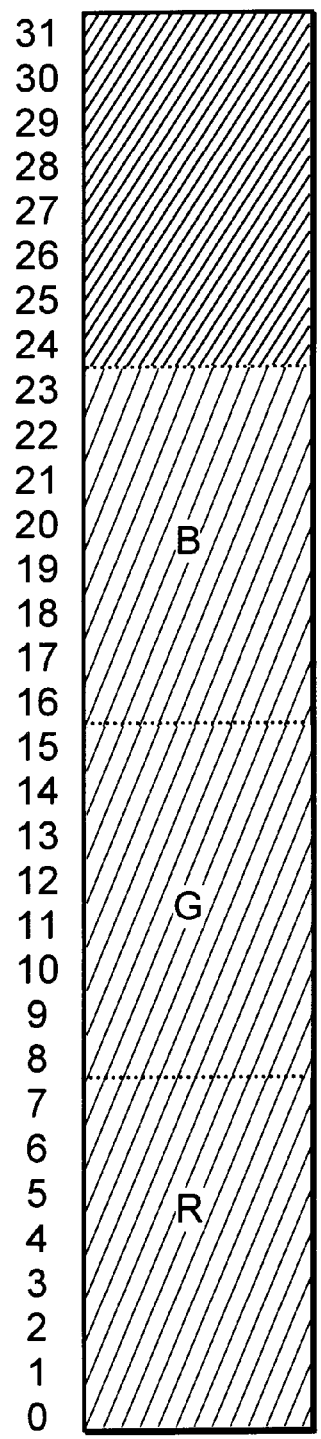
FIG. 31 illustrates the contents of the register following byte packing storage process of FIG. 30.

Referring now to FIG. 30, a five step process for providing byte packing of data stored in the 32 bit register is shown. At step 216, a copy of the contents of the Q Register is stored in a 32 bit output register T. At this point, the R or red component is already in the proper location. Register Q is then shifted 11 bits to the right. The low order byte of the Q Register now holds the B or blue data and is copied the most significant byte of the T Register. The Q Register at step 22 is then shifted right by 11 again. Therefore, the lower order of byte now holds the green data. This byte is then copied into the center byte of the T Register, thereby completing the byte packing. The finished content of a byte packed register are illustrated in FIG. 31.

The present invention thus provides a method for high precision YUV to RGB translation for use in a 32 bit architecture. The allocation of values to the register, with one guard bit and 2 out-of-range indicator bits per color value, allows for high precision computations to be performed on three distinct values using only 3 table look-ups and 2 additions with 2 registers. As a result of chrominance sub-sampling, the average number of table lookups can be further reduced, since the chrominance stage need only be executed for the sampled pixels.

Thus a method has been shown that provides for YUV to RGB color conversion using either a 62 bit graphic system and two 64 bit registers, a 64 bit graphic system with one 64 bit register, or a 32 bit graphic system. The conversion process provided in all of the described implementations can be quickly performed because components are precalculated and stored in a lookup device, which may be indexed by the appropriate Y, U, and V input signal values, to provide the appropriate translated RGB values that may be added together to provide the desired output. The provided implementation allows for easy manipulation of data to provide byte packed output, GBR output, or any desired order of bytes that is required. Accordingly, by providing a high speed conversion process, the present invention facilitates video playback systems by aiding to improve their overall performance, because the conversion process will consume a large amount of process time.

Color Adjustment in a 32 or 64 bit System

The above systems described for 32 and 64 bit YUV to RGB color conversion may be easily augmented to provide means for imparting a dynamic color adjustment and including an overall gain without any increase in complexity or computational speed of the color conversion run-time systems.

Figure 32:
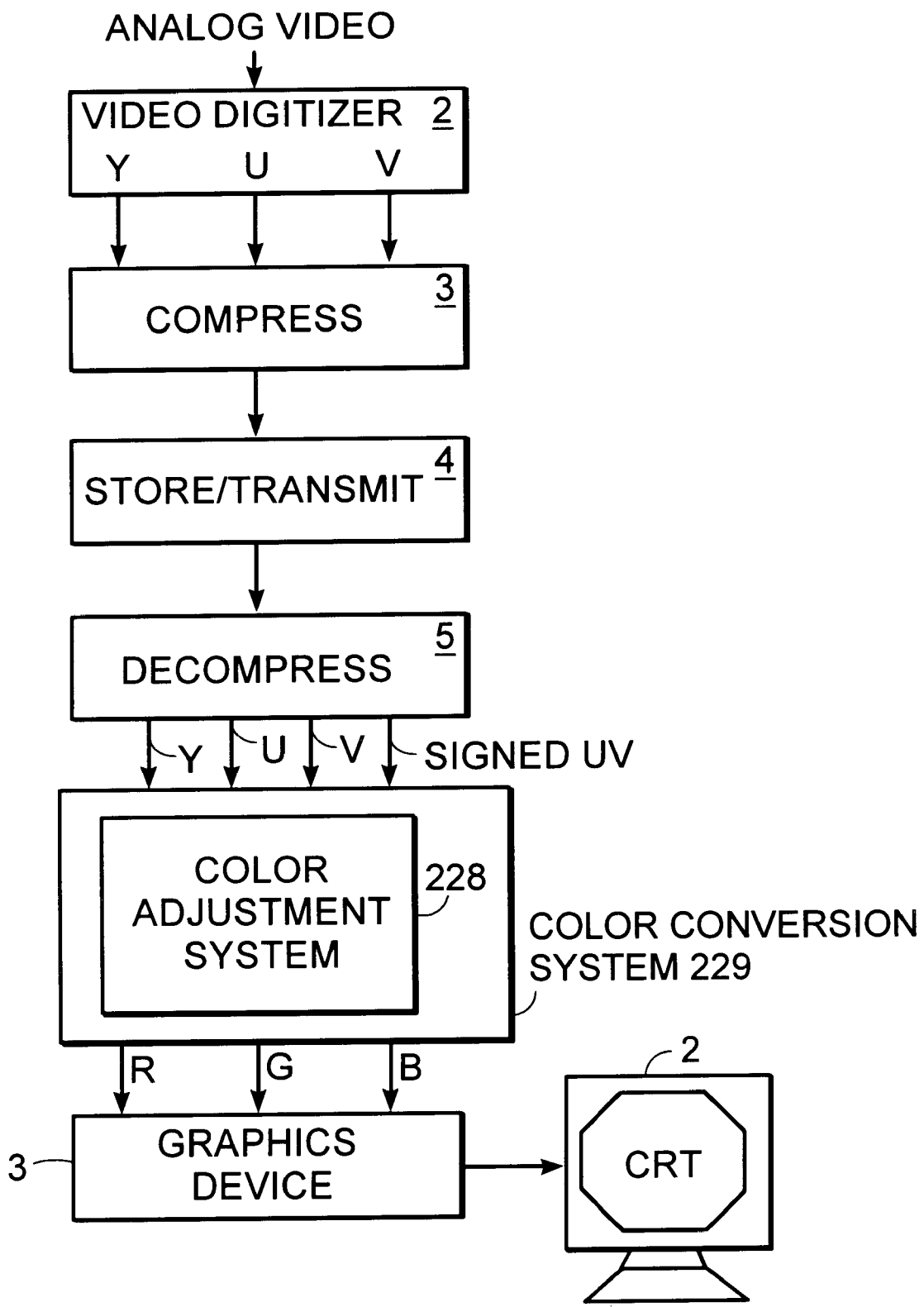
FIG. 32 illustrates the addition of a color adjustment system to video graphics system.

Referring now to FIG. 32, the above described embodiments have been shown to be modified to include a color adjustment system 228 which acts in conjunction with the color conversion system 229 to provide color adjusted RGB type signals. Through the use of an efficient implementation of the table builders that incorporates the inputs of slope (contrast or saturation), offset (brightness or white-balance), a correction of the sense of the input and output signal, and possible sign conversion of the chrominance components using the color adjustment system. The color conversion system may be executed without adding any complexity to the above described color conversion system.

The present invention achieves the color adjustment by providing separate subsystems which are designed to control the luminance and chrominance, each subsystem having its own set of input signals. The luminance input values include a steepness input, a Xoffset input, a Yoffset input, a ReverseIn input, and a ReverseOut input. The chrominance input values also include a separate Steepness input value, and Xoffset input value, a Yoffset input value, a ReverseIn input value and a ReverseOut input value, as well as the signed signal SignedUV which was described previously in the color conversion system.

Each of the above variables is an input variable to the software program that builds the tables, and thus can be independently controlled by the user application. The color adjustment system modifies the contents of the Y, U and V tables that are input to the run time system depending upon the states of the luminance input variables and the chrominance input variables. Either one of the 32 or 64 bit color conversion systems may be used with this color adjustment system.

Figure 33A:
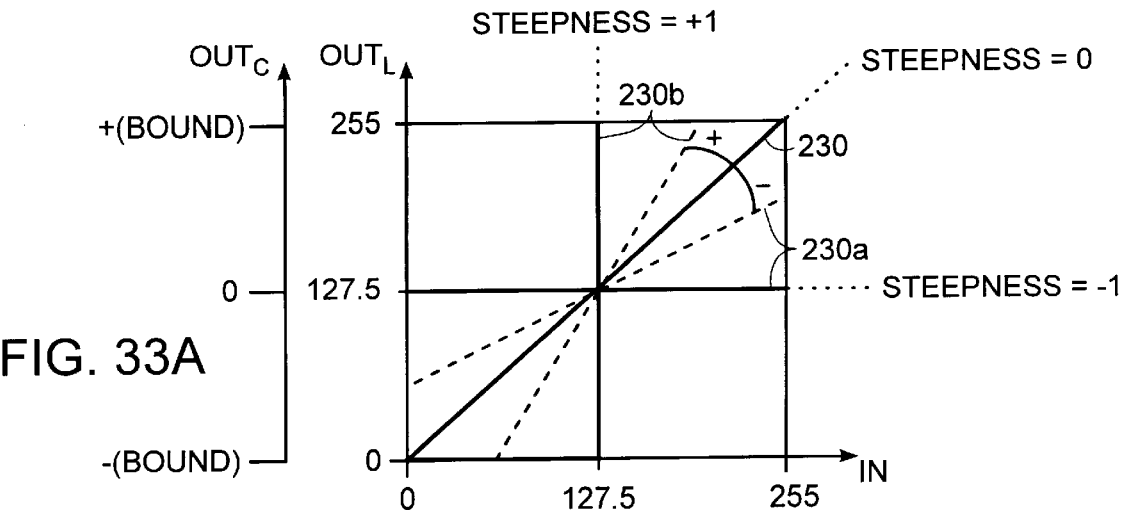
FIGS. 33a–33c illustrate the properties and relationship between variables used by the color adjustment system of FIG. 32.

Referring now to FIG. 33A, a graph is shown wherein the abscissa, or X access, is used to map input values in that range from 0 to 255. These will be the raw input values of luminance. The ordinate, or Y access, has two distinct scales. The first scale provides a range of luminance output, values ranging from 0 to 255. The second scale illustrates the range of chrominance out$_c$ values ranging from the value –(bound) to +(bound). For chrominance values, the value 'bound' determines the maximum distance from 0 within which output values are expected.

The Steepness variable controls different characteristics of the image depending upon whether it is associated with a luminance value or a chrominance value. For luminance determination, the Steepness input variable controls the effect of contrast. For a chrominance determination, the Steepness input variable controls the effect of saturation. As shown in FIG. 33A, the diagonal line 230 labeled Steepness=0 represents the identity lines for which no color adjustment is performed. Line 230b, labeled Steepness=+1, is the maximum steepness, whereas the maximum color adjustment will be performed. Line 230a, labeled Steepness=−1 is the minimum steepness, resulting in a horizontal line where all inputs are mapped to one output value of 127.5. By changing the value of the Steepness input variable, the transformation line pivots about the center point, as illustrated by the dashed lines in FIG. 33a, essentially increasing or decreasing the mapping relationship between the input and output values, and hence adjusting the contrast (or saturation) of the output image.

Figure 33B:
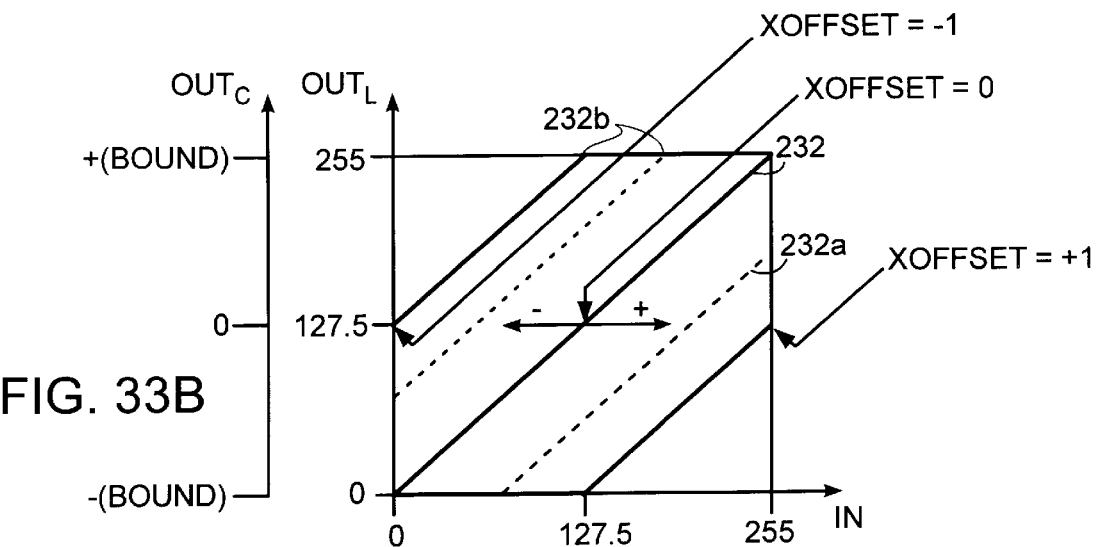
Figure 33C:
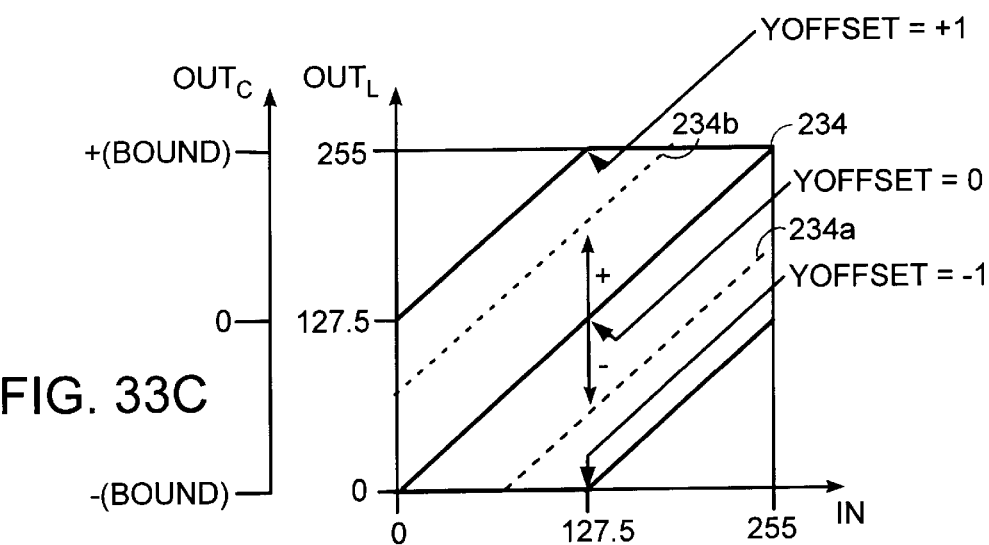

Referring now to FIG. 33B, the effect of the different values of the control X-offset is shown. FIG. 33c illustrates the effect of the variable Y-offset. For the luminance portion of the input pixels, the Y-offset variable can be used to control brightness. For the chrominance systems, the combined offset defined by the Xoffset and Yoffset can be used to control the white balance.

As with the Steepness variable, a value of 0 for either the Xoffset or Yoffset does not act to change the mapping relationship between the input and the output value. The example transforms of the signal Xoffset being set to a −1 is shown via line 232b. By way of collaboration, it should be noted that by providing the value Xoffset=−1, the center point i.e. an input value of 127.5 is translated to a maximum output value. Similarly, an offset of −1 for the Yoffset is shown at line 234 to cause the center point, i.e. the center of the input values to be translated to a minimum output value of 0.

Two other input variables, the ReverseIn input variable and ReverseOut input variable, are provided to reverse the sense or "polarity" of the input signal, the output signal, or both. For the case of ReverseIn=true, the given transformation line, is reflected about the vertical center line, while the case of ReverseOut=true, the transformation line is reflected about the horizontal center line.

Since the sense of the input YUV values and the sense of the expected target output values can go in either direction, both controls are needed to allow consistent meaning for the other color adjustment controls.

As discussed previously, with regard to the color conversion system, the chrominance input values are signed, that is, they can be negative or positive. The Signed UV input signal is used to determine whether or not the input signals are "Signed UV" or "Unsigned UV". An Unsigned UV representation is assumed. When the input signal SignedUV=true, the Adjustment System converts the chrominance input values from the "Signed UV" to "Unsigned UV" by adding 128 to the SignedUV pixel value.

Figure 34:
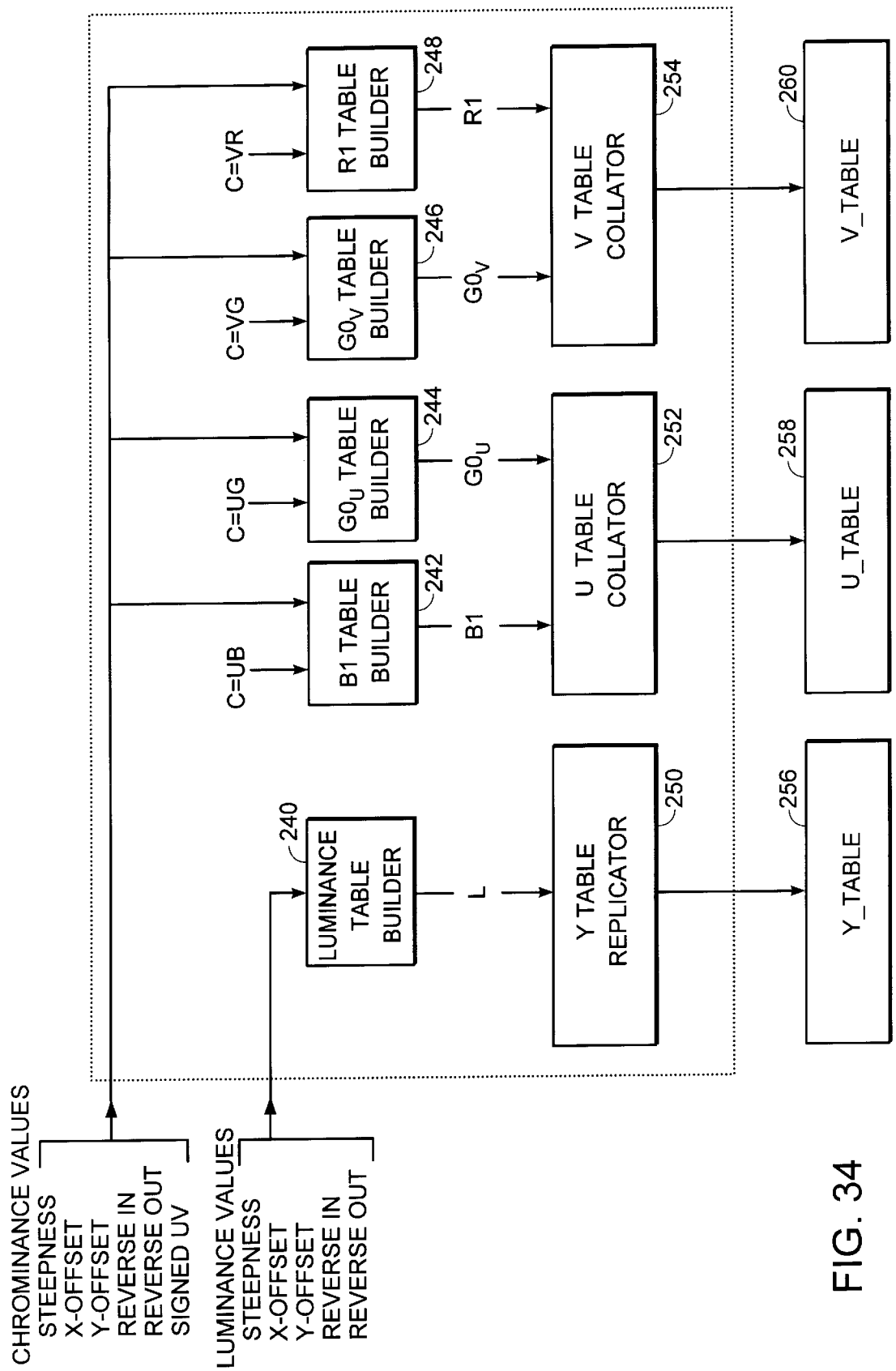
FIG. 34 illustrates a color conversion system incorporating the color adjustment system of FIG. 32.

Referring now to FIG. 34, color adjustment is accomplished by augmenting the table builders 240, 242, 244, 246 and 248 to incorporate the various luminance input values and chrominance input values. The remaining portions of the color conversion system, i.e. the U Table Collator 252 and the V Table Collator 254 remain substantially unchanged. There is only a minor change to the Y Table replicator 250, as will be described below.

Thus, as previously described, a table builders provide information that is placed in the proper location by the Table Collators, depending on whether it is a 32 bit or a 64 bit graphic system, to provide the appropriate V Table output 256, U Table 258, and Y table 256 for the run-time system.

Figure 35:
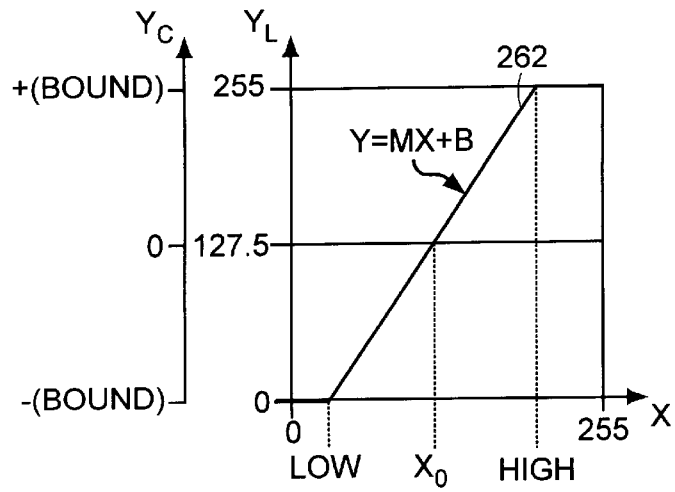
FIG. 35 is a transform curve illustrating the effects of the color adjustment variables input to the color adjustment system of FIG. 32.

The chrominance Input Values and the Luminance Input Values are used to define a transform curve, such as that shown in FIG. 35. The input signals are used to define a transform curve such as curve 262 which controls the relationship between the input video signals and the adjusted video signals. This curve has identifiable characteristics that may be quantified as indicated. First, there is a straight line segment, y=mx+b, that has a slope m and a y-intercept b. If the line extends beyond the limits on either access (0, or 255), the line is clipped to the maximum value, or minimum value. On the x-access, the low point is the point where the line crosses the lower limit (0), and the high is the point where the line crosses the upper limit (255). For the chrominance case, the x-axis coordinate where the line passes y=0 is also helpful for efficient rounding in the table generation.

Figure 36:
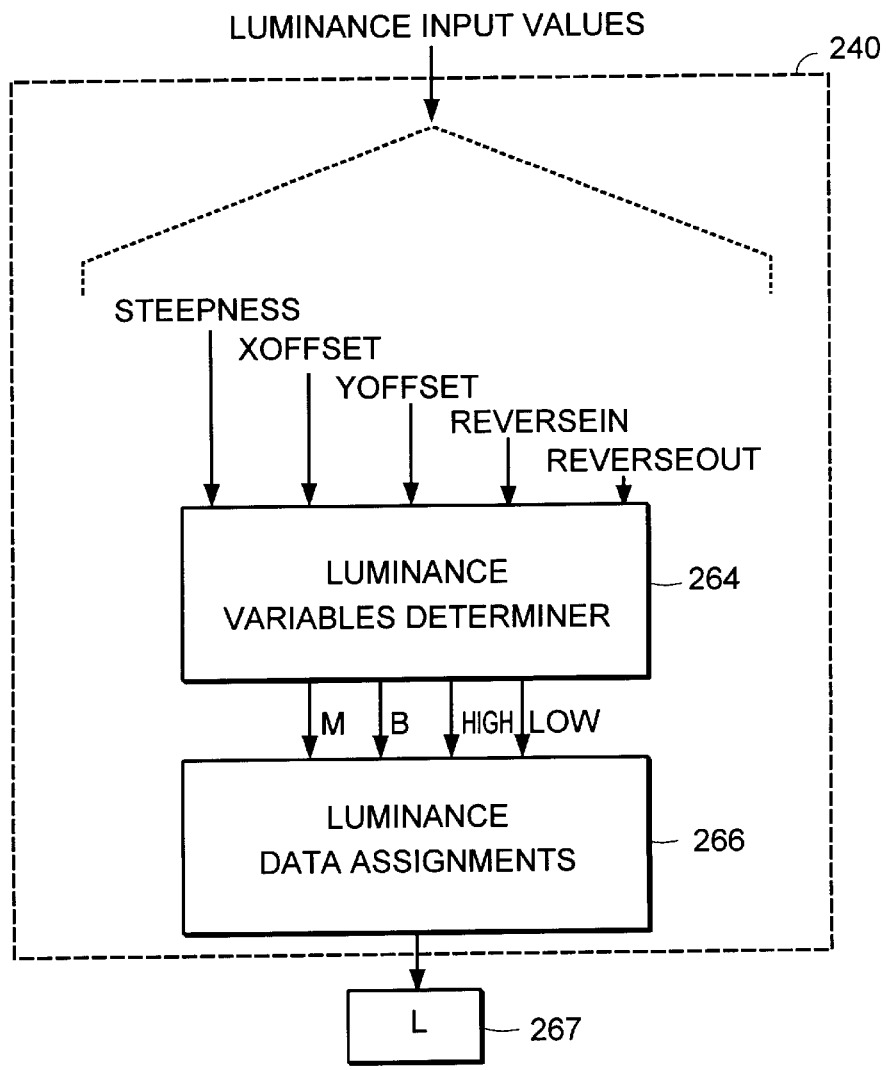
FIG. 36 is a block diagram of a Luminance Table Builder System for use in the color conversion system of FIG. 32.

Referring now to FIG. 36, the Luminance Table Builder 240 is shown in further detail. The Luminance Input Values consisting of Steepness, X-offset, Y-offset, ReverseIn, and ReverseOut are input to a Luminance Variables Determiner 264. The Luminance Variable Determiner 264 generates the features of the transform curve; m for the slope, b for the y intercept, the high and the low values for determining where the transform must be clipped. These values are used by a Luminance Data Assignment unit 266 to generate an array L 267 that will be delivered to the Y-Table Replicator 250 (FIG. 34).

Figure 37:
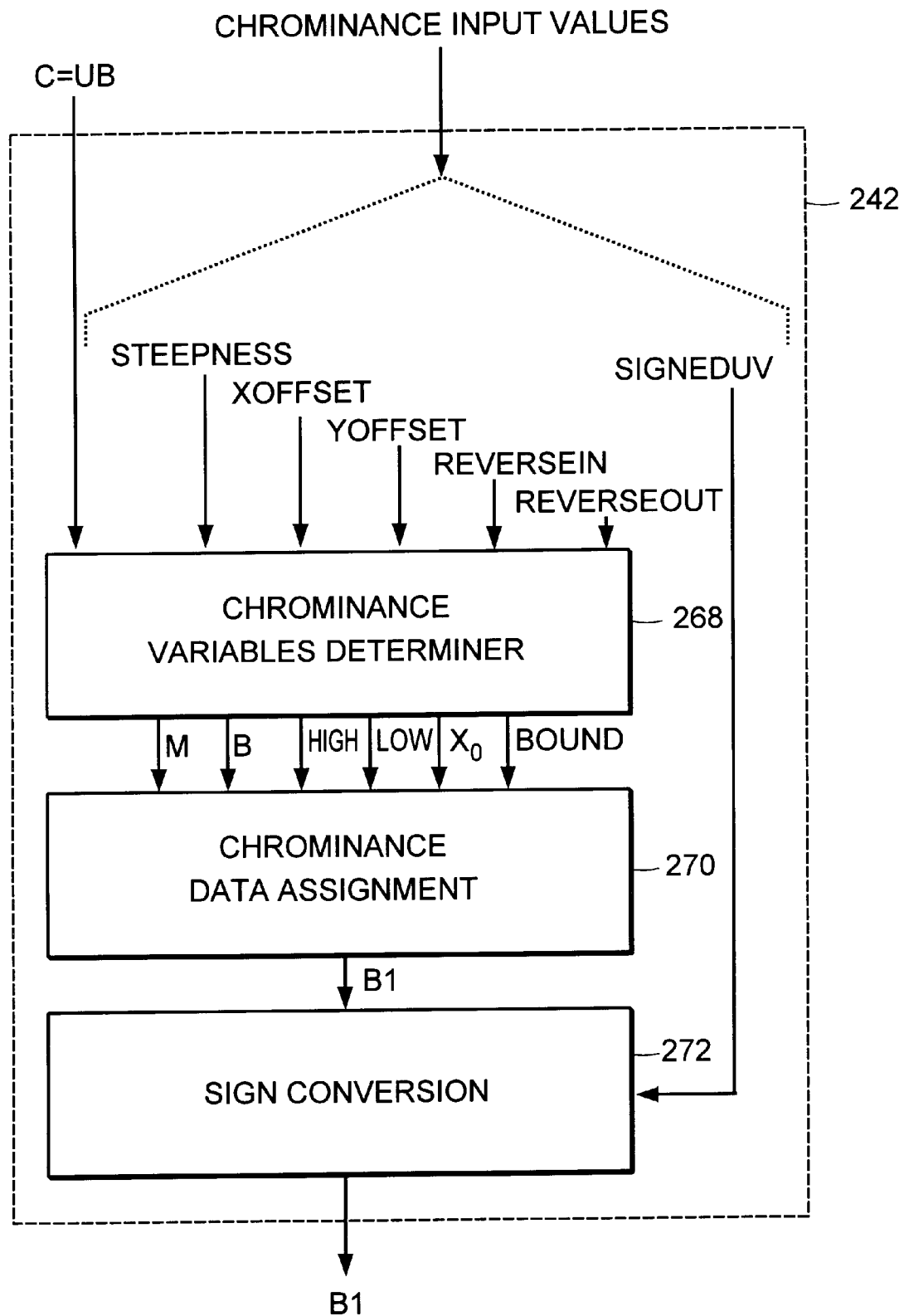
FIG. 37 illustrates a chrominance Table Builder System for use in the color conversion system of FIG. 32.

Referring now to FIG. 37, an example one of the Table Builders 242 for building table value for the B1 input is shown. It is to be understood that Table Builders 244, 246 and 248 comprise identical units though receive different outputs, and will not be described in detail herein. The four chrominance table builders 242, 244, 246, and 248 differ only in the value on the gain input C. Along with the gain input c, other input values to the chrominance Table Builder include the chrominance Input Values of Steepness Xoffset, Yoffset, ReverseIn, ReverseOut and Signed UV. The first six signals are fed to chrominance Variables Determiner 268. These signals are combined to provide the outputs of slope (m), Y intercept (b), a high value, a low value, an $x_0$ value and a bound value, which are fed to a chrominance Data Assignment Unit 270.

The chrominance Data Assignment Unit 270 uses these signals to generate an array B1 that is fed to Sign Conversion Unit 272. The Sign Conversion unit 272 also receives the additional signal SignedUV. The output in this case is the array B1 that is delivered to the U Table Collator 252.

Referring back briefly to FIG. 36, the Luminance Variables Determiner and the Luminance Data Assignment blocks will now be described in detail. The task of the Luminance Variables Determiner is to interpret the Luminance Input Values and deliver the four signals m, b, high, and low, to the Luminance Data Assignment system. The detail of that process is shown in FIG. 38.

Figure 38:
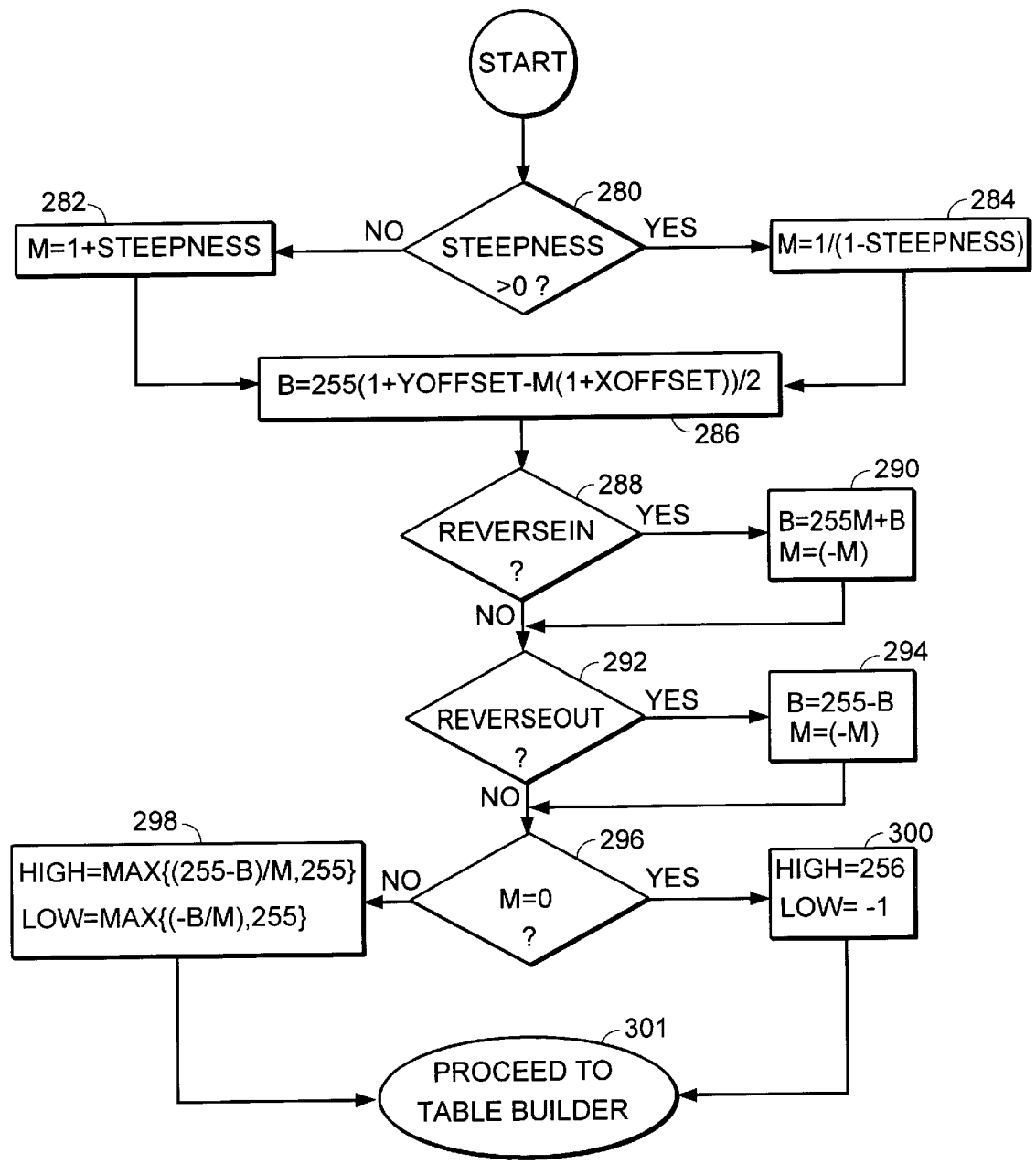
FIG. 38 is a flow diagram of a Luminance Variables Determiner used in the Luminance Table Builder System of FIG. 36.

Referring now to FIG. 38, at step 280, the Steepness Variable is evaluated to determine if it is positive or negative. If it is a negative variable, then at step 282, the slope is determined by adding 1 to the Steepness Variable. If it is a positive variable, then at step 284, the slope m is determined by dividing 1 by one minus the Steepness Variable. Either way, the process resumes at step 286 where the y intercept is determined. The y intercept is determined by using the Yoffset and the Xoffset variable, as shown in the formula in box 286. Next, at step 288, the state of the variable ReverseIn is checked. If ReverseIn is true, then at step 290, the values of the slope m and the y intercept are reversed; i.e. the slope is negative while the b intercept is swapped given the equation 255 m+b.

Next, at step 292, the state of the variable ReverseOut is checked. If ReverseOut is true, then at step 294 the values of the variable for the y intercept b and the slope m are reversed as shown. If not, the process proceeds two step 296 where it is determined if the slope equals 0. If the slope does equal 0, then the high point and the low point are designated by variable value 256 and −1 respectively, at step 300. Otherwise, if the slope does not equal 0, then the high values and the low values are determined using the equations put forth in box 298. At this point, all of the values where the Luminance Variables Determiner have been defined and at step 301 the process proceeds to the Luminance Data Assignment Phase 266.

Figure 39:
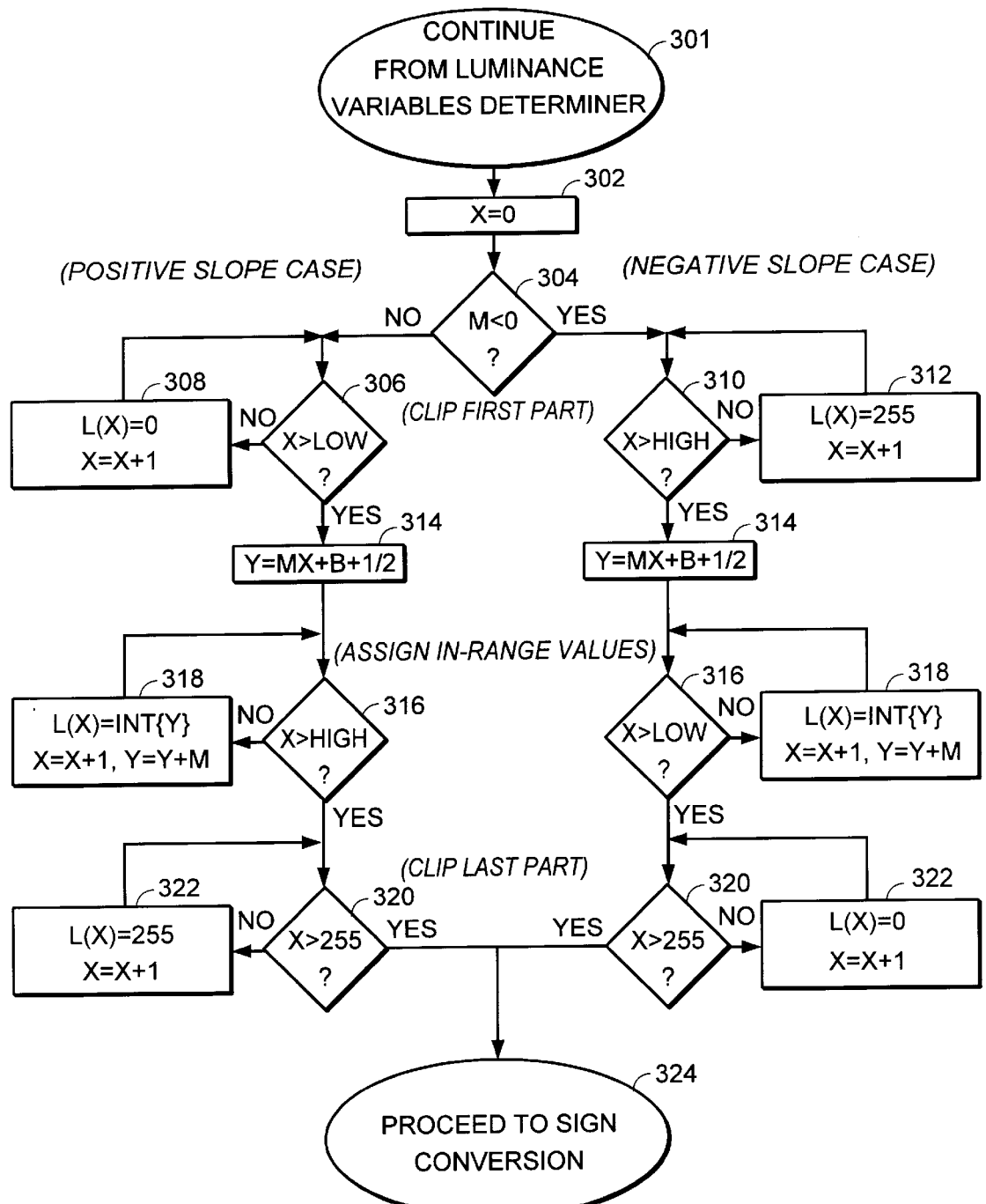
FIG. 39 is a flow diagram illustrating the process used by a Luminance Data Assignment in the Luminance Table Builder System of FIG. 36.

Referring now to FIG. 39, the Luminance Data Assignment System uses the four signals to very efficiently build a 256 element array L. One method for implementing this process is illustrated in FIG. 39, where the left side of the figure details the positive slope case, and the right side of the figure details the negative slope case. During the first portion of the flow, the first region of clipping is optionally handled. Then the in-range values are assigned wherein in finally in the last portion of the flow the last clipping of variables is performed, if necessary. It is important to note that in-range values are rounded to the nearest integer.

The process in detail begins at step 302 where the variable x is set to 0 and then proceeds to step 304, where the slope is determined to be either positive or negative. If the slope is positive, then at step 306 the first portion of the clipping is performed by determining whether the x input is greater than the low variable that was determined in the Luminance Variable Determiner State. If not, then the assignments for the array entry L are made at step 308 and x is incremented. This process continues until the x value is greater than the low value and thus, the clipping has been completed.

The process then resumes to step 314, where the y coordinate for the x value is determined based on the x value, the slope, and the y intercept. At step 316, the inrange values for the transform are assigned by comparing x against the high value, and if x is in-range, then at step 318 the array value for L is determined by rounding Y to the nearest integer, incrementing X and incrementing Y. This process continues until the X value has exceeded the high range input by the variables Determiner and then at step 320, the upper part of the clipping continues until all of the elements of the array have been defined. At step 324, the L table has been built and is ready for use.

If it was determined at step 304 that the slope was negative, then substantially the same process, as was just described for the positive slope case, is performed with the exception that at step 310, the high value is first compared for clipping and at step 316 the low value will be compared, since it is a negative slope.

Figure 40:
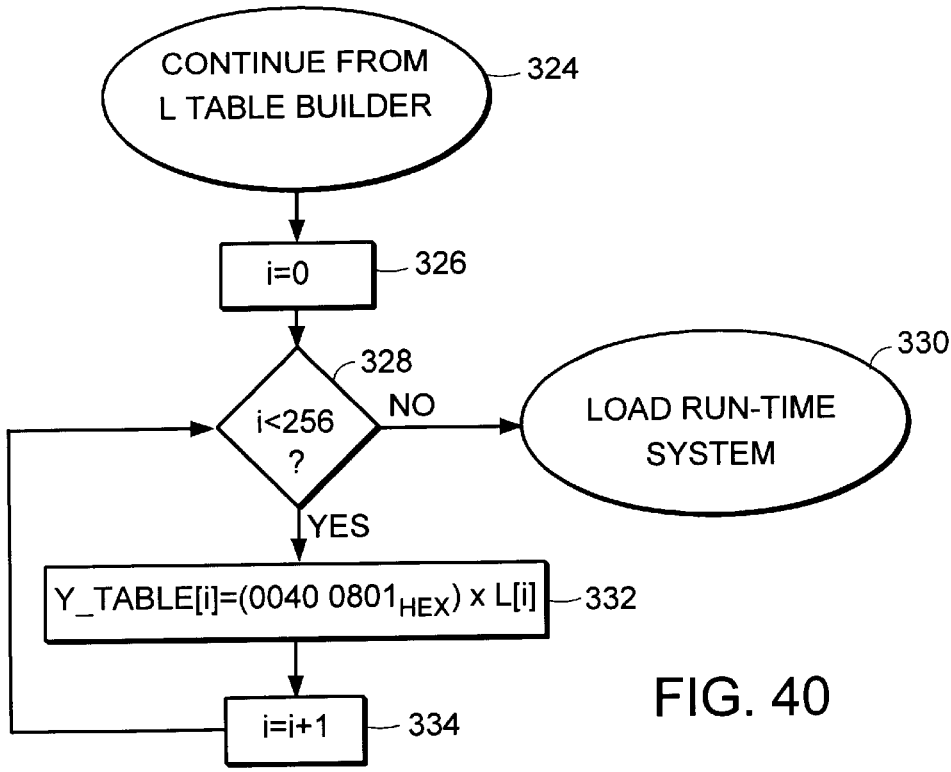
FIGS. 40 and 41 illustrate Table Replicator Processes for use with either a 32 bit system or a 64 bit system.

After all of the array values have been generated, the resulting table is passed to the y replicator. As noted previously, the y replicator function will change, depending on whether it is a 32 bit system or a 64 bit system, since the y replicator will have to place the y values in the appropriate bit locations for each of those systems. In FIG. 40, a y replicator for a 32 bit system is shown to include the steps setting i=0, comparing i against the threshold and then for each element in the y table, multiplying the array value with the value 00400801 hexadecimal to place the element array in the proper location of the table entry. This process resumes for each y table entry and when completed, is ready for use in the run-time system at step 330.

Figure 41:
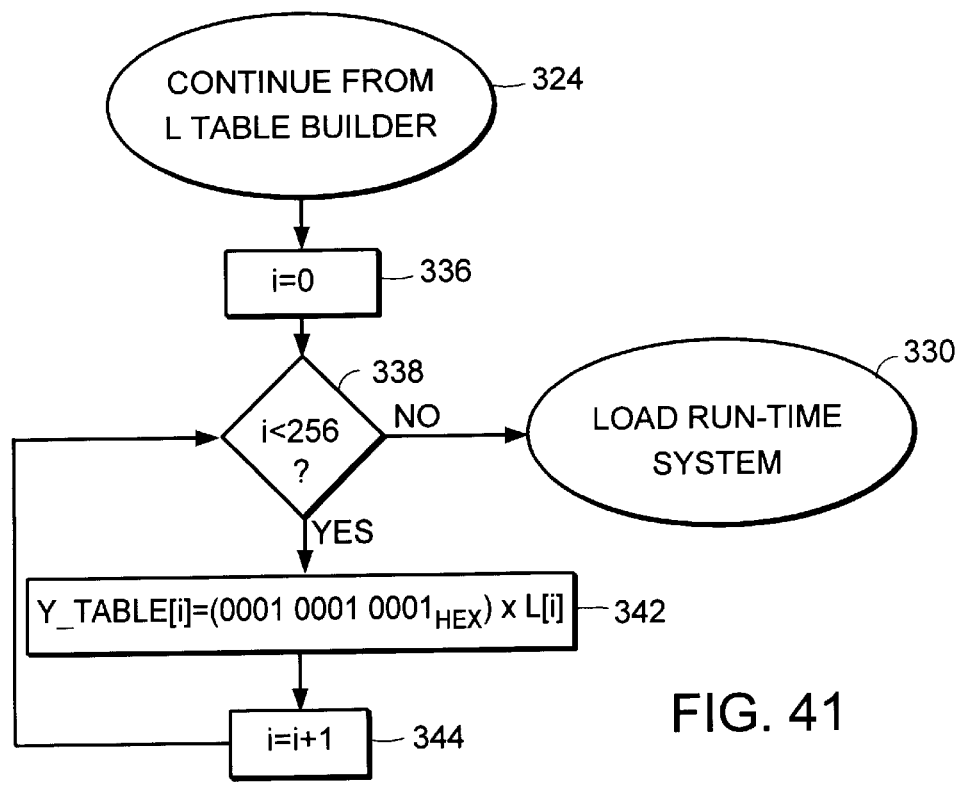

In FIG. 41, a y replicator for the 64 bit system is shown to include substantially the same steps except that at step 342, the arrangement of the element in the y table entry will be decided by multiplying the array entry by the hexadecimal value 000100010001. When completed, this array will be loaded into a 64 bit run-time system.

Referring again briefly to FIG. 37, the chrominance Subsystem was shown to include chrominance Variable Determiner, chrominance Data Assignment Unit, and a Sign Conversion Unit. Each of these units functions will now be described in detail.

Figure 42:
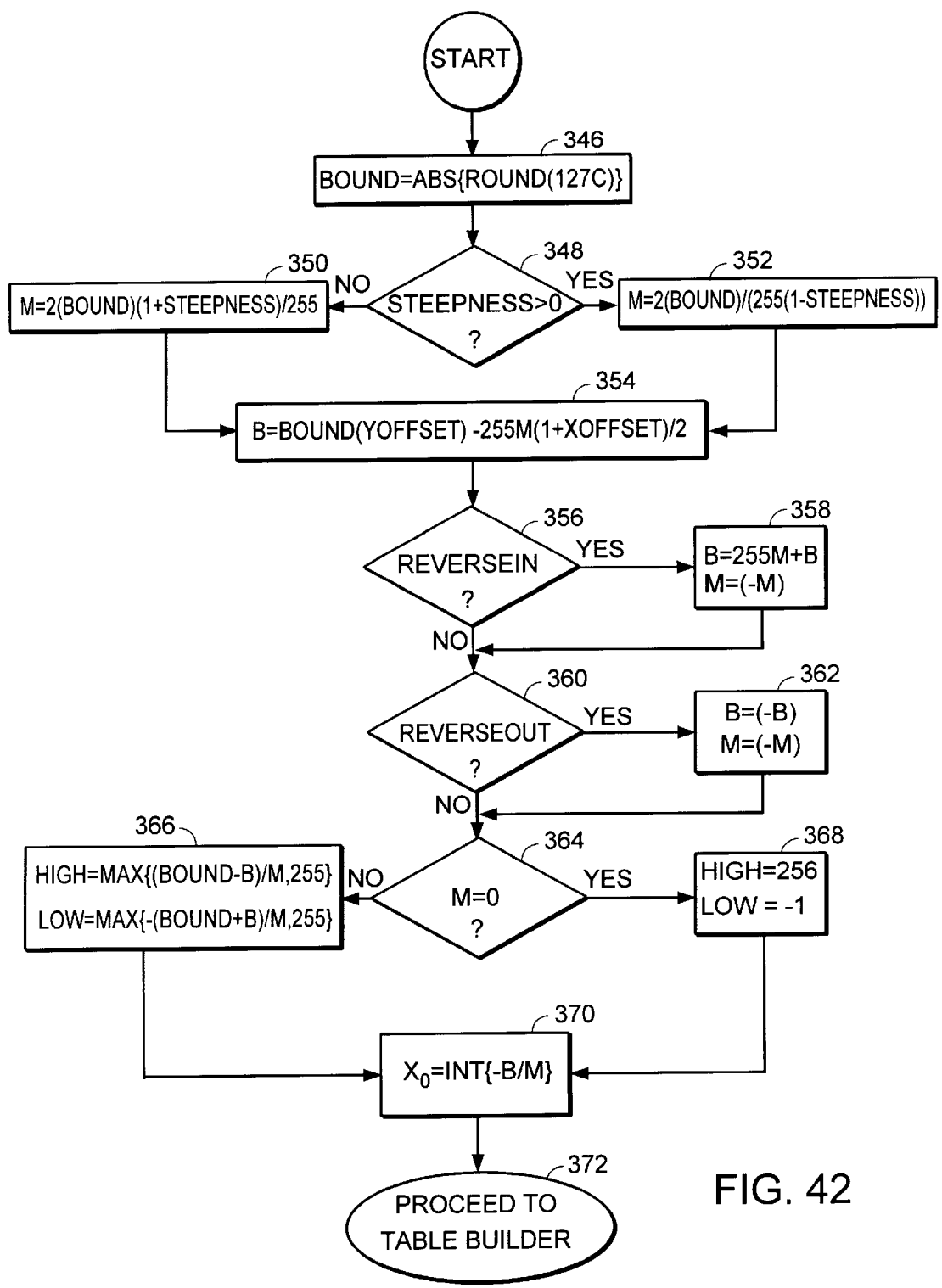
FIG. 42 is a flow diagram illustrating a process used by a chrominance Variable Determiner in the chrominance Table Builder System of FIG. 37.
Figure 43:
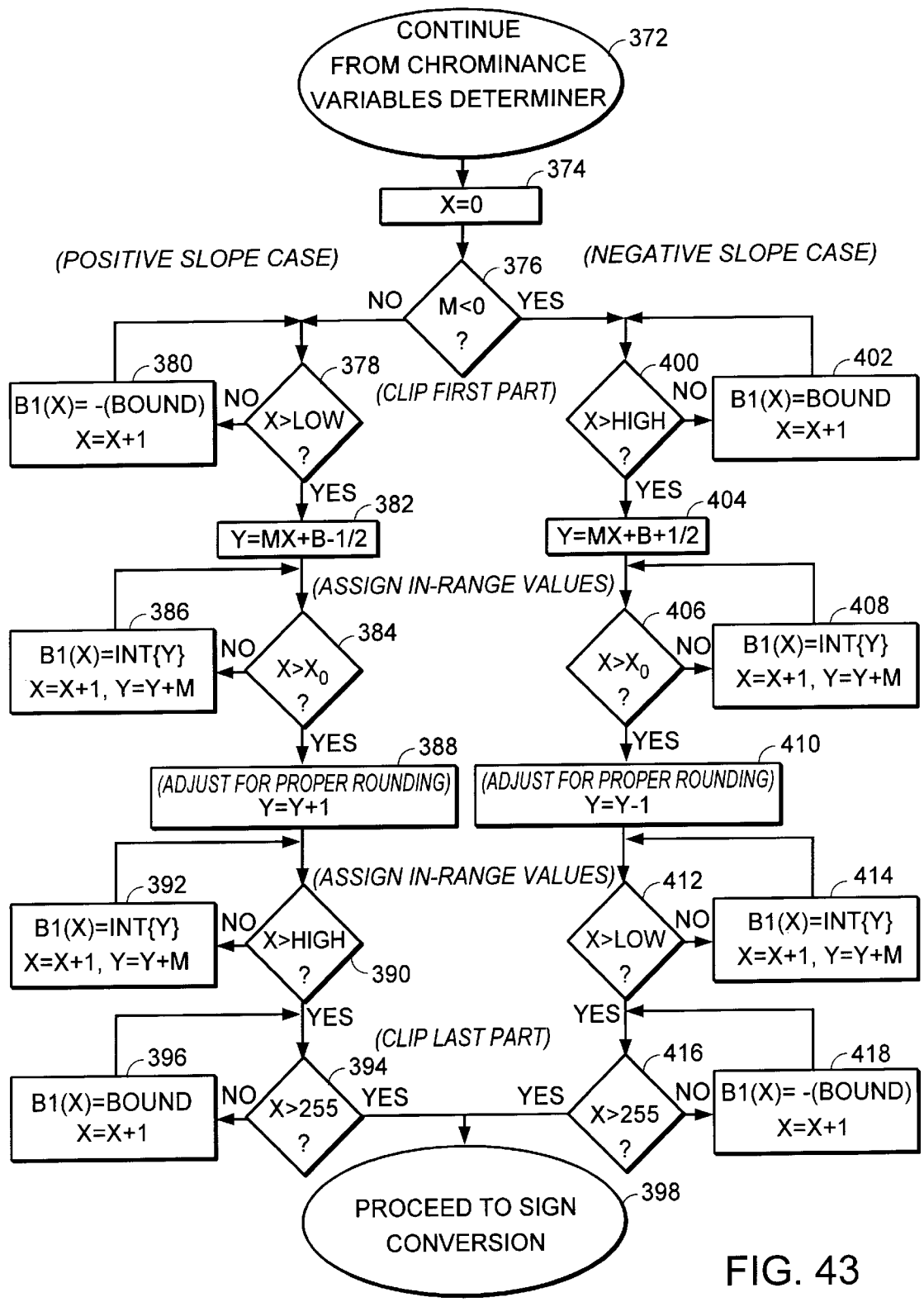
FIG. 43 is a flow diagram illustrating the process used by the chrominance Data Assignment in the Table Builder of FIG. 37.

The process used by the chrominance Variables Determiner 268 is shown in FIG. 42. At step 366, the bound value is determined by taking the absolute value of the rounded round of 127 times the gain c. At step 348, the Steepness Variable is determined to be either negative or positive. If it is negative, then at step 350 the slope is determined, as shown. Otherwise, at step 352, the slope is determined as given at step 352. Either way, the process resumes to step 354 where the y intercept is given, as defined in the equation at box 354. Next, at step 356, the value of the reverse invariable is determined. If it is true, then the b variables and m variables are swapped, as indicated at step 358. Otherwise, the ReverseOut value is checked at step 360. If the ReverseOut Variable is true, then the b value and the m value are given, as indicated at step 362. Otherwise, then at step 364, it is determined whether the slope given by variable m, is equal to 0. If so, then the high and low variable values are given, as defined in the equation at step 366. Otherwise, the high and low variable values are given as shown in the equations in step 368.

Next, at step 370, the $x_0$ variable is given by performing an integer rounding of the y intercept divided by the slope. At step 372, the Variables Determiner Values have all been determined and the chrominance Data Assignment process may begin. The chrominance Data Assignment process is similar to that described in the Luminance Data Assignment process. Note that there is a positive slope case and a negative slope case. The aspect of the slope is determined at step 376 by comparing it against zero.

If it is a positive slope, then the process proceeds to steps 378 and 380, where the first part is clipped until the lower bound area is reached. At step 382, the y variable is initialized for the in-range values. Note that the clipping regions are best visualized along the segment of the x access in FIG. 35; the first region of clipping occurs between x=0 and x=low, then the negative in-range values between x=low and x=$x_0$, then the positive in-range values between x=$x_0$ and high, and finally the last region of clipping between x=high and x=255. The separation of the handling of in-range values above and below $x_0$ is useful and efficiently rounding the values to the nearest integer.

Thus, at step 384, the second clipping portion for in-range values is determined by assigning in-range values incrementing x and incrementing y until the $x_0$ threshold has been reach. Then, at step 388, y is adjusted for proper rounding. At step 390, the third clipping area of in-range values can be assigned until x exceeds the high variable value. At step 394, the last portion of the array values are clipped to be equal to the value of the variable bound until all of the array elements have been assigned, and at step 398, the process is ready to proceed to sign conversion.

If it was determined at step 376 that there was a negative slope, then substantially the same process, as described with the positive slope, is performed; however, since it is a negative slope, the high value will first be compared at step 400 and the bound value will be assigned to those x elements; at step 410 the proper rounding adjustment will be performed by subtracting one from y; and at step 416 and 418, the upper element to 255 will be assigned the negative bound value.

Figure 44:
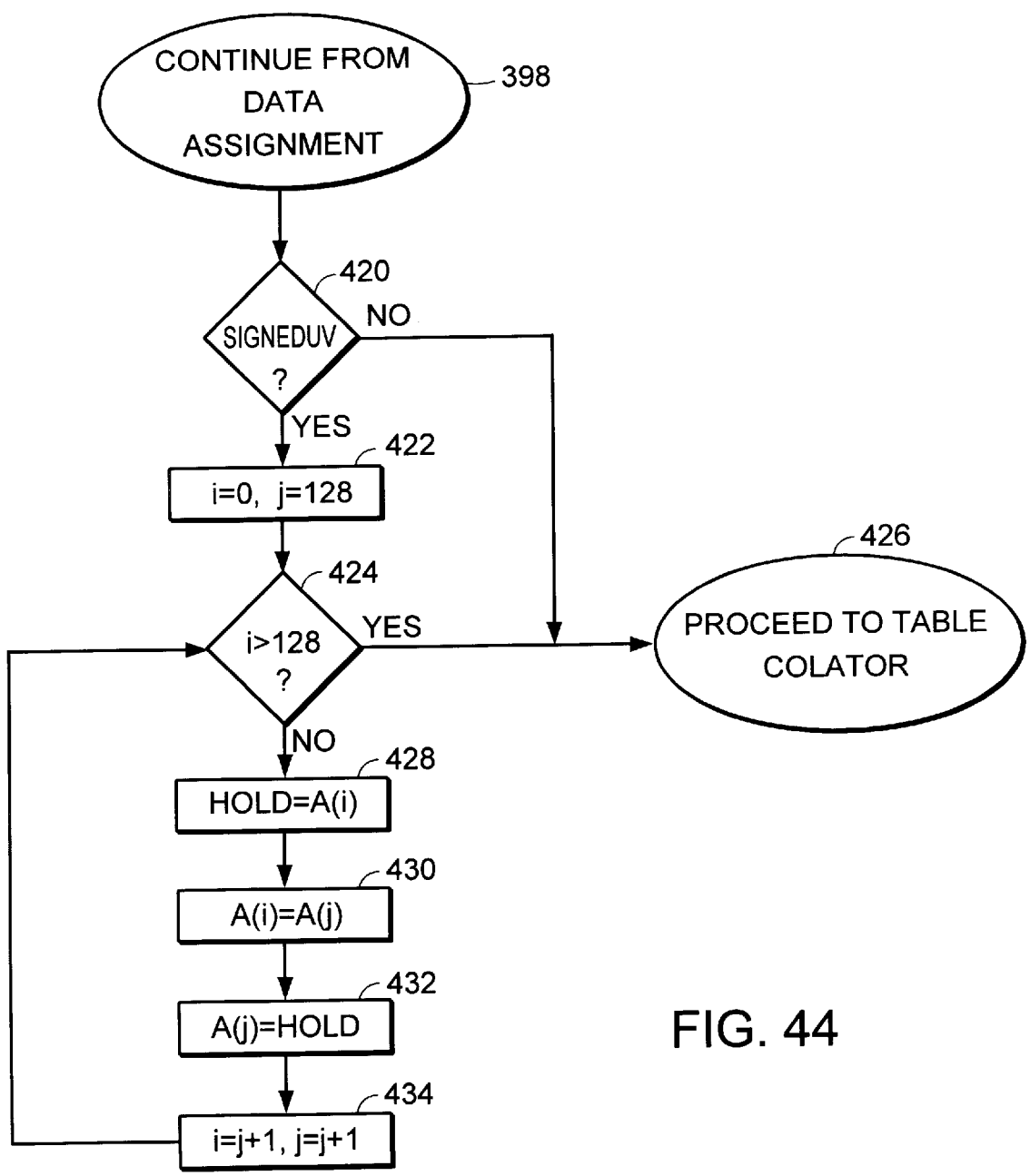
FIG. 44 is a flow diagram illustrating the process used by the Sign Conversion unit of the Table Builder System of FIG. 37.

The resulting table is then passed to the Sign Conversion system. The process used by the Sign Conversion system is illustrated in FIG. 44. At step 420, the value of the Sign UV Variable is first checked. If the Signeduv is a no, then the process may quickly proceed to the Table Collator section of step 426. If not, at step 422, array variables are initialized, and in steps 428–434, the contents of the arrays are swapped such that the low order array such as array location 0 will be swapped with array location 128.

Once the Sign Conversion has been performed, the output tables may then be passed to the U Table Collators which in turns yields the U table. Similarly, output tables $G0_v$ and G0 R1 may be passed to the V table collator to yield the V table. Then the U table, V tables, and Y tables may be loaded into the run-time system and either of the 32 bit or 64 bit color conversion systems previously described.

Thus, a system has been provided that can provide fast color adjustment without effecting run-time system performance.

Thus a system has been shown that provides efficient YUV to RGB conversion with the added property of being able to provide color adjustment without any additional system complexity. However, it should be understood that the concept of the present invention should not be limited to YUV to RGB conversion alone. It can be envisioned that the system could easily be modified to provide the reverse translation process by providing R, G and B tables in the manner described above. Further, the method could be extended to provide an efficient means of providing on-the-fly translation between any two related protocols by storing the correspondence data in a hardware accessible device.

Having described the preferred embodiments of the invention, it will now become apparent to those of ordinary skill in the art, that other embodiments incorporating its concepts may be provided. It is felt, therefore, that this invention should not be limited to the disclosed embodiments, but rather should be limited only by the spirit and scope of the claims.

What is claimed is:

1. An apparatus for providing translation between a first type of pixel data having a first plurality of components and a second type of pixel data having a second plurality of components, in a 32 bit computer system, said apparatus comprising:

a plurality of tables corresponding to each one of said plurality of components of said first type of pixel data, for storing translation data indicative of a relationship between an indexing component of said first type of pixel data and a corresponding component of said second type of pixel data; and a plurality of registers, each of said registers coupled to one of said tables, for storing data from said tables, wherein said register comprises a plurality of bits required for performing high precision arithmetic operations on data stored in said register;

adding means, coupled to said registers; and truncation means, coupled to said registers, for truncating data stored in said registers.

2. A method for providing translation between a first type of data having a first plurality of components, each of said components having a first plurality of values and a second type of related data having a second plurality of components, each of said components having a second plurality of values, said method comprising the steps of:

storing, in a plurality of tables, a plurality of correspondence data representing the correspondence between pixels of said first type and analogous pixels of said second type;

retrieving said correspondence data from said tables for storage in a plurality of registers, each of said registers comprising a sufficient number of bits for allowing said each of said correspondence data stored in said registers to be treated as an independent operand for high-precision arithmetic operations.

3. The method according to claim 2, further comprising the steps of:

summing correspondence data stored in said registers to provide said second plurality of components; and storing said second plurality of components in one of said registers.

4. The method according to claim 3, further comprising the steps of:

truncating said second plurality of components stored in said one of said registers to provide a corrected plurality of components, said corrected plurality of components corresponding to said translated equivalent components of said first plurality of input components.

5. The method according to claim 4, further comprising the steps of:

rearranging said components stored in said first register to provide packed component output.

6. The method according to claim 5, wherein said registers comprise 8 bytes, and where said components each comprise one byte of data and are stored in said one of said register at 16 bit offsets, and wherein said step of packing said data comprises the step of swapping said component stored at said 32 bit offset into the second byte of said register.

7. The method according to claim 3, wherein said registers comprise 4 bytes, and wherein said components each comprise one byte and are stored in said one of said registers at 10 bit offsets, where said step of packing said data comprises the steps of:
   temporarily storing said register contents in a holding register;
   shifting the contents of said register until a desired byte is reached, and storing that byte in the appropriate byte location of said holding register;
   repeating said steps of shifting and storing until said holding register stores said component data in packed format in a desired order.

8. The method according to claim 2, wherein each one of said registers comprises a sufficient number of bits for storing correspondence data for each one of said components of the second type of data.

9. The method according to claim 2, wherein sufficient number of bits includes, for each of said correspondence data, at least one guard bit and a plurality of out-of-range indicator bits.

10. The method according to claim 3, wherein the plurality of tables corresponds to the plurality of components of said first type of data, and wherein each of said tables is indexed by said associated component of said first type data.

11. The method according to claim 10, wherein at least one of said plurality of tables provides a plurality of different correspondence data for each component of said first type data.

12. The method according to claim 11, wherein two of said plurality of tables each provide two correspondence data values responsive to each of said input first type data components.

13. The method according to claim 12, wherein said summing step includes the step of adding said correspondence data associated with one of said two tables to the correspondence data associated with the other one of said two tables.

14. The method according to claim 13, wherein said correspondence data associated with said one of said two tables is stored in a first register, and said correspondence data associated with said other one of said two tables is stored in a second register.

15. The method according to claim 14, wherein one of said correspondence data stored in said first register is stored in a corresponding location as a related one of said correspondence data stored in said second register such that, during said adding step, said one correspondence data and said related one of said correspondence data are added to provide a resultant correspondence data.

16. The method according to claim 15, wherein, after said adding step, said each of said resultant correspondence data are stored in distinct locations of one of said registers.

17. The method according to claim 15, wherein said summation step further comprises the step of:
   accessing another of said tables using another one of said components of said input first data type, said another of said tables providing one correspondence data that is replicated to match the number of components of said second type of data, each of said replicated correspondence data stored in a location aligned with one of said distinct locations of said one of said registers; and
   adding said replicated components to said one of said registers to provide said translated components of said second type of data.

18. The method according to claim 17, further comprising the steps of:
   truncating said translated components to provide components of a desired width.

19. The method according to claim 18, further comprising the steps of packing said translated components into contiguous locations of said one of said registers.

20. The method according to claim 19, wherein said registers comprise 8 bytes, and where said components each comprise one byte of data and are stored in said one of said register at 16 bit offsets, and wherein said step of packing said data comprises the step of swapping said component stored at said 32 bit offset into the second byte of said register.

21. The method according to claim 19, wherein said registers comprise 4 bytes, and wherein said components each comprise one byte and are stored in said one of said registers at 10 bit offsets, where said step of packing said data comprises the steps of:
   temporarily storing said register contents in a holding register;
   shifting the contents of said register until a desired byte is reached, and storing that byte in the appropriate byte location of said holding register;
   repeating said steps of shifting and storing until said holding register stores said component data in packed format in a desired order.

22. The method according to claim 13, wherein said correspondence data associated with said one of said two tables is stored in a first register, and said correspondence data associated with said other one of said two tables is stored in a second register.

23. The method according to claim 22, wherein one of said correspondence data stored in said first register is stored in a corresponding location as a related one of said correspondence data stored in said second register such that, during said adding step, said one correspondence data and said related one of said correspondence data are added to provide a resultant correspondence data.

24. An apparatus for providing translation between a first type of data having a first plurality of components, each of said components having a first plurality of values and a second type of related data having a second plurality of components, each of said components having a second plurality of values, said apparatus comprising:
   a plurality of tables for storing a plurality of correspondence data representing the correspondence between pixels of said first type and analogous pixels of said second type;
   a plurality of registers, coupled to said plurality of tables, for storing correspondence data retrieved from said tables, each of said registers comprising a sufficient number of bits for allowing said each of said correspondence data stored in said registers to be treated as an independent operand for high-precision arithmetic operations.

25. The apparatus as in claim 24, wherein each one of said registers comprises a sufficient number of bits for storing correspondence data for each one of said components of the second type of data.

26. The apparatus according to claim 25, wherein sufficient number of bits includes, for each of said correspondence data, at least one guard bit and a plurality of out-of-range indicator bits.

27. The apparatus of claim 24, further comprising:

summing means, coupled to said registers, for adding said correspondence data stored at corresponding locations of said plurality of registers to provide translated components of said second type of data for storage in one of said registers.

28. The apparatus of claim 27, further comprising:

truncation means, for truncating each of said translated components into corrected components of a desired length.

29. The apparatus of claim 27, further comprising:

packing means, for packing said corrected components into contiguous locations of said one of said register.

30. The apparatus of claim 29, wherein said one of said registers comprises 8 bytes, each of said corrected components comprises one byte, and each of said corrected components are stored at 16 bit offsets of said one of said registers, wherein said packing means further comprises:

means for swapping one of said components in between said first component and said second component to provide packed data in said one of said registers.

31. The apparatus of claim 29, wherein said one of said registers comprises 4 bytes, each of said corrected components comprises one byte, and each of said corrected components are stored at 11 bit offsets of said one of said registers, wherein said means for packing further comprises:

a holding register for temporarily holding the contents of said one of said registers;

means for shifting said one of said registers by said offset amount; and means for transferring said low order byte of said one of said registers to a desired location of said holding register.

* * * * *